United States Patent
Brosnan et al.

(10) Patent No.: US 9,358,453 B2
(45) Date of Patent: *Jun. 7, 2016

(54) TRAJECTORY-BASED 3-D GAMES OF CHANCE FOR VIDEO GAMING MACHINES

(71) Applicant: IGT, Las Vegas, NV (US)

(72) Inventors: William R. Brosnan, Reno, NV (US); Nicole M. Beaulieu, Reno, NV (US); Jamal Benbrahim, Reno, NV (US); Anthony R. Escalera, Sparks, NV (US); Alexey Kryuchkov, Sunnyvale, CA (US); Steven G. LeMay, Reno, NV (US); Jeff Mincey, Reno, NV (US); Dwayne R. Nelson, Las Vegas, NV (US); Andy Rodgers, Reno, NV (US); Greg A. Schlottmann, Sparks, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/645,110

(22) Filed: Mar. 11, 2015

(65) Prior Publication Data

US 2015/0187163 A1 Jul. 2, 2015

Related U.S. Application Data

(60) Continuation of application No. 14/045,442, filed on Oct. 3, 2013, now Pat. No. 8,992,320, which is a continuation of application No. 13/047,717, filed on Mar. 14, 2011, now Pat. No. 8,550,893, which is a division of application No. 10/187,343, filed on Jun. 27, 2002, now Pat. No. 7,918,730.

(51) Int. Cl.
*A63F 13/00* (2014.01)
*A63F 13/40* (2014.01)
(Continued)

(52) U.S. Cl.
CPC .............. *A63F 13/005* (2013.01); *A63F 13/10* (2013.01); *G07F 17/326* (2013.01); *G07F 17/38* (2013.01); *A63F 2300/64* (2013.01); *A63F 2300/643* (2013.01)

(58) Field of Classification Search
USPC .................................................. 463/2, 16, 32
See application file for complete search history.

(56) References Cited

U.S. PATENT DOCUMENTS

| 3,383,111 A | 5/1968 | Lucas |
| 4,332,389 A | 6/1982 | Loyd, Jr. et al. |

(Continued)

FOREIGN PATENT DOCUMENTS

| AU | 200179477 | | 5/2002 |
| AU | 200210214 | A1 | 8/2002 |

(Continued)

OTHER PUBLICATIONS

Third Party Submission for U.S. Appl. No. 13/047,721 dated Sep. 7, 2011.

(Continued)

*Primary Examiner* — Pierre E Elisca
(74) *Attorney, Agent, or Firm* — Neal, Gerber & Eisenberg LLP

(57) ABSTRACT

Trajectory-based games of chance are described that are, in certain embodiments, implemented on a video gaming machine. In one embodiment of a trajectory-based game of chance, a trajectory of a game object is generated in a 3-D gaming environment. A wager is made on an aspect of the game object's trajectory in the gaming environment such as a termination location for the trajectory of the game object. The aspect of the game object's trajectory occurs according to a known probability. Hence, an award for the trajectory-based game of chance is proportional to the probability of the aspect of the game object's trajectory occurring.

18 Claims, 12 Drawing Sheets

(51) Int. Cl.
*G07F 17/32* (2006.01)
*G07F 17/38* (2006.01)

(56) References Cited

U.S. PATENT DOCUMENTS

| | | |
|---|---|---|
| 4,365,810 A | 12/1982 | Richardson |
| 4,373,726 A | 2/1983 | Churchill et al. |
| 4,455,025 A | 6/1984 | Itkis |
| 4,508,336 A | 4/1985 | Yokoi et al. |
| 4,572,509 A | 2/1986 | Sitrick |
| 4,624,462 A | 11/1986 | Itkis |
| 4,634,126 A | 1/1987 | Kimura |
| 4,798,387 A | 1/1989 | Richardson |
| 4,823,345 A | 4/1989 | Daniel et al. |
| 4,848,771 A | 7/1989 | Richardson |
| 4,856,787 A | 8/1989 | Itkis |
| 4,871,171 A | 10/1989 | Rivero |
| 4,885,703 A | 12/1989 | Deering |
| 4,914,607 A | 4/1990 | Takanashi et al. |
| 4,986,543 A | 1/1991 | Heller |
| 5,007,649 A | 4/1991 | Richardson |
| 5,016,879 A | 5/1991 | Parker et al. |
| 5,120,060 A | 6/1992 | Parker et al. |
| 5,121,919 A | 6/1992 | Martti |
| 5,227,771 A | 7/1993 | Kerr et al. |
| 5,242,163 A | 9/1993 | Fulton |
| 5,255,352 A | 10/1993 | Falk |
| 5,297,802 A | 3/1994 | Pocock et al. |
| 5,303,388 A | 4/1994 | Kreitman et al. |
| 5,339,390 A | 8/1994 | Robertson et al. |
| 5,342,047 A | 8/1994 | Heidel et al. |
| 5,351,970 A | 10/1994 | Fioretti |
| 5,393,057 A | 2/1995 | Marnell, II |
| 5,421,576 A | 6/1995 | Yamazaki et al. |
| 5,435,554 A | 7/1995 | Lipson |
| 5,455,904 A | 10/1995 | Bouchet et al. |
| 5,462,277 A | 10/1995 | Takemoto |
| 5,469,536 A | 11/1995 | Blank |
| 5,485,197 A | 1/1996 | Hoarty |
| 5,594,844 A | 1/1997 | Sakai et al. |
| 5,604,852 A | 2/1997 | Watters et al. |
| 5,608,850 A | 3/1997 | Robertson |
| 5,621,906 A | 4/1997 | O'Neill et al. |
| 5,639,088 A | 6/1997 | Schneider et al. |
| 5,639,089 A | 6/1997 | Matsumoto et al. |
| 5,643,086 A | 7/1997 | Alcorn et al. |
| 5,678,015 A | 10/1997 | Goh |
| 5,682,043 A | 10/1997 | Pei et al. |
| 5,689,628 A | 11/1997 | Robertson |
| 5,729,673 A | 3/1998 | Cooper et al. |
| 5,742,779 A | 4/1998 | Steele et al. |
| 5,745,109 A | 4/1998 | Nakano et al. |
| 5,755,621 A | 5/1998 | Marks et al. |
| 5,766,074 A | 6/1998 | Cannon et al. |
| 5,769,716 A | 6/1998 | Saffari et al. |
| 5,775,993 A | 7/1998 | Fentz et al. |
| 5,788,230 A | 8/1998 | Krise et al. |
| 5,788,573 A | 8/1998 | Baerlocher et al. |
| 5,805,783 A | 9/1998 | Ellson et al. |
| 5,807,172 A | 9/1998 | Piechowiak |
| 5,816,918 A | 10/1998 | Kelly et al. |
| 5,833,540 A | 11/1998 | Miodunski et al. |
| 5,836,819 A | 11/1998 | Ugawa |
| 5,880,733 A | 3/1999 | Horvitz et al. |
| 5,903,271 A | 5/1999 | Bardon et al. |
| 5,912,671 A | 6/1999 | Oka |
| 5,934,672 A | 8/1999 | Sines et al. |
| 5,941,772 A | 8/1999 | Paige |
| 5,956,038 A | 9/1999 | Rekimoto |
| 5,967,895 A | 10/1999 | Kellen |
| 5,998,803 A | 12/1999 | Forrest et al. |
| 6,002,403 A | 12/1999 | Sugiyama et al. |
| 6,002,853 A | 12/1999 | de Hond |
| 6,005,579 A | 12/1999 | Suglyama et al. |
| 6,009,458 A | 12/1999 | Hawkins et al. |
| 6,012,984 A | 1/2000 | Roseman |
| 6,014,142 A | 1/2000 | LaHood |
| 6,023,371 A | 2/2000 | Onitsuka et al. |
| 6,027,115 A | 2/2000 | Griswold et al. |
| 6,029,973 A | 2/2000 | Takemoto |
| 6,031,545 A | 2/2000 | Ellenby et al. |
| 6,033,307 A | 3/2000 | Vancura |
| 6,043,818 A | 3/2000 | Nakano et al. |
| 6,047,963 A | 4/2000 | Pierce et al. |
| 6,050,895 A | 4/2000 | Luciano et al. |
| 6,057,856 A | 5/2000 | Miyashita et al. |
| 6,062,978 A | 5/2000 | Martino et al. |
| 6,080,063 A | 6/2000 | Khosla |
| 6,089,976 A | 7/2000 | Schneider et al. |
| 6,093,100 A | 7/2000 | Singer et al. |
| 6,094,196 A | 7/2000 | Berry et al. |
| 6,104,815 A | 8/2000 | Alcorn et al. |
| 6,106,396 A | 8/2000 | Alcorn et al. |
| 6,131,909 A | 10/2000 | Chilese |
| 6,135,884 A | 10/2000 | Hedrick et al. |
| 6,139,013 A | 10/2000 | Pierce et al. |
| 6,142,874 A | 11/2000 | Kodachi et al. |
| 6,142,875 A | 11/2000 | Kodachi et al. |
| 6,149,156 A | 11/2000 | Feola |
| 6,149,522 A | 11/2000 | Alcorn et al. |
| 6,159,095 A | 12/2000 | Frohm et al. |
| 6,183,361 B1 | 2/2001 | Cummings et al. |
| 6,203,008 B1 | 3/2001 | Krise et al. |
| 6,203,009 B1 | 3/2001 | Sines et al. |
| 6,203,428 B1 | 3/2001 | Giobbi et al. |
| 6,206,782 B1 | 3/2001 | Walker et al. |
| 6,220,593 B1 | 4/2001 | Pierce et al. |
| 6,234,901 B1 | 5/2001 | Nagoshi et al. |
| 6,254,483 B1 | 7/2001 | Acres |
| 6,267,669 B1 | 7/2001 | Luciano, Jr. et al. |
| 6,271,842 B1 | 8/2001 | Bardon et al. |
| 6,280,325 B1 | 8/2001 | Fisk |
| 6,287,201 B1 | 9/2001 | Hightower |
| 6,315,666 B1 | 11/2001 | Mastera et al. |
| 6,319,128 B1 | 11/2001 | Miyoshi et al. |
| 6,331,146 B1 | 12/2001 | Miyamoto et al. |
| 6,332,838 B1 | 12/2001 | Yamagami |
| 6,340,158 B2 | 1/2002 | Pierce et al. |
| 6,342,892 B1 | 1/2002 | Van Hook et al. |
| 6,346,956 B2 | 2/2002 | Matsuda |
| 6,347,999 B1* | 2/2002 | Yuan ................. A63F 13/08 463/3 |
| 6,390,470 B1 | 5/2002 | Huang |
| 6,398,218 B1 | 6/2002 | Vancura |
| 6,409,602 B1 | 6/2002 | Wiltshire et al. |
| 6,409,604 B1 | 6/2002 | Matsuno |
| 6,413,162 B1 | 7/2002 | Baerlocher et al. |
| 6,419,225 B2 | 7/2002 | Sines et al. |
| 6,419,226 B2 | 7/2002 | Krise et al. |
| 6,431,982 B2 | 8/2002 | Kobayashi |
| 6,454,649 B1 | 9/2002 | Mattice et al. |
| 6,458,032 B1 | 10/2002 | Yamagami |
| 6,506,114 B1 | 1/2003 | Estes et al. |
| 6,508,709 B1 | 1/2003 | Karmarkar |
| 6,512,522 B1 | 1/2003 | Miller et al. |
| 6,515,688 B1 | 2/2003 | Berry et al. |
| 6,517,433 B2 | 2/2003 | Loose et al. |
| 6,524,185 B2 | 2/2003 | Lind |
| 6,533,273 B2 | 3/2003 | Cole et al. |
| 6,537,150 B1 | 3/2003 | Luciano |
| 6,542,168 B2 | 4/2003 | Negishi et al. |
| 6,559,863 B1 | 5/2003 | Megiddo |
| 6,569,017 B2 | 5/2003 | Enzminger et al. |
| 6,570,587 B1 | 5/2003 | Efrat et al. |
| 6,577,330 B1 | 6/2003 | Tsuda et al. |
| 6,597,358 B2 | 7/2003 | Miller |
| 6,597,380 B1 | 7/2003 | Wang et al. |
| 6,619,659 B2 | 9/2003 | Krise et al. |
| 6,626,760 B1 | 9/2003 | Miyamoto et al. |
| 6,628,310 B1 | 9/2003 | Hiura et al. |
| 6,641,137 B2 | 11/2003 | Sines et al. |
| 6,641,478 B2 | 11/2003 | Sakai |
| 6,645,070 B2 | 11/2003 | Lupo |
| 6,656,040 B1 | 12/2003 | Brosnan et al. |

(56) References Cited

U.S. PATENT DOCUMENTS

| | | |
|---|---|---|
| 6,656,044 B1 | 12/2003 | Lewis |
| 6,661,426 B1 | 12/2003 | Jetha et al. |
| 6,666,766 B2 | 12/2003 | Baerlocher et al. |
| 6,667,741 B1 | 12/2003 | Kataoka et al. |
| 6,669,562 B1 | 12/2003 | Shiino |
| 6,700,588 B1 | 3/2004 | MacInnis et al. |
| 6,734,884 B1 | 5/2004 | Berry et al. |
| 6,746,329 B1 | 6/2004 | Duhamel |
| 6,760,050 B1 | 7/2004 | Nakagawa |
| 6,769,982 B1 | 8/2004 | Brosnan |
| 6,772,195 B1 | 8/2004 | Hatlelid et al. |
| 6,802,776 B2 | 10/2004 | Lind et al. |
| 6,811,482 B2 | 11/2004 | Letovsky |
| 6,822,662 B1 | 11/2004 | Cook et al. |
| 6,840,858 B2 | 1/2005 | Adams |
| 6,847,162 B2 | 1/2005 | Duggal et al. |
| 6,851,674 B2 | 2/2005 | Pierce |
| 6,866,585 B2 * | 3/2005 | Muir .................... A63F 13/005 463/31 |
| 6,887,157 B2 | 5/2005 | LeMay et al. |
| 6,896,259 B2 | 5/2005 | Sines et al. |
| 6,896,261 B2 | 5/2005 | Pierce et al. |
| 6,902,481 B2 | 6/2005 | Breckner et al. |
| 6,922,815 B2 | 7/2005 | Rosen |
| 6,938,218 B1 | 8/2005 | Rosen |
| 6,942,571 B1 | 9/2005 | McAllister et al. |
| 7,008,324 B1 | 3/2006 | Johnson et al. |
| 7,009,611 B2 | 3/2006 | Di Lelle |
| 7,034,825 B2 | 4/2006 | Stowe et al. |
| 7,070,504 B2 | 7/2006 | Iwamoto |
| 7,125,333 B2 | 10/2006 | Brosnan |
| 7,156,735 B2 | 1/2007 | Brosnan et al. |
| 7,169,044 B2 | 1/2007 | Baerlocher et al. |
| 7,179,166 B1 | 2/2007 | Abbott |
| 7,192,345 B2 | 3/2007 | Muir et al. |
| 7,291,068 B2 | 11/2007 | Bryant et al. |
| 7,318,774 B2 | 1/2008 | Bryant et al. |
| 7,367,885 B2 | 5/2008 | Escalera et al. |
| 7,400,322 B1 | 7/2008 | Urbach |
| 7,465,230 B2 | 12/2008 | LeMay et al. |
| 7,503,003 B2 | 3/2009 | Kamen et al. |
| 7,503,006 B2 | 3/2009 | Danieli |
| 7,572,186 B2 | 8/2009 | LeMay et al. |
| 7,581,195 B2 | 8/2009 | Sciammarella et al. |
| 7,862,419 B2 | 1/2011 | Baerlocher et al. |
| 7,901,289 B2 | 3/2011 | Schlottmann et al. |
| 7,909,696 B2 | 3/2011 | Beaulieu et al. |
| 7,918,730 B2 | 4/2011 | Brosnan et al. |
| 7,934,994 B2 | 5/2011 | Lemay et al. |
| 8,002,623 B2 | 8/2011 | Resnick et al. |
| 8,012,019 B2 | 9/2011 | Escalera et al. |
| 8,267,767 B2 | 9/2012 | Kryuchkov et al. |
| 2001/0054794 A1 | 12/2001 | Cole et al. |
| 2002/0013170 A1 | 1/2002 | Miller |
| 2002/0016201 A1 | 2/2002 | Bennett et al. |
| 2002/0019253 A1 | 2/2002 | Reitzen et al. |
| 2002/0105515 A1 | 8/2002 | Mochizuki |
| 2002/0111208 A1 | 8/2002 | Marta |
| 2002/0111212 A1 | 8/2002 | Muir |
| 2002/0113369 A1 | 8/2002 | Weingardt |
| 2002/0113820 A1 | 8/2002 | Robinson et al. |
| 2002/0132661 A1 | 9/2002 | Lind |
| 2002/0175466 A1 | 11/2002 | Loose et al. |
| 2003/0013517 A1 | 1/2003 | Bennett et al. |
| 2003/0032479 A1 | 2/2003 | LeMay et al. |
| 2003/0045345 A1 | 3/2003 | Berman |
| 2003/0064781 A1 | 4/2003 | Muir |
| 2003/0064801 A1 | 4/2003 | Breckner |
| 2003/0119581 A1 | 6/2003 | Cannon et al. |
| 2003/0125101 A1 | 7/2003 | Campo |
| 2004/0002380 A1 | 1/2004 | Brosnan |
| 2004/0029636 A1 | 2/2004 | Wells |
| 2004/0048657 A1 | 3/2004 | Gauselmann |
| 2004/0077402 A1 | 4/2004 | Schlottmann |
| 2004/0077404 A1 | 4/2004 | Schlottmann et al. |
| 2004/0092302 A1 | 5/2004 | Gauselmann |
| 2004/0102244 A1* | 5/2004 | Kryuchkov .......... G07F 17/32 463/32 |
| 2004/0102245 A1 | 5/2004 | Escalera et al. |
| 2004/0132525 A1 | 7/2004 | Baerlocher et al. |
| 2004/0198485 A1 | 10/2004 | Loose et al. |
| 2004/0266515 A1 | 12/2004 | Gauselmann |
| 2005/0001845 A1 | 1/2005 | Noyle |
| 2005/0020341 A1 | 1/2005 | Brosnan |
| 2005/0075167 A1 | 4/2005 | Beaulieu et al. |
| 2005/0121850 A1 | 6/2005 | Pierce et al. |
| 2005/0215305 A1 | 9/2005 | Pierce et al. |
| 2005/0225559 A1 | 10/2005 | Robertson et al. |
| 2005/0233798 A1 | 10/2005 | Van Asdale |
| 2005/0233799 A1 | 10/2005 | LeMay et al. |
| 2006/0025199 A1 | 2/2006 | Harkins et al. |
| 2006/0084487 A1 | 4/2006 | Pierce et al. |
| 2006/0229122 A1 | 10/2006 | Macke |
| 2006/0287058 A1 | 12/2006 | Resnick et al. |
| 2007/0060251 A9 | 3/2007 | Pierce et al. |
| 2007/0155464 A1 | 7/2007 | Baerlocher et al. |
| 2007/0155471 A1 | 7/2007 | Powell et al. |
| 2007/0155472 A1 | 7/2007 | Gail et al. |
| 2007/0155473 A1 | 7/2007 | Powell et al. |
| 2007/0161423 A1 | 7/2007 | Bienvenue et al. |
| 2007/0293292 A1* | 12/2007 | Gipp .................... G07F 17/3211 463/16 |
| 2008/0045331 A1 | 2/2008 | LeMay et al. |
| 2008/0076546 A1* | 3/2008 | Moyle ..................... G07F 17/32 463/29 |
| 2008/0188303 A1 | 8/2008 | Schlottmann et al. |
| 2008/0188304 A1 | 8/2008 | Escalera et al. |
| 2008/0303746 A1 | 12/2008 | Schlottmann et al. |
| 2009/0062001 A1 | 3/2009 | LeMay et al. |
| 2011/0165930 A1 | 7/2011 | Brosnan et al. |
| 2011/0165931 A1 | 7/2011 | Brosnan et al. |
| 2012/0289306 A1 | 11/2012 | Kryuchkov et al. |
| 2013/0012317 A1 | 1/2013 | Kryuchkov et al. |

FOREIGN PATENT DOCUMENTS

| | | |
|---|---|---|
| AU | 200227720 | 2/2003 |
| AU | 2003237479 B2 | 1/2004 |
| AU | 2006203556 B2 | 9/2006 |
| CA | 2 343 870 A1 | 10/2001 |
| EP | 0 475 581 | 3/1992 |
| EP | 0 759 315 | 2/1997 |
| EP | 0 830 881 A2 | 3/1998 |
| GB | 2 405 107 | 2/2005 |
| GB | 2 412 282 | 9/2005 |
| GB | 2 420 294 | 5/2006 |
| GB | 2 459 628 | 11/2009 |
| GR | 62140 B | 8/1979 |
| JP | 0-044735 | 2/1995 |
| JP | 1995-044735 | 2/1995 |
| JP | 2001-070634 | 3/2001 |
| JP | 2002-099926 A | 4/2002 |
| RU | 2 067 775 C1 | 10/1996 |
| RU | 2 168 192 C2 | 5/2001 |
| WO | WO 98/45004 | 10/1998 |
| WO | WO 02/32521 | 4/2002 |
| WO | WO 02/073501 | 9/2002 |
| WO | WO 2004/002591 | 1/2004 |
| WO | WO 2004/028650 | 4/2004 |
| WO | WO 2004/029893 | 4/2004 |
| WO | WO 2005/016473 | 2/2005 |
| WO | WO 2005/034054 | 4/2005 |
| WO | WO 2006/039324 | 4/2006 |
| WO | WO 2008/005278 | 1/2008 |
| WO | WO 2008/154433 | 12/2008 |

OTHER PUBLICATIONS

U.S. Office Action dated Jun. 5, 2012 issued in U.S. Appl. No. 13/047,721.

U.S. Notice of Allowance dated Oct. 2, 2012 issued in U.S. Appl. No. 13/047,721.

U.S. Allowed Claims dated Dec. 10, 2012 for U.S. Appl. No. 13/047,721.

(56) References Cited

OTHER PUBLICATIONS

U.S. Notice of Allowance dated Dec. 10, 2012 issued in U.S. Appl. No. 13/047,721.
U.S. Notice of Panel Decision from Pre-Appeal Brief Review dated Aug. 14, 2008 issued in U.S. Appl. No. 10/674,884.
U.S. Notification of Non-Compliant Appeal Brief dated Mar. 10, 2009 issued in U.S. Appl. No. 10/674,884.
U.S. Action—Before the Board of Patent Appeals and Interferences, Decision on Appeal dated Jan. 11, 2012 issued in U.S. Appl. No. 10/674,884.
U.S. Notice of Allowance dated Feb. 6, 2012 issued in U.S. Appl. No. 10/674,884.
U.S. Notice of Allowance dated May 11, 2012 issued in U.S. Appl. No. 10/674,884.
U.S. Notice of Allowance dated Dec. 21, 2007 issued in U.S. Appl. No. 10/676,719.
U.S. Office Action dated Dec. 22, 2008 issued in U.S. Appl. No. 12/101,921.
U.S. Final Office Action dated Nov. 23, 2011 issued in U.S. Appl. No. 11/759,825.
U.S. Notice of Panel Decision from Pre-Appeal Brief Review dated Mar. 20, 2012 issued in U.S. Appl. No. 11/759,825.
U.S. Notice of Allowance, Notice of Allowability and Examiner-Initiated Interview Summary dated Aug. 10, 2012 issued in U.S. Appl. No. 11/759,825.
U.S. Allowed Claims dated Nov. 30, 2012 issued in U.S. Appl. No. 11/759,825.
U.S. Notice of Allowance dated Nov. 30, 2012 issued in U.S. Appl. No. 11/759,825.
Australian Examiner's First Report dated Apr. 23, 2012 issued in AU 2008261879.
GB Examination Report dated Nov. 28, 2011 issued in GB0915991.4.
GB Examination Report dated Sep. 14, 2012 issued in GB0915991.4.
U.S. Office Action dated Jun. 6, 2012 issued in U.S. Appl. No. 13/047,720.
U.S. Allowed Claims dated Aug. 10, 2012 issued in U.S. Appl. No. 11/759,825.
U.S. Office Action dated Jun. 13, 2003 issued in U.S. Appl. No. 09/927,901.
U.S. Final Office Action dated Dec. 22, 2003 issued in U.S. Appl. No. 09/927,901.
U.S. Examiner Interview Summary dated Mar. 16, 2004 issued in U.S. Appl. No. 09/927,901.
U.S. Office Action dated Jun. 21, 2004 issued in U.S. Appl. No. 09/927,901.
U.S. Examiner Interview Summary dated Jul. 27, 2004 issued in U.S. Appl. No. 09/927,901.
U.S. Notice of Allowance dated Dec. 16, 2004 issued in U.S. Appl. No. 09/927,901.
U.S. Office Action dated Dec. 10, 2007 issued in U.S. Appl. No. 11/112,076.
U.S. Notice of Allowance dated Sep. 15, 2008 issued in U.S. Appl. No. 11/112,076.
U.S. Office Action dated Dec. 12, 2007 issued in U.S. Appl. No. 11/829,807.
US Notice of Allowance dated Sep. 8, 2008 issued in U.S. Appl. No. 11/829,807.
U.S. Office Action dated Mar. 15, 2010 issued in U.S. Appl. No. 12/264,877.
U.S. Notice of Allowance dated Aug. 16, 2010 issued in U.S. Appl. No. 12/264,877.
U.S. Notice of Allowance dated Nov. 1, 2010 issued in U.S. Appl. No. 12/264,877.
U.S. Office Action (Ids considered) dated Mar. 24, 2011 issued in U.S. Appl. No. 12/264,877.
U.S. Office Action dated Aug. 18, 2010 issued in U.S. Appl. No. 11/481,666.
U.S. Office Action (Ex Parte Quayle) dated Feb. 9, 2011 issued in U.S. Appl. No. 11/481,666.
U.S. Notice of Allowance dated Jun. 13, 2011 issued in U.S. Appl. No. 11/481,666.
U.S. Office Action dated Jun. 17, 2005 issued in U.S. Appl. No. 10/187,343.
U.S. Final Office Action dated Jan. 30, 2007 issued in U.S. Appl. No. 10/187,343.
U.S. Office Action dated Jun. 27, 2007 issued in U.S. Appl. No. 10/187,343.
U.S. Office Action dated Aug. 21, 2008 issued in U.S. Appl. No. 10/187,343.
U.S. Office Action dated May 15, 2009 issued in U.S. Appl. No. 10/187,343.
U.S. Final Office Action dated May 10, 2010 issued in U.S. Appl. No. 10/187,343.
U.S. Notice of Allowance dated Aug. 6, 2010 issued in U.S. Appl. No. 10/187,343.
U.S. Notice of Allowance dated Nov. 30, 2010 issued in U.S. Appl. No. 10/187,343.
U.S. Office Action (IDS considered) dated Feb. 14, 2011 issued in U.S. Appl. No. 10/187,343.
U.S. Office Action dated Sep. 6, 2007 issued in U.S. Appl. No. 10/803,233.
U.S. Office Action dated Jun. 24, 2008 issued in U.S. Appl. No. 10/803,233.
U.S. Office Action dated Jan. 23, 2009 issued in U.S. Appl. No. 10/803,233.
U.S. Final Office Action dated Oct. 1, 2009 issued in U.S. Appl. No. 10/803,233.
U.S. Notice of Allowance dated Jan. 27, 2010 issued in U.S. Appl. No. 10/803,233.
U.S. Notice of Allowance dated Mar. 11, 2010 issued in U.S. Appl. No. 10/803,233.
U.S. Notice of Allowance dated Jul. 12, 2010 issued in U.S. Appl. No. 10/803,233.
U.S. Notice of Allowance and Examiners Communication dated Nov. 3, 2010 issued in U.S. Appl. No. 10/803,233.
U.S. Office Action (IDS considered) dated Feb. 10, 2011 issued in U.S. Appl. No. 10/803,233.
U.S. Office Action dated Jun. 12, 2007 issued in U.S. Appl. No. 10/674,884.
U.S. Office Action dated Feb. 20, 2008 issued in U.S. Appl. No. 10/674,884.
U.S. Action—Examiner's Answer re Brief on Appeal, dated Jun. 22, 2009 issued in U.S. Appl. No. 10/674,884.
U.S. Action—Examiner's Communication re Ids Considered dated Jul. 27, 2009 issued in U.S. Appl. No. 10/674,884.
U.S. Office Action dated Feb. 12, 2007 issued in U.S. Appl. No. 10/676,719.
U.S. Notice of Allowance dated Sep. 24, 2007 issued in U.S. Appl. No. 10/676,719.
U.S. Office Action dated May 18, 2010 issued in U.S. Appl. No. 12/101,921.
U.S. Office Action Final dated Oct. 29, 2010 issued in U.S. Appl. No. 12/101,921.
U.S. Examiner Interview Summary of interview Jan. 19, 2011, dated Jan. 26, 2011 issued in U.S. Appl. No. 12/101,921.
U.S. Office Action dated Feb. 15, 2011 issued in U.S. Appl. No. 12/101,921.
U.S. Notice of Allowance dated Jun. 24, 2011 issued in U.S. Appl. No. 12/101,921.
U.S. Office Action dated Aug. 25, 2010 issued in U.S. Appl. No. 11/759,825.
U.S. Final Office Action dated Jan. 28, 2011 issued in U.S. Appl. No. 11/759,825.
U.S. Office Action (Notice of Panel Decision on Pre-Appeal Brief Review) dated Apr. 6, 2011 issued in U.S. Appl. No. 11/759,825.
U.S. Office Action dated Jun. 16, 2011 issued in U.S. Appl. No. 11/759,825.
Supplemental Information Disclosure Statement dated Jan. 28, 2004 issues in U.S. Appl. No. 10/272,788 4 pages.
U.S. Office Action dated Feb. 8, 2005 issued in U.S. Appl. No. 10/272,788.

(56) References Cited

OTHER PUBLICATIONS

U.S. Office Action dated May 25, 2005 issued in U.S. Appl. No. 10/272,788.
U.S. Office Action dated Jun. 1, 2006 issued in U.S. Appl. No. 10/272,788.
U.S. Office Action dated Oct. 26, 2006 issued in U.S. Appl. No. 10/272,788.
U.S. Office Action dated Feb. 22, 2007 issued in U.S. Appl. No. 10/272,788.
U.S. Office Action (Notice of Panel Decision on Pre-Appeal Brief Review) dated Aug. 2, 2007 issued in U.S. Appl. No. 10/272,788.
U.S. Office Action dated Nov. 5, 2008 issued in U.S. Appl. No. 12/024,931.
U.S. Final Office Action dated Jun. 9, 2009 issued in U.S. Appl. No. 12/024,931.
U.S. Office Action dated Dec. 31, 2009 issued in U.S. Appl. No. 12/024,931.
U.S. Notice of Non-Compliant Amendment (37 CFR 1.121) dated Aug. 11, 2010 issued in U.S. Appl. No. 12/024,931.
U.S. Notice of Allowance dated Sep. 20, 2010 issued in U.S. Appl. No. 12/024,931.
U.S. Notice of Allowance dated Nov. 15, 2010 issued in U.S. Appl. No. 12/024,931.
U.S. Office Action (IDS considered) dated Feb. 8, 2011 issued in U.S. Appl. No. 12/024,931.
Australian Examiner's first report dated Nov. 21, 2005 issued in AU 27720/02.
Australian Examiner's first report dated Jun. 26, 2008 issued in AU 2006203556.
PCT International Search Report and Written Opinion dated Feb. 12, 2008 issued in PCT/US2007/015015.
PCT International Preliminary Report on Patentability and Written Opinion dated Jan. 6, 2009 issued in PCT/US2007/015015.
EP Examination Report dated Jun. 3, 2009 issued in EP 07 809 991.8-2221.
EP Result of Consultation dated Sep. 1, 2009 issued in EP 07 809 991.8-2221.
PCT International Search Report dated Jan. 13, 2004 issued in PCT/US2003/018028.
Australian Examiner's first report dated Jun. 18, 2008 issued in AU 2003237479.
British Examination Report dated Jun. 9, 2005 issued in UK 0427512.9.
British Examination Report dated Nov. 7, 2006 issued in GB 0427512.9.
UK Combined Search and Examination Report under Sections 17 and 18(3) dated Mar. 15, 2006 issued in GB0600005.3.
Australian Examiner's first report dated Mar. 12, 2010 issued in AU 2005201148.
Australian Examiner's Report No. 2 dated Aug. 10, 2010 issued in AU 2005201148.
UK Search Report under Section 17(5) dated Jun. 22, 2005 issued in GB 0505328.5.
British Examination Report dated May 14, 2009 issued in GB 0505328.5.
British Examination Report dated Dec. 9, 2009 issued in GB 0505328.5.
PCT International Search Report dated Mar. 1, 2004 issued in PCT/US2003/031138.
Australian Examiner's first report dated Feb. 16, 2009 issued in AU 2003279092.
European Office Action dated Nov. 24, 2005 issued in EP 03 770 604.1-1238.
Russian Advisory Office Action dated Jul. 19, 2007 issued in RU 2005109160/09(010839).
PCT International Search Report dated Mar. 19, 2004 issued in PCT/US2003/031158.
Australian Examiner's first report dated Feb. 6, 2009 issued in AU 2003279742.

European Examination Report dated Dec. 15, 2005 issued in EP 03 773 084.32218.
European Office Action dated Jun. 29, 2007 issued in EP 03 773 084.3-2218.
Russian Advisory Action dated Jul. 19, 2007 issued in RU 2005109161/09 (010840).
PCT International Search Report and Written Opinion dated Oct. 24, 2008 issued in PCT/US2008/066196.
PCT International Preliminary Report on Patentability and Written Opinion dated Dec. 7, 2009 issued in PCT/US2008/066196.
3D Modelers Are Running under Linux LinuxFocus: vol. Nr 4, May 1998 http://mercury.chem.pitt.edu/~tiho/LinuxFocus/English/May1998/index.html printed on Oct. 11, 2002.
A Primer form Mercury Research the Basics of 3D Graphics Technology the Meter available at http://www.themeter.com/artilces/3DBasics.shtml printed on Jan. 31, 2003 pp. 1-2.
Carson G. S.: "Standards Pipeline the OpenGL Specification" Computer Graphics, ACM, US, vol. 31, No. 2, May 1997, pp. 17-18, XP000969297, ISSN: 097-8930.
David Einstein, "3D Web Browsing on the Horizon", Forbes.com Nov. 27, 2000, available at http://www.forbes.com/2000/11/27/1127thread.html. pp. 1-2.
England and Wales High Court (Patent Court) Decisions; Neutral Citation Number: [2005] EWHC 2416 (Pat) Case No. CH/2005/APP/0232 http://www.bailii.org/we/cases/EWHC/Patents/2005/2416.html (5 pgs.).
Game Machine, Patent Abstracts of Japan, Publication No. 2001-252393, published Sep. 18, 2001.
Game Machine, Patent Abstracts of Japan, Publication No. 2001-252394, published Sep. 18, 2001.
GameSpot Staff "15 Most Influential Games of All Time" Gamespot [online], retrieved May 30, 2007]. Retrieved from the Internet <http ://web.archive.org/web/20010618175937/http://gamespot.com/gamespot/features/pc/most_influential/p16.html>.
Learn How to Program 3D Graphics LinuxFocus vol. NR 2, Jan. 1998 1-2 pages http://mercury.chem.pitt.edu/~tiho/LinuxFocus/English/January1998/index/html.
M2 Presswire, "Aristocrat Technologies to use PowerVR Technology in Casino Video Machines; Australian Company Leads Market for Video Machine Games of Chance", Oct. 17, 2000, http://www.aristocrat.com.au/PR181000.htm, Copyright 2000 M2 Communications Ltd. printed on Jul. 3, 2001 pp. 1-2.
Mason Woo, Jackie Neider, Tom Davis, Dave Shreiner, OpenGL Program Guide: The Official Guide to Learning OpenGL, Introduction to OpenGL Chapter 1, Version 1.2, 3.sup.rd edition, Open GL Architecture Review Board, Addison-Wesley Publishing, Co., 1999, ISBN: 0201604582.
Microsoft Press Computer Dictionary Third Edition Redmond, WA 1997 p. 406.
Miguel Angel Sepulveda, "Open GL Programming. The 3D Scene" pp. 1-7 http://mercury.chem.pitt.edu/~tiho/LinuxFocus/English/May1998/article46.html.
Miguel Angel Sepulveda, "What is OpenGL?" LinuxFocus vol. 2 pp. 1-5 http://mercury.chem.pitt.edu/~tiho/LinuxFocus/English/January1998/article15.html printed on Oct. 11, 2002.
Mogilev, D. et al., (Apr. 2002) AR Pad: An Interface for Face-to-Face AR Collaboration, CHI 2002:changing the world, changing ourselves, *Interactive Poster: Tools for Collaboration*, pp. 654-655.
Patents Act 1977: Examining for Patentability Article http://www.patent.gov.uk/patent/notices/practice/examforpat.htm (3 pgs.).
Pattern Display Device, Patent Abstracts of Japan, Publication No. 2002-085624, published Mar. 26, 2002.
Phillip Ross, "Hardware Review: 3Dfx Graphics Card" LinuxFocus vol. 2, pp. 1-7 http://mercury.chem.pitt.edu/~tiho/LinuxFocus/English/January1998/artilce18.ht printed on Oct. 11, 2002.
"PowerVR Technologies Debuts KYRO II SE Graphics Processor at CeBIT 2002", Tech/Zone, Mar. 13, 2002, available at http://www.techzone.pcvsconsole.com/news.php?tzd=1246.
Rose, "Nevada A.G. Finds Free Internet Gambling is Still Gambling", Mar. 2001, printed fromhttp://rose.casinocitytimes.com/articles/974.html, pp. 1-4.

(56) References Cited

OTHER PUBLICATIONS

Scarne, John., Scarne on Cards, 1949, Crown Publishers, p. 243.

Scott et al. "An Overview of the VISUALIZE fx Graphics Accelerator Hardware" Article 4 Hewlet Packard Company May 1998 HP Journal.

Segal et al., "The OpenGL Graphics System: A Specification (Version 1.3)", 2001, printed from http://www.opengl.org/documentation/specs/version1.3/glspec13.pdf, pp. 1-11, 66-73 and 181-189 (29 pages).

Segal et al., "The OpenGL Graphics System: A Specification (Version 1.3)", 2001, printed from http://www.opengl.org/documentation/specs/version1.3/glspec13.pdf, pp. 1-11, 66-73 and 181-189 (40 pages).

Slot Machine, Patent Abstracts of Japan, Publication No. 2001-062032, published Mar. 13, 2001.

TE 5 Graphics Accelerator Technology Preview NEC Aug. 2001, 7 pages.

The Basics of 3D: Adding Parallelism, The Meter, available at http://www.themeter.com/articles/3DBasics-4.shtml, printed on Jan. 31, 2003 pp. 1-2.

The Basics of 3D: Balancing the Pipeline, The Meter, available at http://www.themeter.com/articles/3DBasics-3.shtml, printed on Jan. 31, 2003 pp. 1-2.

The Basics of 3D: Tackling the Pipeline, The Meter, available at http://www.themeter.com/articles/3DBasics-2.shtml, printed on Jan. 31, 2003 pp. 1-2.

The Basics of 3D: The Next Generation, The Meter, available at , http://www.themeter.com/articles/3DBasics-7.shtml, printed on Jan. 31, 2003 pp. 1-2.

The Basics of 3D: Transform and Lighting, The Meter, available at http://www.themeter.com/articles/3DBasics-6.shtml, printed on Jan. 31, 2003 pp. 1 -2.

The Basics of 3D: What's Next, The Meter, available at http://www.themeter.com/articles/3DBasics-5.shtml, printed on Jan. 31, 2003 p. 1.

White Paper, Power VR (PowerVR), 3D Graphical Processing, Nov. 14, 2000, Copyright Power VR 2000 8 pages.

* cited by examiner

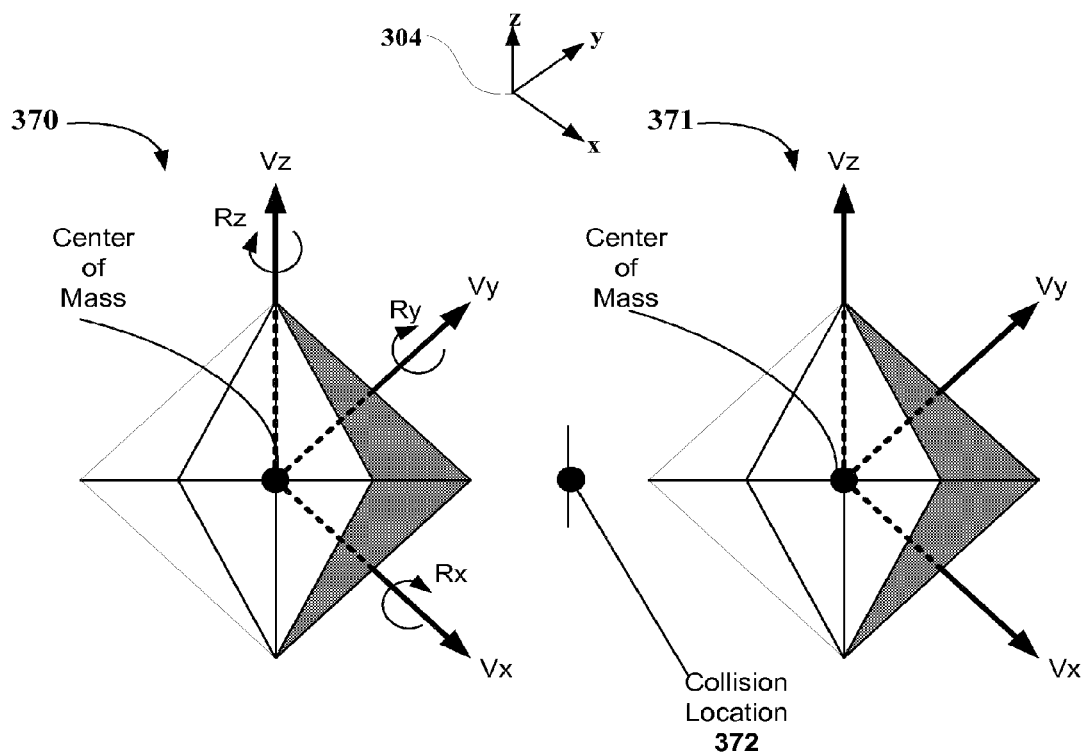

Trajectory Rules:

(1) $F_{x1}(x,y,z,V_x,V_y,V_z,R_x, R_y, R_z, t)+\cdots+F_{xn}(x,y,z,V_x,V_y,V_z,R_x,R_y,R_z,t)=m \cdot A_x$ (2) $F_{y1}(x,y,z,V_x,V_y,V_z,R_x, R_y, R_z, t)+\cdots+F_{yn}(x,y,z,V_x,V_y,V_z,R_x,R_y,R_z,t)=m \cdot A_y$ (3) $F_{z1}(x,y,z,V_x,V_y,V_z,R_x, R_y, R_z, t)+\cdots+F_{zn}(x,y,z,V_x,V_y,V_z,R_x,R_y,R_z,t)=m \cdot A_z$ (4) $Fr_{x1}(x,y,z,V_x,V_y,V_z,R_x, R_y, R_z, t)+\cdots+Fr_{xn}(x,y,z,V_x,V_y,V_z,R_x,R_y,R_z,t)=I_{xx} \cdot \theta_x$ (5) $Fr_{y1}(x,y,z,V_x,V_y,V_z,R_x, R_y, R_z, t)+\cdots+Fr_{yn}(x,y,z,V_x,V_y,V_z,R_x,R_y,R_z,t)=I_{yy} \cdot \theta_y$ (6) $Fr_{z1}(x,y,z,V_x,V_y,V_z,R_x, R_y, R_z, t)+\cdots+Fr_{zn}(x,y,z,V_x,V_y,V_z,R_x,R_y,R_z,t)=I_{zz} \cdot \theta_z$ Collison Rules for Linear Collision:

(1) $V1_f=(m_1-m_2)/(m_1+m_2) \; V1_i+(2m_2)/(m_1+m_2) \; V2_i$, Final Velocity of First Object (2) $V2_f=(2m_1)/(m_1+m_2) \; V1_i+(m_2-m_1)/(m_1+m_2) \; V2_i$, Final Velocity of Second Object

FIGURE 1B

TRAJECTORY-BASED 3-D GAMES OF CHANCE FOR VIDEO GAMING MACHINES

PRIORITY CLAIM

This application is a continuation of, and claims priority to and the benefit of, U.S. patent application Ser. No. 14/045,442, filed on Oct. 3, 2013, which is a continuation of, and claims priority to and the benefit of, U.S. patent application Ser. No. 13/047,717, filed on Mar. 14, 2011, which issued as U.S. Pat. No. 8,550,893 on Oct. 8, 2013, which is a divisional of, and claims priority to and the benefit of, U.S. patent application Ser. No. 10/187,343, filed on Jun. 27, 2002, which issued as U.S. Pat. No. 7,918,730 on Apr. 5, 2011, the entire contents of each of which are incorporated herein by reference.

BACKGROUND OF THE INVENTION

This invention relates to game playing methods for gaming machines such as slot machines and video poker machines. More particularly, the present invention relates to methods of allowing game players to play trajectory-based games of chance on a video gaming machine.

There are a wide variety of devices that can comprise a gaming machine such as a slot machine or video poker machine. Some examples of these devices are lights, slot reels, ticket printers, card readers, speakers, bill validators, coin acceptors, display panels, key pads, bonus wheels, and button pads. These devices provide many of the features which allow a gaming machine to present a game. Some of these devices are built into the gaming machine. Often, a number of devices are grouped together in a separate box that is placed on top of the gaming machine. Devices of this type are commonly called a top box.

Typically, utilizing a master gaming controller, the gaming machine controls various combinations of devices that allow a player to play a game of chance on the gaming machine and also encourage game play on the gaming machine. For example, a game played on a gaming machine usually requires a player to input money or indicia of credit into the gaming machine, indicate a wager amount, and initiate a game play. These steps require the gaming machine to operate input devices including bill validators and coin acceptors to accept money into the gaming machine and recognize user inputs from devices including key pads and button pads to determine the wager amount and initiate game play.

After a game of chance has been initiated on the gaming machine, the gaming machine determines a game outcome and presents the outcome of the game to a player. For example, for a slot game, after a player has initiated a game by pressing an input button or pulling a handle attached to the gaming machine, the gaming machine determines a game outcome which is the final position of each reel on the slot machine. A requirement for most gaming machines is that the probability of each game outcome is precisely known and remains constant during game play. Thus, when a player plays two or more games on a gaming machine the probability of a particular game outcome is the same for each game that the player initiates.

After the gaming machine determines the game outcome, the outcome of the game is presented to the player. For the slot game, the game outcome presentation might include a number reels spinning, visual effects including flashing or strobing lights and auditory effects including bells and whistles. The game outcome presentation, including the various visual and auditory effects, is designed to add excitement to the game being played on the gaming machine and encourage additional game play.

Usually near the end of the game outcome presentation, the game outcome is presented. For example, for the slot game, the reels stop at a final position. Based on the game outcome, the gaming machine may notify the player of an award of a varying amount or notify the player that the wager made on the game was lost. For example, for a slot game with three slot reels, when the final position of each reel corresponds to the display of an identical symbol including three cherries, three bars or the like, a player might be awarded a credit of 5 times the initial wager made on the game. However, other symbol combinations including 2 cherries and a bar or two bars and a cherry might result in a loss of the wager made on the game. Further, each time a player plays a game the probability of a particular game outcome such as three cherries or three bars will usually be the same. After the game outcome has been presented, a player may initiate a new game by making a new wager on the gaming machine and initiating the next game play.

In addition to the game of chance on the gaming machine on the gaming machine, a player may also be presented a bonus game. The bonus game may be used to add additional excitement to the play of games on the gaming machine. In bonus games, which are particular popular with video slot games, the player is offered the chance to win an additional award amount. The bonus game may be triggered by different events that occur during the play of the game of chance. For instance, in a slot game, a particular symbol or combination of symbols appearing on the reels may trigger the bonus game.

The bonus game may incorporate additional animations that are displayed on one or more video displays on the gaming machine and the activation of one or more peripheral devices associated with the gaming machine. For example, Wheel-of-Fortune™ by IGT (Reno, Nev.) is a very popular bonus game that incorporates a large spinning wheel attached to the gaming machine. When the bonus game is triggered, the wheel spins up. The bonus may be awarded according to the stopping place of the wheel.

The amount of game play on a gaming machine is usually a function of the type of game of chance. A few examples of games that are played on video gaming machines are slot games, poker, black jack, and keno. Among these games, slot games and video poker are probably the most popular. The type of bonus games offered with the game of chance may also influence the popularity of a particular game. A casino typically offers various types of games and bonus games because many game players are attracted to some games but dislike others. When a player wants to play a game on a gaming machine but does not like any of the offered games, this person may choose not to play. Also, when a player finds a particular game only mildly exciting, the player may become disinterested after a short time and cease their game play. Thus, to increase game play, new games of chance and bonus games are desired that may attract players previously uninterested in game play on a gaming machine. Accordingly, to attract new players, new games for gaming machines are desired that are exciting and are interesting enough to hold a player's interest over a long period of time.

SUMMARY OF THE INVENTION

This invention addresses the needs indicated above by providing a gaming machine on which a trajectory-based game of chance may be played. In a trajectory-based game of chance, a trajectory of a game object may be generated in a 3-D gaming environment. A sequence of 2-D images that show the game object's trajectory may be rendered for the 3-D gaming environment and displayed on a display screen on the gaming machine as part of a game outcome presentation for the trajectory-based game of chance. A wager may be made on an aspect of the game object's trajectory in the gaming environment such as a termination location for the trajectory of the game object. The aspect of the game object's trajectory may occur according to a known probability. Hence, an award for the trajectory-based game of chance may be proportional to the probability of the aspect of the game object's trajectory occurring.

The first two aspects of the present invention provide methods of generating trajectory-based game of chance on a gaming machine. The first method may be generally characterized as comprising: 1) receiving a request to initiate a trajectory-based game of chance; 2) determining a game outcome for the trajectory-based game of chance; 3) after the game outcome has been determined, generating a trajectory of a three-dimensional (3-D) game object in a 3-D gaming environment that corresponds to the determined game outcome; and 4) displaying as part of a game outcome presentation for the trajectory-based game of chance a sequence of two-dimensional images rendered from the 3-D gaming environment to a display screen on the gaming machine wherein the sequence of two-dimensional images comprise one or more two-dimensional images of the 3-D game object along its trajectory in the 3-D gaming environment.

In particular embodiments of the first method, two or more trajectory-based games of chance may be played in parallel. For instance, the first method may further comprise: a) prior to displaying the game outcome for the trajectory-based game of chance, receiving a request to initiate a second trajectory-based game of chance b) determining a game outcome for the second trajectory-based game of chance; c) after the game outcome has been determined for the second trajectory-based game of chance, generating a trajectory of a second three-dimensional (3-D) game object in the 3-D gaming environment that corresponds to the determined game outcome of second trajectory-based game of chance; and e) displaying, as part of a game outcome presentation for the trajectory-based game of chance and the second trajectory-based game of chance, a sequence of two-dimensional images rendered from the 3-D gaming environment to the display screen on the gaming machine where the sequence of two-dimensional images comprise one or more two-dimensional images with both the 3-D game object along its trajectory in the 3-D gaming environment and the second 3-D game object along its trajectory in the 3-D gaming environment. Further, the method may comprise receiving a first wager for the trajectory-based game of chance and receiving a second wager separate from the first wager for the second trajectory-based game of chance. In some embodiments, the game outcome for the second trajectory-based game of chance may be independent of the trajectory-based game of chance. In other embodiments, the game outcome for the second trajectory-based game of chance may be dependent on the trajectory-based game of chance.

As another example, the first method may further comprise: i) generating game outcomes for a plurality of trajectory-based games of chances where a separate wager is made on each of the plurality of trajectory-based games of chance; ii) generating a trajectory of a three-dimensional (3-D) game object in a 3-D gaming environment that corresponds to the determined game outcome for each of the plurality of trajectory-based games of chance; iii) displaying, as part of a game outcome presentations for the plurality of trajectory-based games of chance, at least one sequence of two-dimensional images rendered from the 3-D gaming environment to the display screen on the gaming machine where the at least one sequence of two-dimensional images comprise one or more two-dimensional images with two or more of the 3-D game objects along their trajectory in the 3-D gaming environment.

The second aspect of the present invention provides a second method of generating a trajectory-based game of chance on a gaming machine. The method may be generally characterized as comprising: 1) receiving a request to initiate a trajectory-based game of chance; 2) generating a trajectory of a three-dimensional (3D) game object in a 3-D gaming environment; 3) determining a game outcome for the trajectory-based game of chance wherein the game outcome is not determined until the 3-D game object reaches a final state of its trajectory in the 3-D gaming environment; and 4) displaying, as part of a game outcome presentation for the trajectory-based game of chance, a sequence of two-dimensional images rendered from the 3-D gaming environment to a display screen on the gaming machine where the sequence of two-dimensional images comprise one or more two-dimensional images of the 3-D game object along its trajectory in the 3-D gaming environment. In one embodiment, for the trajectory-based game of chance, the game outcome may be independent of the trajectory of the 3-D game object in the 3-D gaming environment. In another embodiment, the game outcome for the trajectory-based game of chance may be based-upon the final state of the trajectory in the 3-D gaming environment. In the second method, two or more trajectory-based games of chance may be played in parallel.

The following embodiments of the present invention may be used with either the first method or the second method for generating the trajectory-based game of chance. The trajectory-based game of chance may be a pachinko game. The 3-D game object may be a sphere or a polyhedron and the trajectory of the 3-D game object may be a planar trajectory. The 3-D gaming environment may comprise data and/or instructions for generating: i) a plurality of 3-D objects; ii) a plurality of trajectory rules for determining the trajectory of a moving 3-D object in the 3-D gaming environment; iii) a plurality of collision rules for determining effects of a collision between 3-D objects in the 3-D gaming environment; and a plurality of exit rules for removing the 3-D game object from the 3-D gaming environment. The 3-D gaming environment may also comprise data and/or instructions for generating a plurality of game levels for the trajectory-based game of chance.

In other embodiments, the methods for generating the trajectory-based game of chance may comprise one or more of the following: a) changing the geometry of the 3-D game object along its trajectory, b) receiving a wager for the trajectory-based game of chance, c) selecting an initial state for the 3-D game object in 3-D gaming environment where the initial state provides initial conditions for the trajectory of the 3-D game object in the 3-D gaming environment (The initial state may comprise an initial position of the 3-D game object in the 3-D gaming environment and an initial velocity of the 3-D game object in the 3-D game object.), d) displaying the game outcome for the trajectory-based game of chance and redisplaying one or more two-dimensional images of the 3-D game object along its trajectory and e) removing the 3-D game object from the 3-D gaming environment.

In another embodiment, the methods may also comprise receiving an output signal from a user interface for the trajectory-based game of chance and using information from the output signal, selecting an initial state for the 3-D game object in the 3-D gaming environment wherein the initial state provides initial conditions for the trajectory of the 3-D game object in the 3-D gaming environment. The user interface may comprise a) a plunger; and b) one or more sensors wherein the one or more sensors are designed to generate an output signal with information indicating at least one i) an amount of force applied to the plunger, ii) an actuation of the plunger has been initiated and iii) combinations thereof.

In yet another embodiment of the methods, a virtual camera may be used in the 3-D gaming environment to render the two-dimensional images used as part of a game outcome presentation. A position of a virtual camera for rendering images in the sequence of two-dimensional images changes as a function of time. Further, a virtual camera for rendering images in the sequence of two-dimensional images is located on the 3-D game object and travels with the 3-D game object along its trajectory. In addition, two or more virtual cameras in the 3-D gaming environment may be used to render images in the sequence of two-dimensional images. The methods may comprise one or more of the following: i) receiving an output signal from an input device on the gaming machine where the output signal includes information used to change a position of a virtual camera for rendering images in the sequence of two-dimensional images and ii) receiving an output signal from an input device on the gaming machine wherein the output signal includes information used to select a virtual camera for rendering images in the sequence of two-dimensional images.

In additional embodiments, the two methods for generating a trajectory-based game of chance may comprise detecting a collision between the 3-D game object and a second 3-D object in the 3-D gaming environment. The second 3-D object may be a second 3-D game object. In response to the collision between the 3-D game object and the second object, the methods may comprise one or more of the following: a) modifying the trajectory of the 3-D game object, b) generating a bonus game for the trajectory based game of chance, c) modifying a property of the 3-D game object and d) generating a game event. The methods may also comprise detecting an intersection of the 3-D game object with a surface in the 3-D gaming environment. In response to detecting the intersection, the methods may comprise one or more of the following: i) terminating the trajectory of the 3-D game object, ii) transporting the 3-D game object to a location in the 3-D gaming environment away from a location of the intersection, iii) modifying a property of the 3-D game object, iv) starting a bonus game, and v) triggering a game event.

Another aspect of the present invention provides a method of generating a pay-table for a trajectory-based game of chance. The method may be generally characterized as comprising: 1) inserting a plurality of 3-D game objects into a 3-D gaming environment wherein each of the plurality of 3-D game objects is assigned an initial state; 2) generating a trajectory for each of the 3-D game objects in the 3-D gaming environment, the trajectory of each 3-D game object comprising: the initial state in the 3-D gaming environment, a final state in the 3-D gaming environment, and one or more states in the 3-D gaming environment between the initial state and the final state; 3) assigning a game outcome for the trajectory-based game of chance from a set of game outcomes to the final state of each 3-D game object in the 3-D gaming environment; and 4) generating a pay table that relates each game outcome in the set of game outcomes to a probability of that game outcome occurring.

In particular embodiments, the initial state may comprise an initial position and an initial velocity. The trajectory for each of the 3-D game objects may be planar. The trajectory-based game of chance may be a pachinko game. The 3-D game object may be a sphere or a polyhedron.

The method may also comprise one or more of the following: a) installing the paytable on a gaming machine and generating game outcomes for a plurality of trajectory-based games of chance using the paytable, b) generating a set of game outcomes, c) generating a trajectory table that relates each game outcome in the set of game outcomes to one or more different initial states wherein each of the one or more different initial states is for generating a trajectory corresponding to its related game outcome and d) installing the paytable, the 3-D gaming environment and the trajectory table on a gaming machine; on the gaming machine, generating a first game outcome using the pay table; selecting an initial state for the first game outcome using the trajectory table; and generating in the 3-D gaming environment a first trajectory corresponding to the first game outcome using the initial state selected from the trajectory table. The method may also comprise generating the 3-D gaming environment for the trajectory-based game of chance. The 3-D gaming environment may comprise data and/or instructions for generating; a plurality of 3-D objects; a plurality of trajectory rules for determining the trajectory of a moving 3-D object in the 3-D gaming environment; a plurality of collision rules for determining effects of a collision between 3-D objects in the 3-D gaming environment; and a plurality of exit rules for removing the 3-D game object from the 3-D gaming environment.

Another aspect of the present invention provides a method of generating a game outcome presentation in a trajectory-based game of chance. The method may be generally characterized as comprising: 1) along a trajectory of a 3-D game object in a 3-D gaming environment wherein the trajectory comprises a sequence of states of the 3-D game object in the 3-D gaming environment and wherein each states comprises at least a position and a velocity of the 3-D game object; generating a first state in the sequence of states of the 3-D game object along its trajectory; and 2) generating a second state in the sequence of states of the 3-D game object along its trajectory that is related to the first state by a plurality of trajectory rules; where one or more two-dimensional images are rendered of the 3-D game object along its trajectory in the 3-D gaming environment as part of the game outcome presentation for the trajectory-based game of chance.

In particular embodiments, the trajectory rules may simulate one or more of gravitational forces, frictional forces and environmental forces on the 3-D game object. The velocity of the 3-D game object along its trajectory may be planar. Further, the velocity of the 3-D game object along its trajectory may comprise one or more of translational velocity components, rotational velocity components, vibrational velocity components and combinations thereof. The plurality of trajectory rules may be determined at each location in the 3-D gaming environment. Therefore, a plurality of trajectory rules at a first location in the 3-D gaming environment may be different than a plurality of trajectory rules at a second location in the 3-D gaming environment. The trajectory-based game of chance may be a pachinko game. The 3-D game object may be a sphere or a polyhedron.

The method may further comprise one or more of the following: a) determining a game outcome for the trajectory-based game of chance; looking up in an initial position and an initial velocity of the 3-D game object in a trajectory table that corresponds to the determined game outcome and assigning the initial position and the initial position of the 3-D game object to the first state, b) after generating a position and a velocity of the 3-D game object at the second state, assigning the position and the velocity of the 3-D game object at the second state to the first state and generating a new second state, d) determining that the 3-D game object has exited the 3-D gaming environment between the first state and the second state; removing the 3-D game object from the 3-D gaming environment; and displaying the game outcome for the 3-D game object, and e) determining the plurality of trajectory rules that are used to relate the first state to the second state.

In another embodiment, the method may further comprise detecting an intersection of the 3-D game object with a surface in the 3-D gaming environment between the first state and the second state. In response to detecting the intersection, the method may comprise one or more of the following: a) terminating the trajectory of the 3-D game object and removing the 3-D game object from the 3-D gaming environment, b) generating a new position for the second state different from the position of the second state wherein the 3-D game object appears to move discontinuously from the first state to the second state (The new position may be located in a bonus area of the 3-D gaming environment.), c) modifying a property of the 3-D game object where the property of the 3-D game object that is modified is selected from the group consisting of a mass property, a geometry property, a graphical rendering property, a sound property and a bonus property, d) modifying a property of an object in the 3-D gaming environment, e) triggering a bonus game, f) triggering a game event, g) splitting the 3-D game object into a plurality of 3-D game objects and h) modifying a velocity component of the 3-D game object where the velocity component is selected from the group consisting of a translational velocity component, a rotational velocity component and a vibrational velocity component.

In another embodiment, the method may comprise: after generating the second state, between the first state and the second state, detecting a collision between the 3-D game object and a second object in the 3-D gaming environment. The second object may be a second game object. In response to detecting the collision, the method may comprise one or more of the following: i) generating an pre-collision state for the 3-D game object and the second object; generating a post-collision state for the 3-D game object and the second object wherein the pre-collision state and the post collision state are related by a plurality of collision rules; and assigning the post-collision state for the 3-D game object to the second state, ii) determining the plurality of collision rules that are used to determine effects of the collision between the 3-D game object and the second game object which may vary from location to location in the 3-D gaming environment and from object to object, iii) modifying a property of the 3-D game object where the property of the 3-D game object that is modified is selected from the group consisting of a mass property, a geometry property, a graphical rendering property, a sound property and a bonus property, iv) modifying a property of the second object where the property of the second object that is modified is selected from the group consisting of a mass property, a geometry property, a graphical rendering property, a sound property and a bonus property, v) triggering a bonus game, vi) triggering a game event in the trajectory based game of chance, vii) splitting the 3-D game object into a plurality of 3-D game objects, viii) terminating the trajectory of the 3-D game object and removing the 3-D game object from the 3-D gaming environment.

Another aspect of the present invention provides a gaming machine. The gaming machine may be generally characterized as comprising: 1) a master gaming controller designed or configured i) to control a game of chance played on the gaming machine, ii) to generate a trajectory of a 3-D game object in a 3-D gaming environment used in a trajectory-based game of chance, iii) to render a sequence of two-dimensional images from the 3-D gaming environment wherein the sequence of two-dimensional images comprises one or more two-dimensional images of the 3-D game object along its trajectory and iv) to generate a game outcome for the trajectory-based game of chance; and 2) a video display for displaying the sequence of two-dimensional images as part of a game outcome presentation for the trajectory-based game of chance. The gaming machine may further comprise a sound projection device wherein the sound projection device is used to at least emit sounds in response to collisions between the 3-D game object and 3-D objects along its trajectory in the 3-D gaming environment.

In particular embodiments, the trajectory-based game of chance may be a pachinko game. Further, the game of chance controlled by the gaming machine may be selected from the group consisting of a slot game, a keno game, a poker game, a pachinko game, a black jack game, a bingo game, a baccarat game, a roulette game, a dice game, a card game and a trajectory based game of chance. The 3-D game object may be a sphere or a polyhedron. The trajectory of the 3-D game object may be planar. A plurality of trajectory-based games of chance may be played in parallel. The sequence of images rendered from the 3-D gaming environment may be displayed simultaneously on a plurality of displays.

In another embodiment, the gaming machine may further comprise: a memory storage device for storing at least one of i) instructions, ii) data and iii) combinations thereof for generating the 3-D gaming environment. The 3-D gaming environment may comprise data and/or instructions for generating: a) a plurality of 3-D objects; b) a plurality of trajectory rules for determining the trajectory of a moving 3-D object in the 3-D gaming environment; c) a plurality of collision rules for determining effects of a collision between 3-D objects in the 3-D gaming environment; and d) a plurality of exit rules for removing the 3-D game object from the 3-D gaming environment. The gaming machine may also comprise a memory storage device for storing a pay table for the trajectory-based game of chance and a memory storage device for storing a trajectory table for the trajectory-based game of chance where the trajectory table contains data that relates one or more initial trajectory states for the 3-D game object to the game outcome for the trajectory based game of chance. A single memory storage device or multiple memory storage devices may be used to store the 3-D gaming environment, the pay-table and the trajectory table.

In yet another embodiment, the gaming machine may further comprise a user interface for the trajectory-based game of chance. The user interface may comprise: 1) a first input device; and 2) one or more sensors connected to the first input device used to detect an operational parameter of the input device and generate an output signal corresponding to the operational parameter wherein the output signal is used to at least one of i) to initiate the trajectory-based game of chance, ii) to generate an initial state of the 3-D object for its trajectory in the 3-D gaming environment, and iii) combinations thereof. The first input device may be a plunger where the one or more sensors are designed to generate an output signal with information indicating at least one of i) an amount of force applied to the plunger, ii) an actuation of the plunger has been initiated and iii) combinations thereof. The first input device may also be a touch screen display where the one or more sensors are touch screen sensors. The touch screen sensors may generate an output signal with information indicating a selected amount of force displayed on the touch screen display.

Further, the user interface may comprise: a) a ball; b) a ball conduit for the ball; and c) one or more sensors designed to measure a position of the ball along the ball conduit where the plunger is designed to strike the ball at an initial position on the ball conduit such that the ball is propelled along the ball conduit away from its initial position and where the ball conduit is designed to return the sphere to the initial position on the ball conduit. The user interface may comprise a sound projection device where the sound projection device emits a sound in response to the plunger striking the ball. The volume of the sound may be proportional to the force applied to the plunger. The user interface may also comprise a light panel comprising a plurality of lights where a number of lights are lit on the light panel in proportion to the amount of force applied to the plunger. The user interface may comprise a graphical force meter on the display screen where the amount of force applied to the plunger is displayed on the graphical force meter.

In another embodiment, the user interface may further comprise a second input device where the second input device is for selecting a rate at which a plurality of trajectory-based games of chance are automatically initiated. The second input device may be a touch screen display or a control knob where a position of the control knob is used to select the rate at which a plurality of trajectory-based games of chance are automatically initiated. The user interface may comprise an additional input device where the additional input device is for selecting a wager amount for each of a plurality of trajectory-based games of chance. Again, the second input device may be a touch screen display. The user interface may comprise an additional input device where the additional input device is for selecting one or more of a shape of the 3-D game object, a property of the 3-D game object and a property of the 3-D gaming environment. Once again, the second input device may be a touch screen display.

Another aspect of the present invention provides a product comprising at least one of i) data, ii) instructions and iii) combinations thereof for representing a 3-D gaming environment for a trajectory-based game of chance. The 3-D gaming environment being provided on a computer readable medium and comprising data and/or instructions for generating: 1) a plurality of 3-D objects; 2) a plurality of trajectory rules that are used to determine the trajectory of a moving 3-D object in the 3-D gaming environment; 3) a plurality of collision rules that are used to determine effects of a collision between 3-D objects in the 3-D gaming environment; and 4) a plurality of exit rules that are used to remove the moving 3-D object from the 3-D gaming environment where the 3-D gaming environment is for rendering a sequence of two-dimensional images that are used as part of a game outcome presentation for the trajectory-based game of chance. The 3-D gaming environment may comprise a plurality of game levels. The trajectory rules may be defined at each location in the 3-D gaming environment where the trajectory rules at a first location are different than the trajectory rules at a second location in the 3-D gaming environment. The 3-D gaming environment may comprise one or more bonus areas that are for rendering a bonus game presentation.

Another aspect of the present invention provides a user interface for a gaming machine. The user interface may be generally characterized as comprising: 1) an input device; and 2) a sensor connected to the input device used to detect an operational parameter of the input device and generate an output signal corresponding to the operational parameter wherein the output signal is used to at least one of i) to initiate a trajectory-based game of chance, ii) to generate an initial state of a 3-D game object for its trajectory in a 3-D gaming environment, and iii) combinations thereof where the 3-D gaming environment is for rendering a sequence of two-dimensional images that are used as part of a game outcome presentation for the trajectory-based game of chance. The trajectory-based game of chance may be a pachinko game.

In particular, the first input device may be a plunger where the one or more sensors are designed to generate an output signal with information indicating at least one of i) an amount of force applied to the plunger, ii) an actuation of the plunger has been initiated and iii) combinations thereof. The user interface with the plunger may also comprise: a) a ball; b) a ball conduit for the ball; c) and one or more sensors designed to measure a position of the ball along the ball conduit where the plunger is designed to strike the ball at an initial position on the ball conduit such that the ball is propelled along the ball conduit away from its initial position and wherein the ball conduit is designed to return the ball to the initial position on the ball conduit. The user interface with the plunger and the ball may also comprise a sound projection device wherein the sound projection device emits a sound in response to the plunger striking the ball. The volume of the sound is proportional to the force applied to the plunger which may be measured by one or more sensors. The user interface with the plunger may also comprise a light panel comprising a plurality of lights wherein a number of lights are lit on the light panel in proportion to the amount of force applied to the plunger.

Another aspect of the invention pertains to computer program products including a machine-readable medium on which is stored program instructions for implementing any of the methods described above. Any of the methods of this invention may be represented as program instructions and/or data structures, databases, etc. that can be provided on such computer readable media.

These and other features of the present invention will be presented in more detail in the following detailed description of the invention and the associated figures.

BRIEF DESCRIPTION OF THE FIGURES

FIG. 1B is a block diagram describing trajectory rules and collision rules for two objects in the 3-D gaming environment described with respect to FIG. 1A.

DESCRIPTION OF THE PREFERRED EMBODIMENTS

Figure 1A:
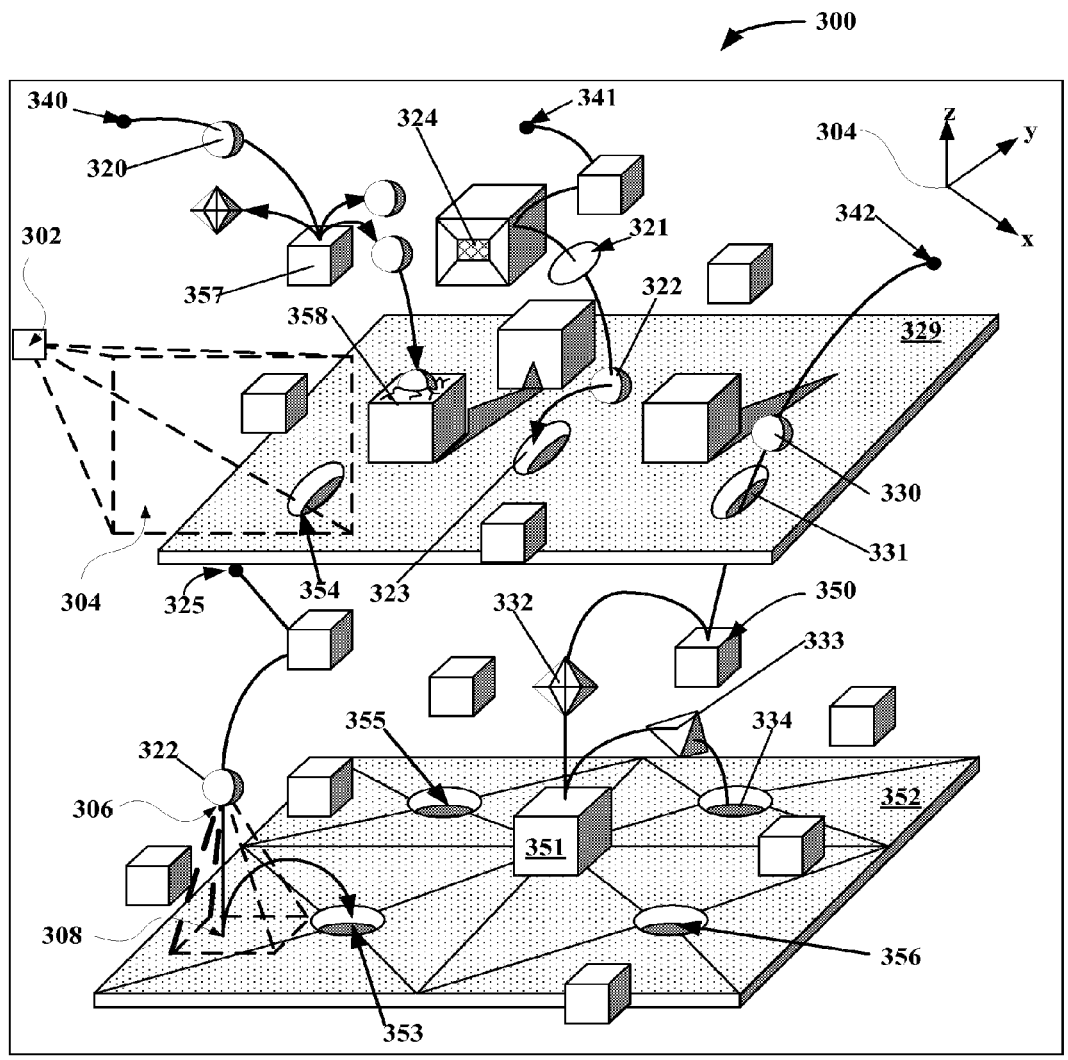
FIG. 1A is a perspective drawing of a plurality of trajectories for game objects in a 3-D gaming environment.

In the present invention, trajectory-based games of chance are described that may be implemented on a video gaming machine. In a trajectory-based game of chance, a trajectory of a game object may be generated in a 3-D gaming environment. A wager may be made on an aspect of the game object's trajectory in the gaming environment such as a termination location for the trajectory of the game object. The aspect of the game object's trajectory may occur according to a known probability. Hence, an award for the trajectory-based game of chance may be proportional to the probability of the aspect of the game object's trajectory occurring.

As an example, the gaming environment may be designed with one hundred exits where the trajectory of the game object always ends in one of a hundred of exits in the gaming environment and where there is an equal probability of the game object landing in a particular exit. The game object may be a sphere. A wager for this trajectory-based game of chance may be based upon the exit where the sphere lands at the end of its trajectory. Therefore, the aspect of the trajectory for which the wager is made is the final state of the sphere's trajectory. The award for this trajectory-based game of chance may be even money where the sphere landing in one of 49 of the exits results in an award and where the sphere landing in one of 51 of the exits results in no award and a loss of the wager.

The gaming environment may be a simulation implemented on a computing device on the gaming machine. The gaming environment may comprise data and/or instructions for generating: 1) objects and their properties that are located in the gaming environment, 2) trajectory rules for determining the trajectory of the game object and other objects in the gaming environment, 3) collision rules for determining effects of a collision between objects in the gaming environment and 4) exit rules for determining when the game object or other objects are removed from the gaming environment.

A game sequence for the trajectory-based game of chance played on a gaming machine by a player may consist of the following steps by the player and the gaming machine 1) make wager (player), 2) initiate game (player), 3) determine game outcome (gaming machine) and 4) generate game outcome presentation (gaming machine). The game outcome may be determined before or after the game outcome presentation is generated. As part of the game outcome presentation, the trajectory of game object in the gaming environment is generated by the gaming machine and is presented to the player on one or more display screens on the gaming machine. Besides the visual display of the game object's trajectory, the game outcome presentation may include additional visual effects, audio effects and other effects designed to stimulate a player's senses that are generated on the gaming machine interface. In general, the format of the game outcome presentation is designed to at least allow the player to view the aspect of the trajectory upon which an award for the trajectory-based game of chance is based. For instance, in the example described above where a spherical game object travels through the gaming environment and exits through one of a hundred exits, the game outcome presentation may comprise displaying the sphere along its trajectory in the gaming environment until it leaves the gaming environment through one of the exits. The exits may be labeled so that the player can determine whether they have won an award.

Figure 2:
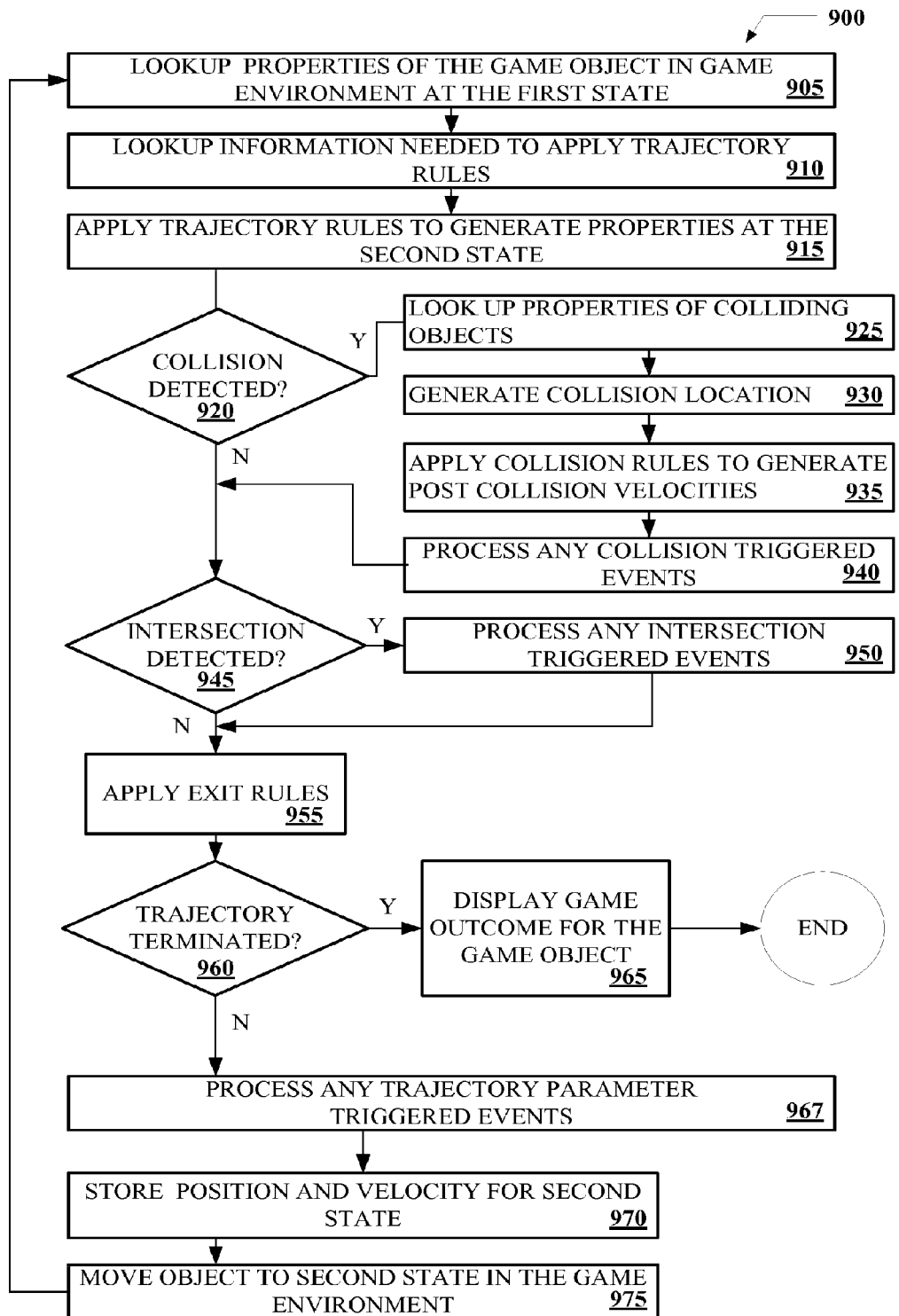
FIG. 2 is a flow chart depicting a method of generating a trajectory for a game object in a 3-D gaming environment.
Figure 3:
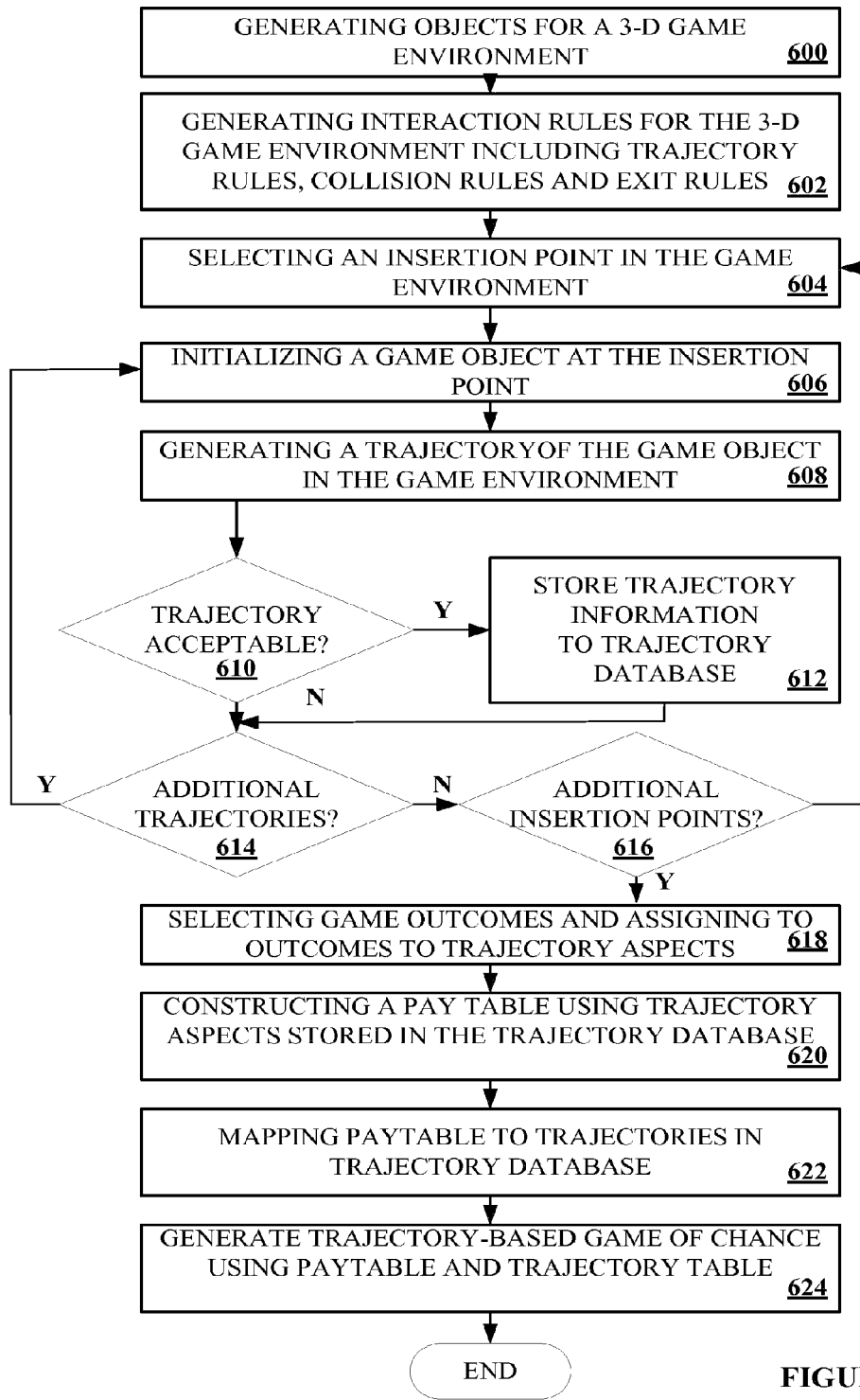
FIG. 3 is a flow chart depicting a method of generating a pay-table for a trajectory-based game of chance.
Figure 4:
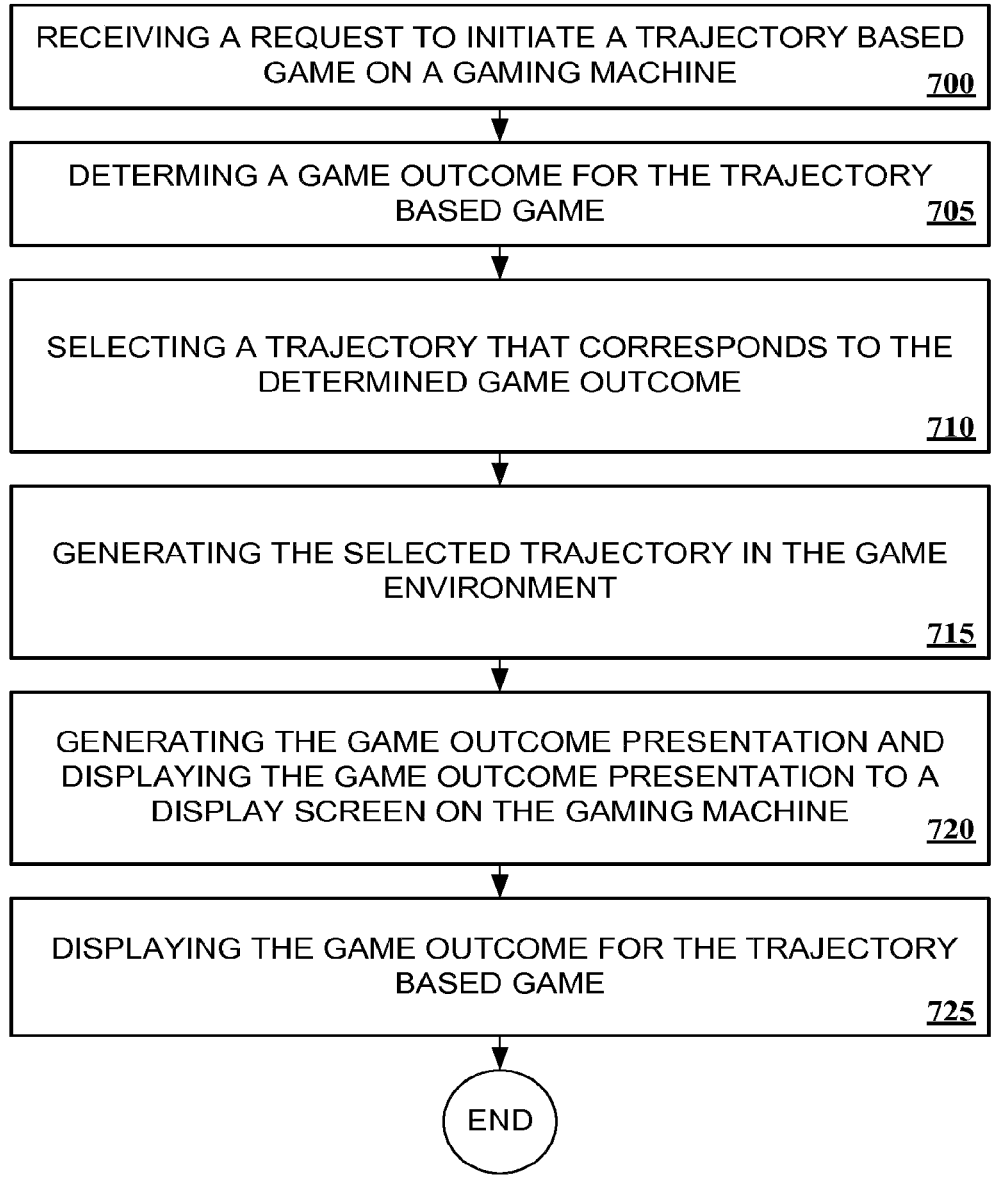
FIG. 4 is a flow chart depicting a first method of generating a trajectory-based game of chance on a gaming machine.
Figure 5:
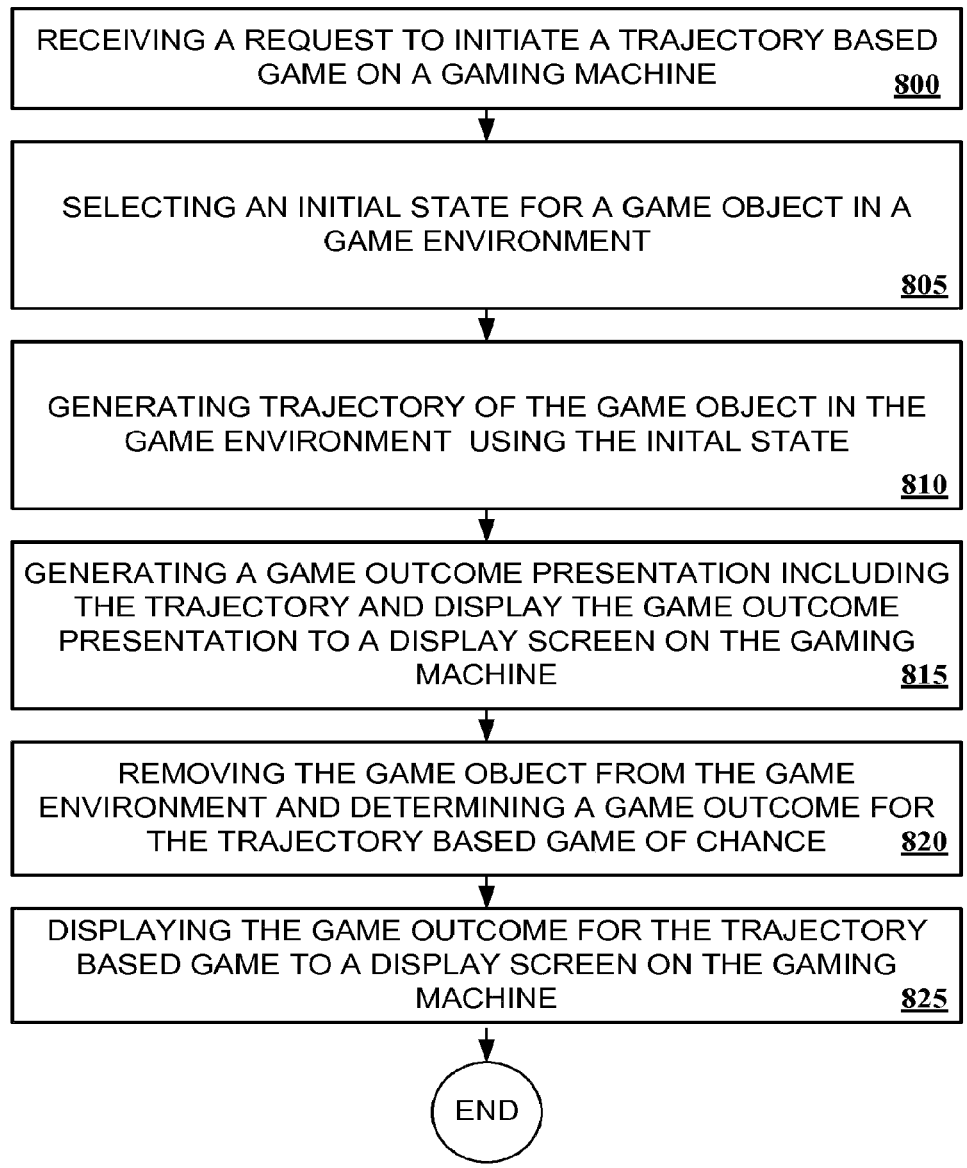
FIG. 5 is a flow chart depicting a second method of generating a trajectory-based game of chance on a gaming machine.
Figure 6:
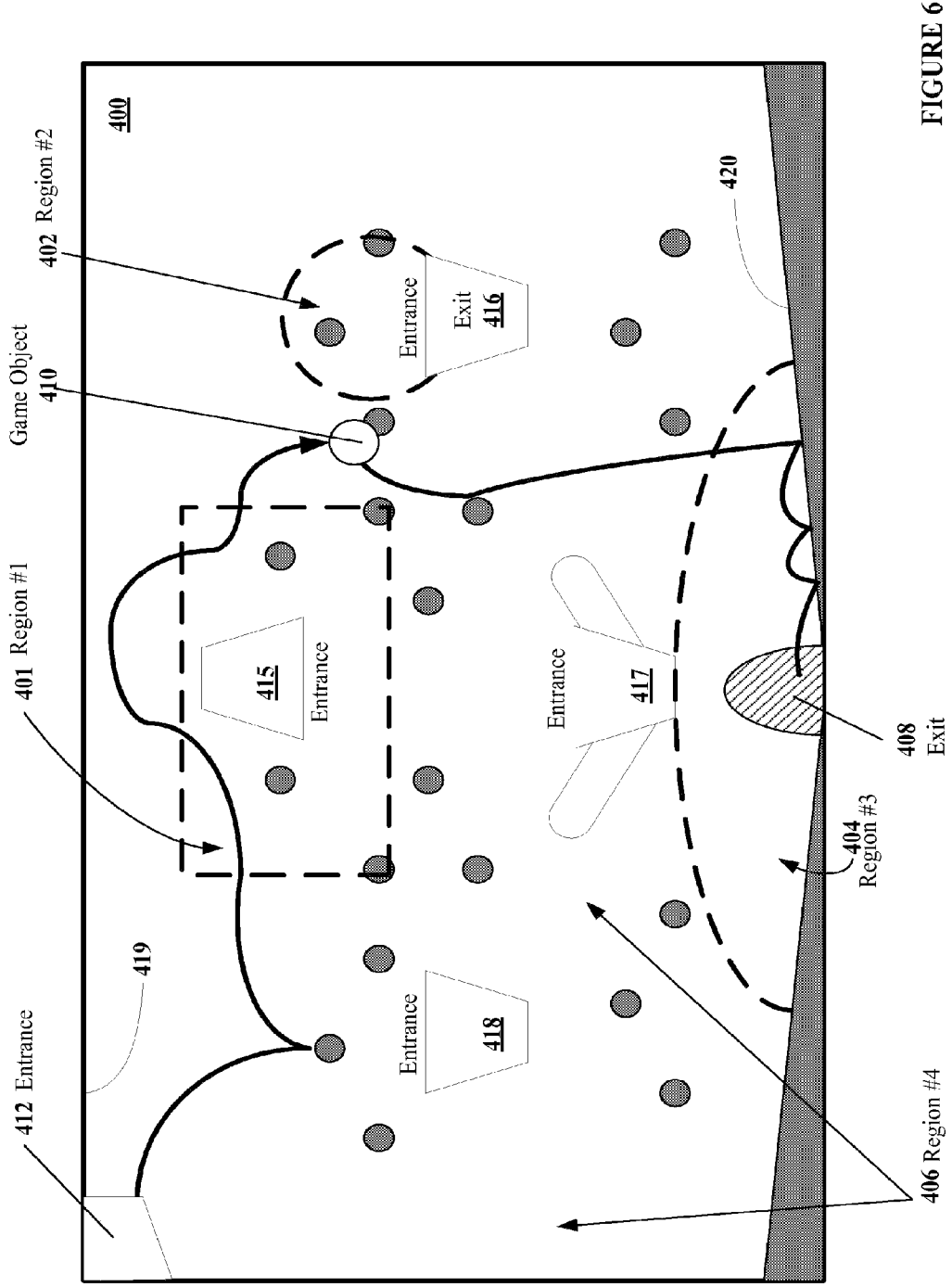
FIG. 6 is a block diagram of a gaming environment where the physical properties vary as a function of space and time.
Figure 7:
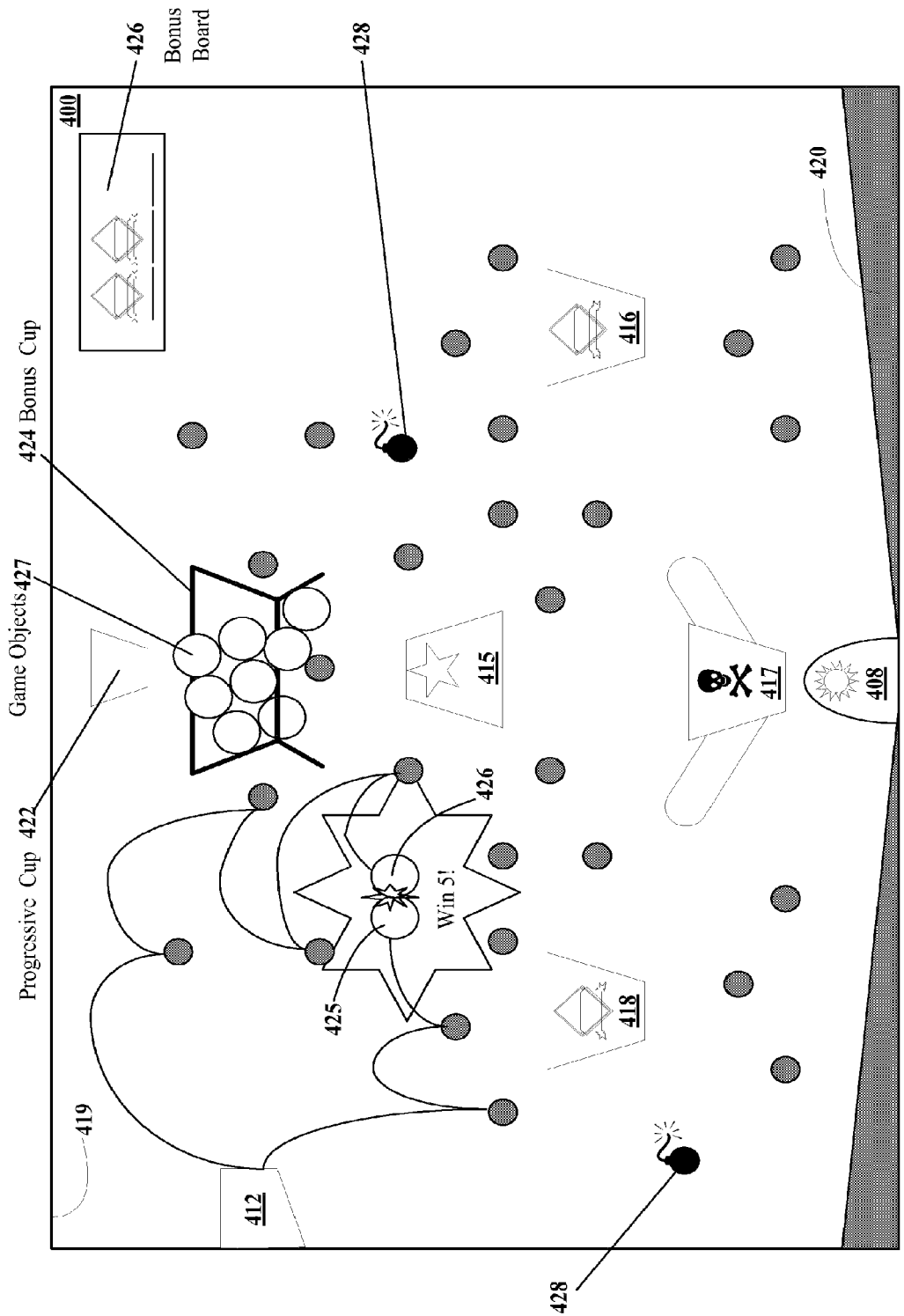
FIG. 7 is a block diagram used to described bonusing methods for a 3-D trajectory-based game of chance.
Figure 8:
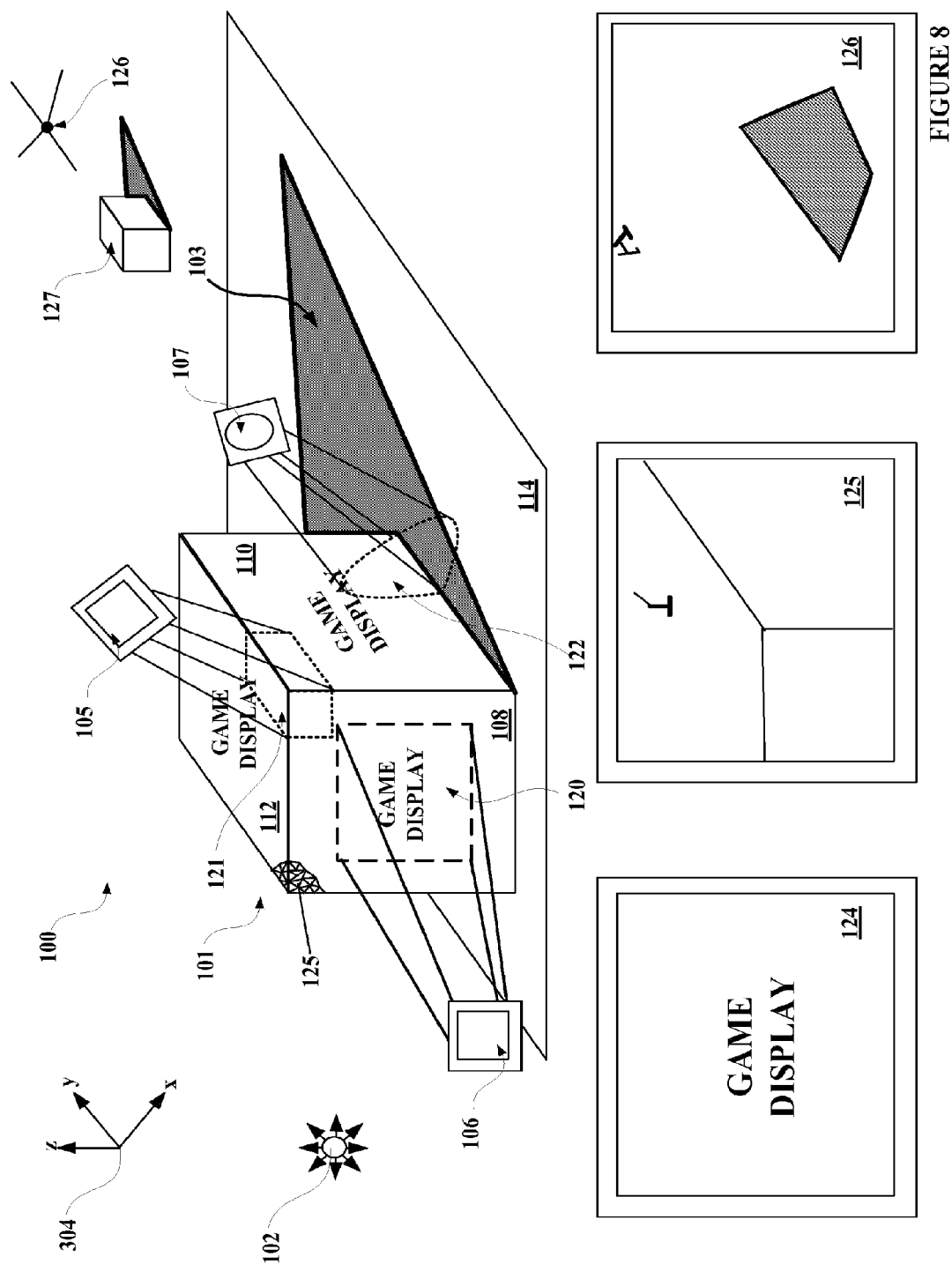
FIG. 8 is a perspective drawing of a 3-D gaming environment implemented on a gaming machine for one embodiment of this invention.
Figure 9:
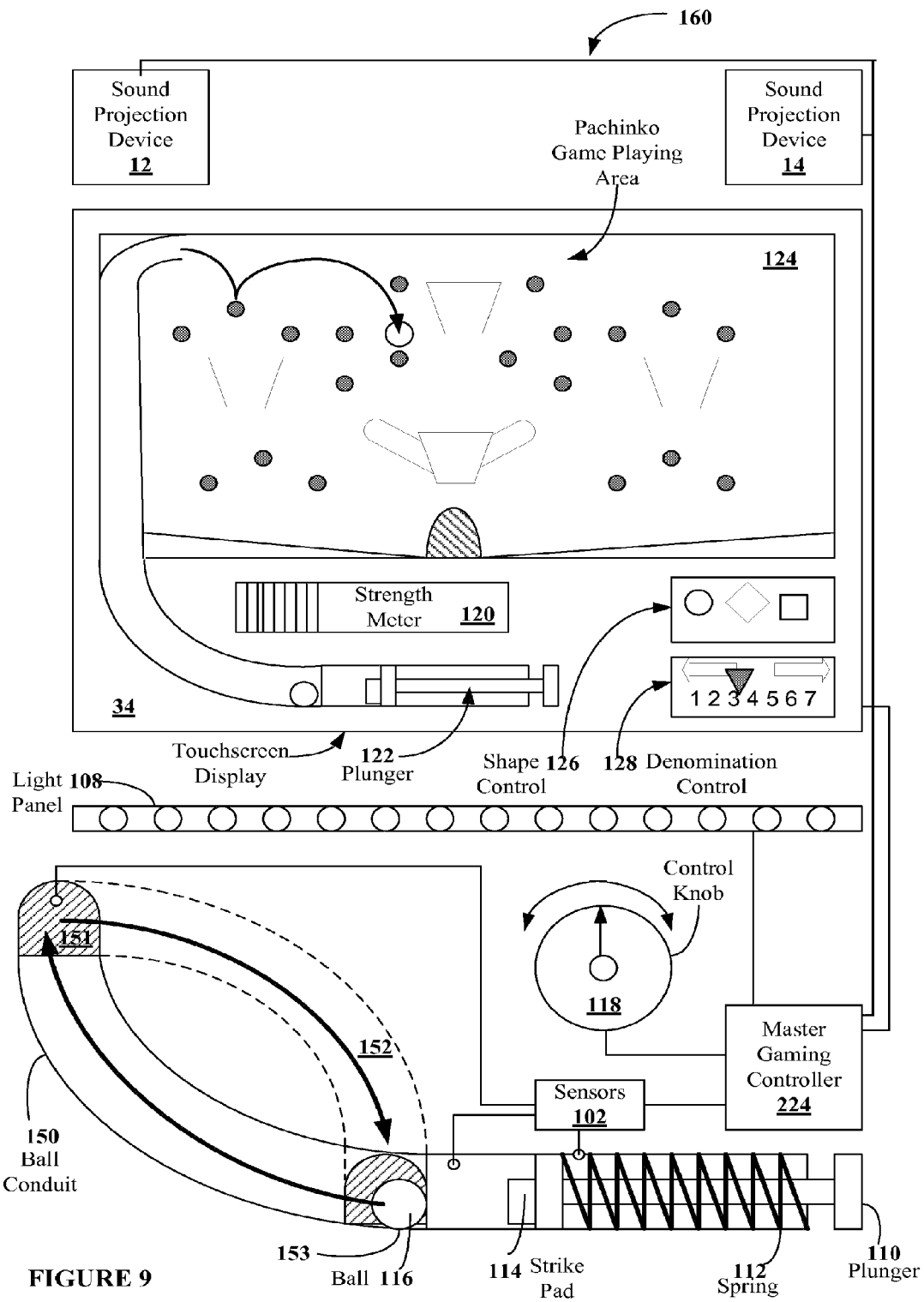
FIG. 9 is a block diagram depicting a hardware interface for a 3-D trajectory based game of chance.
Figure 10:
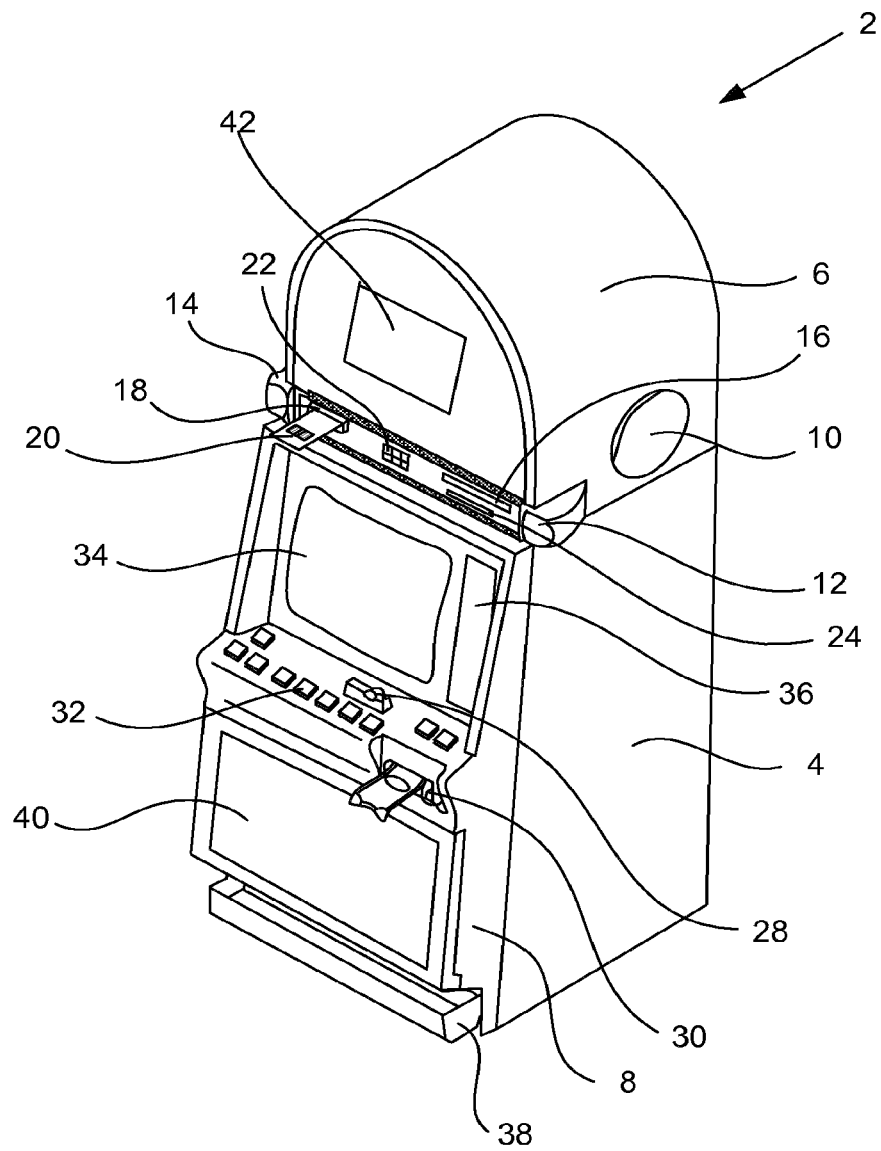
FIG. 10 is a perspective drawing of a gaming machine for one embodiment of the present invention.
Figure 11:
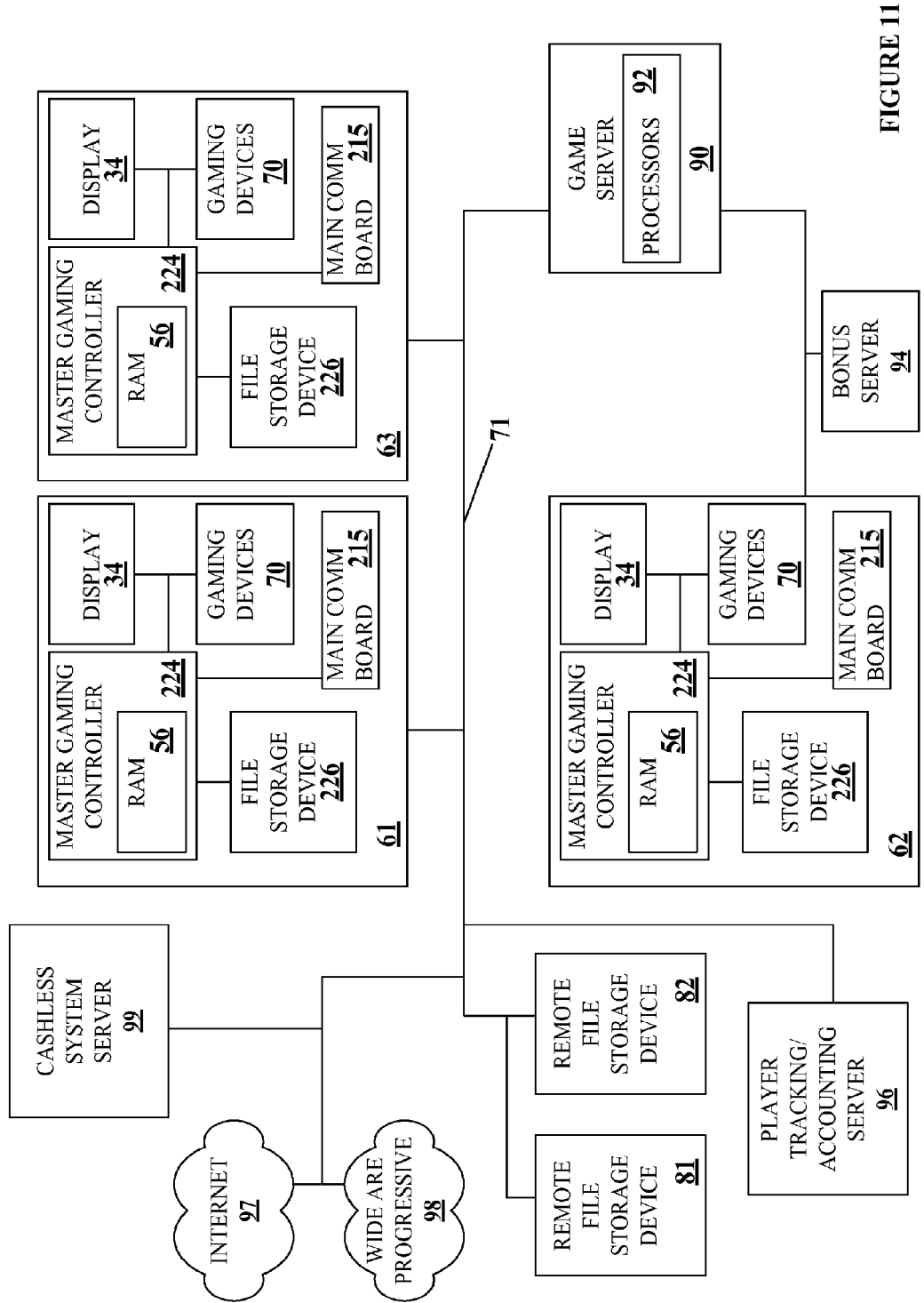
FIG. 11 is a block diagram of a gaming network for one embodiment of the present invention.

In FIG. 1A, general aspects of a gaming environment and a game object's trajectory in the gaming environment for a trajectory-based game of chance are described. In FIG. 1B, simulation techniques for generating the trajectory of a game object are discussed. In FIG. 2, a method of generating the trajectory for the game object is described. In FIG. 3, a method of generating a paytable for the trajectory-based game of chance is described. In FIGS. 4 and 5, two methods of generating the trajectory-based game of chance on a gaming machine are described. In FIG. 6, trajectory rules for the gaming environment that may vary according to time and location are described. In FIG. 7, bonus games for trajectory-based games of chance are described. In FIG. 8, details of methods of rendering 2-D images from a 3-D gaming environment used for the trajectory-based game of chance are described. In FIG. 9, mechanical interfaces for trajectory-based games of chance on a gaming machine are described. In FIGS. 10 and 11, gaming machines and a gaming machine network that may be used with trajectory-based games of chance are described.

In one embodiment of the present invention, the gaming environment and the game objects may be generated in 3-D dimensions. To generate a game outcome presentation, a sequence of 2-D images may be rendered from the 3-D gaming environment using a virtual camera. The 3-D gaming environment 300 may comprise data and/or instructions for generating: 1) a plurality of 3-D objects; 2) a plurality of trajectory rules that are used to determine the trajectory of a moving 3-D object in the 3-D gaming environment; 3) a plurality of collision rules that are used to determine effects of a collision between 3-D objects in the 3-D gaming environment; and 4) a plurality of exit rules that are used to remove the moving 3-D object.

The 3-D gaming environment 300 may be comprised of a plurality of 3-D objects and surfaces. For example, in FIG. 1A, the 3-D gaming environment is comprised of a number of rectangular boxes and two solid planar surfaces with holes. The upper planar surface has three holes and the lower planar surface has four holes. The 3-D objects are defined in a rectangular coordinate system 304 with x, y, and z directions.

When a 3-D gaming environment 300 is generated, a number of 3-D objects/surfaces in the 3-D gaming environment, a location of 3-D objects/surfaces in the 3-D gaming environment and a shape of 3-D objects in the 3-D gaming environment 300 may be varied and is not limited to the example in FIG. 1A. The shapes of 3-D objects modeled in the 3-D gaming environment may be simple or complex. For instance, the rectangular boxes, spheres (e.g., 320, 322, 326, 330), diamond 332 and pyramid 333 are examples of simple shapes. Multi-dimensional models of people, buildings, landscapes and casino interiors are examples of complex objects that may be modeled in a 3-D gaming environment. Further details of modeling 3-D objects in the present invention are described with respect to FIG. 8.

The 3-D gaming environment may incorporate various themes and backgrounds. For instance, one theme and background may relate to a citiscape where the game objects used in the trajectory-based game of chance are launched into the city. In one embodiment, the player may be able to select backgrounds and gaming environments that correspond to different cities, such as Paris, New York and London. The gaming environment for each city may include objects that model buildings in each city.

The rectangular boxes are shown at fixed locations in the 3-D gaming environment 300. A position of 3-D objects in the 3-D gaming environment, such as the rectangular boxes may vary. For instance, one or more of the boxes may move around the gaming environment and collide with other 3-D objects in the gaming environment. Translational, rotational and vibrational velocities of 3-D objects may be simulated in the 3-D gaming environment. Further, different 3-D objects may be simulated with different combinations of these velocity components. For instance, some 3-D objects may translate around the gaming environment without rotating or vibrating while other 3-D objects may rotate or vibrate in place without translating.

The 3-D gaming environment may include a number of exits that are used to terminate the trajectory of an object and remove the object from the environment. In general, the exits in the gaming environment are not based upon location but based upon exit rules. The exit rules define a set of conditions that are used to determine when the trajectory of a moving object is terminated and the object is removed from the gaming environment. For example, the opening 354 in the first planar surface 329, and the four openings, 334, 353, 355 and 356, in the second planar surface, 352, may be used as exits for the gaming environment 300. An exit rule for these openings may be that when any object intersects a surface defining a mouth to the opening, then the trajectory of the object is terminated and the object is removed from the gaming environment 300. Another exit rule for the openings may be that only objects with a particular set of properties are removed when the object intersects the surface defining the mouth to the opening. For other objects without the required properties, the opening acts as a solid. For example, a spherical-shaped object that intersect the opening 354 may be removed the gaming environment while a diamond-shaped objects may bounce off of the opening 354.

The specification of exit rules may be considered part of the design of the gaming environment 300. Many different combinations of exit rules may be defined in the gaming environment 300. Further, the exit rules may vary as a function of time and from location to location in the gaming environment. Additional examples of exit rules that may be used with the present invention are as follows. One exit rule may be that when a moving object collides with a particular object the trajectory of the moving object is terminated and the moving object is removed from the gaming environment. In other embodiments, the exit rule may be that an object is removed from the gaming environment after one or more of the following: 1) after an amount of time, 2) after a number of collisions, 3) at random, 4) after a distance traveled along it trajectory, 5) after passing a velocity threshold, such as a maximum velocity or minimum velocity, and 6) combinations thereof.

The 3-D gaming environment may be generated with a plurality of game levels and/or regions with entrances connecting the levels or the regions. For example, a space above a first planar surface 329 may be used as a first game level in the trajectory-based game of chance. The space between the first planar surface 329 and the second planar surface 352 may be used as a second game level in the trajectory-based game of chance. The two openings in the first planar surface, 323 and 331, may be used to connect the first game level and the second game level.

In one embodiment, an opening may be used to transfer objects to a bonus space in the 3-D gaming environment. For instance, an object that passes through the opening 354 may be transferred to a bonus space modeled in the 3-D gaming environment. In another embodiment, a plurality of 3-D gaming environments may be modeled on the gaming machine. Therefore, an object that passes through one of the openings may be transferred to another 3-D gaming environment. In yet another embodiment, different 3-D gaming environments may be modeled on a plurality of different linked gaming machines and objects may be transferred between the gaming environments generated on different gaming machines. In addition, a plurality of linked gaming machines may share a common gaming environment. In the common 3-D gaming environment, trajectory-based games of chance may be initiated from each of the linked gaming machines in the 3-D gaming environment. On each gaming machine, 2-D images rendered from the shared gaming environment may be used in a game outcome presentation for trajectory-based game of chance initiated from that gaming machine. On a first gaming machine, the 2-D images may show one or more game objects used in trajectory-based games of chance initiated on gaming machines different than the first gaming machine.

As described above, in the trajectory-based game of chance, a wager may be made on an aspect of a 3-D game object's trajectory in the 3-D gaming environment. Typically, during its trajectory, the 3-D game object collides with many different combinations of objects before reaching a final state in its trajectory and being removed from the gaming environment, such as leaving the 3-D gaming environment through an exit. During the game outcome presentation, the interaction of the 3-D game object with various objects in the 3-D gaming environment 300 along its trajectory and the uncertainty of the final destination of the 3-D game object adds to the excitement of the trajectory-based game of chance.

Some examples of aspects of the trajectory of the game object that may be used to provide a basis for a wager are as follows. A wager may be made upon: 1) an exit that the game object leaves the gaming environment, 2) a number of collisions between the game object and other objects along its trajectory, 3) a length of time for the trajectory, 4) a distance traveled by the game object along its trajectory, 5) a final location of the game object, 6) a final velocity of the game object and 7) combinations thereof. The present invention, however, is not limited to these examples.

After a wager has been made and the trajectory-based game of chance has been initiated, a 3-D game object with an initial state may be introduced into the 3-D gaming environment 300. The initial state of the 3-D game object may comprise information about a number of properties about the game object including but not limited to 1) an initial position in the coordinate system, 2) an initial velocity which may include a translational velocity, a rotational velocity, a vibrational velocity and combinations thereof, 3) mass properties, 4) a geometry, 5) physical properties, 6) graphical rendering properties, 7) sound properties and 8) bonus properties. The properties for the 3-D object specified in the initial state may be used to generate the 3-D game object's trajectory in the gaming environment and the game outcome presentation associated with the 3-D game object.

The trajectory of the 3-D game object may be viewed as comprising a sequence of trajectory states with an initial state, a final state and one or more states between the initial state and the final state. The trajectory states describe the 3-D game object's path through the 3-D gaming environment including its position and velocity as a function of time. The trajectory of the game object in a 3-D gaming environment including the various trajectory states may be formatted for a game outcome presentation on the gaming machine.

A format used to present the trajectory to the game player is important. In some formats, the trajectory of the game object in the 3-D gaming environment may not be of particular interest to a game player. For example, the trajectory of the game object may be represented as list of numbers indicating the position and velocity of the game object as a function of time. Displaying these numbers on a display screen on the gaming machine would likely not be of particular interest to most game players. Thus, the trajectory of the game object in the gaming environment is converted into a format that provides entertainment to the game player. The format is typically referred as a game outcome presentation.

The game outcome presentation may comprise a sequence of presentation states. The presentation states describe a presentation of the trajectory states on a gaming machine interface. The presentation states may include but are not limited to images, visual effects, sound effects and other effects that are designed to stimulate a player's senses while the player is playing the trajectory-based game of chance on the gaming machine. Typically, the images from the presentation states allow the player to view the 3-D game object's progression along its trajectory in the 3-D gaming environment. Details of presentation states and method of generating the presentation states for a gaming machine interface that may be used with the present invention are described in co-pending U.S. application Ser. No. 10/041,212, by Breckner, et al. and titled, "Decoupling Of The Graphical Presentation of A Game From The Presentation Logic" which is incorporated herein in its entirety and for all purposes.

As described above, when the 3-D game object is inserted into the 3-D gaming environment, the initial state for the 3-D game object may describe a number of properties of the 3-D game object. The properties may be used to generate the trajectory states of the object along its trajectory and corresponding presentation states that are used in a game outcome presentation. The initial position, the initial velocity, mass properties, the geometry and physical properties may be used to generate a trajectory of the 3-D game object in the 3-D gaming environment 300. These properties may also be defined for the 3-D objects in the 3-D gaming environment. The initial position and initial velocity of the 3-D game object in the initial state may be used as a set of initial conditions for generating the trajectory.

The mass properties may include but are not limited to a mass, a center of gravity for the 3-D game object and moments of inertia. The geometry for the 3-D game object may include a plurality of surfaces and/or data points that are used to describe the geometry of the 3-D game object. The physical properties may include but are not limited to a density, a surface elasticity of the object, and a drag coefficient. The physical properties that are specified may depend on the trajectory rules used to model the 3-D game object's motion (See FIG. 1B for more details). For instance, if the drag of the game object is modeled than an area and the drag coefficient of the object may be needed. Otherwise, these properties may not be required.

To generate the trajectory of the 3-D game object, the initial position, initial velocity, mass properties, the geometry and the physical properties of the 3-D game object and the properties of other objects in the 3-D gaming environment 300 may be used with a set of trajectory rules and a set of collision rules. The trajectory rules are used to describe the motion of the 3-D game object in the 3-D gaming environment. The trajectory rules may be a set of equations that are numerically integrated in time to generate the trajectory of the 3-D game object. The collision rules are used to determine the effects of collisions between the 3-D game object and other objects in the 3-D gaming environment along its trajectory. The collisions may result in a change in momentum for the 3-D game object and a corresponding change in velocity of the 3-D game object. The collision rules and trajectory rules are described in more detail with respect to FIG. 1B.

The graphical rendering properties, sound properties and bonus properties are used to generate the presentation states for the game outcome presentation of the trajectory-based game of chance. Typically, these properties are not used to simulate the 3-D game object's trajectory (e.g., position and velocity) in the gaming environment. However, these properties may be used to distinguish between different types of objects. For instance, red objects may be assigned one set of physical properties while blue objects may be assigned a different set of physical properties. The player may be able to distinguish between object's with different properties according to their color or some other graphical rendering property such as a texture or a shade.

The graphical rendering properties may describe, for example, a shading and a color of the 3-D game object along its trajectory. The shading and the color of the 3-D game object may be rendered into 2-D images used in a game outcome presentation that are derived from the 3-D gaming environment. Other graphical rendering properties are described in more detail with respect to FIG. 8.

The sound properties may be used to determine sounds that are generated when the 3-D game object collides with another object or surface in the 3-D gaming environment 300. The sounds may be used in a presentation state for the game outcome presentation of the trajectory-based game of chance. The bonus properties may be used to describe bonus game events that may be triggered when the 3-D game objects interacts with other objects along its trajectory. For example, in one embodiment of the present invention, a bonus game may be triggered when the 3-D game object collides with a particular object or surface along its trajectory in the 3-D gaming environment. The bonus properties for the 3-D game object may be used to determine what type of bonus game is generated. Further details of bonus games are described with respect to FIG. 6.

To illustrate the generation of trajectory states, a few examples of trajectories of 3-D game objects in the gaming environment are provided. The present invention is not limited to these examples. The examples are also used to illustrate methods that may be used to add excitement to the game outcome presentation for the trajectorybased game of chance. The methods of adding excitement to the game outcome presentation may involve changing the properties of the game object along its trajectory, changing the properties of other objects in the gaming environment and triggering game events, such as bonus games. These methods are used to add elements of unpredictability and variability to the trajectory-based game of chance that a game player may find entertaining.

In one embodiment of the present invention, the properties of the game object and the properties of objects in the gaming environment may be changed and game events may be triggered in response to different events that may occur along the trajectory of the game object. For example, the game object's properties and the properties of other objects in the gaming environment may be changed in response to collisions between the game object and other objects along its trajectory and to the game object passing through or entering a particular area in the gaming environment. Also, the properties of objects may be changed and game events may be triggered in response to the generation of a random number and to satisfying one or more conditions that are tracked in the trajectory-based game of chance. Bonus games and other aspects of the game outcome presentation such as the generation of audio effects and visual effects on the gaming machine may also be triggered by these events. Details of these effects in the context of three trajectories are described below.

For a first trajectory, a spherical game object 330 is inserted in the 3-D gaming environment at location 342 with an initial state of properties. Next, the spherical game object passes through an opening 331 in the planar surface 329. The spherical game object collides with a first rectangular box 350, which is an object in the 3-D gaming environment. In response, to the collision, the 3-D game object is transformed into a diamond shaped object 332. The diamond shaped object 332 then collides with a second rectangular box 351 and is transformed in to a pyramidal shaped game object 333. Then the game object leaves the gaming environment 300 through the exit 334. In general, the game object may be polyhedron with a plurality faces. The sphere 330, the diamond 332 and the pyramid 333 are examples of polyhedra that may be generated in the 3-D gaming environment 300 and used as game objects. Dice and coins (not shown) are other examples of polyhedra that may be generated in the 3-D gaming environment.

Along the trajectory starting at 342, the geometry of the game object 330 changes twice. The velocity of the game object changes direction, for instance, each time the game object bounces off the rectangular boxes, 350 and 351. Further, the magnitude of the velocity may change along its trajectory. For example, the game object 330 may accelerate or decelerate along its trajectory.

The physical and mass properties of the game object 330 may remain constant along its trajectory. For example, the trajectory and collisions for the game object 330 may be generated as though the game object 330 remains a sphere 330 with a specified elasticity and mass even after it changes shape to a diamond and then to a pyramid. As another example, the physical properties and mass properties of the game object may change along the trajectory. For instance, the elasticity of the game object 330 may be decreased or the mass of the object may be increased after each collision. When the properties of the game object are altered in this manner, the game object may rebound less and less after each collision.

The graphical rendering properties, sound properties and the bonus properties of an object may change along its trajectory. For example, each time the game object 330 collides with an object, its color may change. Thus, the game object 330 may start out red, turn green after hitting the first rectangular box 350 and turn gold after hitting the box 351. In a similar manner, the sound the game object 330 makes in response to a collision may also change along its trajectory. A first sound may be generated when the game object 330 collides with the first rectangular box 350 and a second sound may be generated when the game object collides with the second rectangular box 351.

Bonus properties for the game object may change along its trajectory. In one embodiment, a bonus event may be triggered on the gaming machine that is independent of the position and velocity of the game object along its trajectory. For instance, the bonus event may be triggered at random time intervals. At the initial state of 342, the game object 330 may be assigned a bonus property which is a number of free game objects where each game object may be used to play a trajectory based game of chance. As the game object 330 collides with different objects in the gaming environment 330, the bonus property, which is the number of free game objects associated with the game object 330, may increase or may decrease. When a bonus event is triggered during the game object's trajectory 330, the number of free game objects currently associated with the game object is awarded.

For example, the bonus property for the game object 330 may be 1 free game object at the initial state at 342 and may increase to 4 free game objects after collision with the first box 350 and may decrease to zero game objects after the collision with box 351. Therefore, along the game object's trajectory, when the bonus event is triggered at a time where the game object is between location 342 and the collision with box 350, one game object may be awarded. Between the collision with box 350 and the collision with box 351, 4 game objects may be awarded if the bonus is triggered during this portion of the trajectory. Finally, after the collision with box 351, no game objects may be awarded if the bonus event is triggered during this portion of the trajectory.

In response to collisions, the properties of objects in the gaming environment 300, besides game objects, may change. For example, the first rectangular box may change color after it struck by the game object 330. As another example, the rectangular box 350 may change shape after a collision. For instance, the rectangular box 350 may appear dented after a collision with the game object 330. The dent may heal itself after a while or may remain in the box 350. In general, any of the properties of the game object and the second object may change in response to a collision including but not limited to the geometry properties, the mass properties, the physical properties, the graphical rendering properties, the bonus properties and the sound properties. Also, all or a portion of the properties may remain constant after a collision. For example, the game object's shape or color may not change in response to a collision.

A collision between a game object and a second object in the gaming environment may induce motion in the second object. For instance, when the first rectangular box 350 is struck by the game object 330, it may begin to translate, to rotate or to vibrate in response to the collision. The box 350 may rotate in place or vibrate in place and then stop after a while or it may begin to translate around the gaming environment. For example, the box 350 may vibrate as though it were attached to an invisible string that ran through the center of the box and was anchored on both ends.

In response to a collision between objects in the gaming environment 300, other aspects of the trajectory based game of chance may be modified besides the properties of the game objects. For example, in one embodiment, a bonus game in the trajectory-based game of chance may be triggered when the collision is detected. In another embodiment, a game event may be triggered when the collision is detected. The game event may be used trigger one or more presentation events in a presentation state of the trajectory-based game. For instance, as part of a presentation state, the game event may trigger an activation of a light panel located on the gaming machine, an activation of a bonus wheel on the gaming machine, the projection of a particular sound through speakers on the gaming machine or the generation of a new object in the gaming environment 300 that is rendered in the game outcome presentation.

A second trajectory for a spherical game object 322 is initiated at location 341. The spherical game object collides with a first rectangular box and a second rectangular box and passes through an area 321. In response to the intersection of the game object with the area 321, one or more properties of the game object 322, such as but not limited to a position, a velocity, a mass property, a geometry, physical properties, graphical rendering property, a sound property and a bonus property, may be modified. Also, in response to the intersection, these properties may be modified for other objects in the gaming environment.

As an example, in response to the intersection, the game object 322 may be transported to another location in the gaming environment in a discontinuous manner, such as being transported from the intersection location in the area 321 to a location 325. In yet another example, in response to the intersection, the game object may be instantaneously accelerated or decelerated. In general, one or more of the game object's translational, rotational and vibrational velocity components may be modified. In yet another example, in response the intersection with the area 321, the game object's shape or color may change. The area 321 may be as small as a single coordinate in the gaming environment 300. The operations described above may also be triggered when the game object may also passes through a volume instead of an area, such as 321.

In other embodiments, in response to the intersection between the game object 322 and the area 321, one or more of the following may be implemented: 1) the game object's trajectory may be terminated as part of an exit rule, 2) the game object may be removed from gaming environment as part of an exit rule, 3) a bonus game event may be triggered and 4) a game event may be triggered. For example, when the area that is intersected by the game object is an exit to the gaming environment, then the game object's trajectory is terminated and the game object is removed from gaming environment. In another example, when the area that is intersected by the game object is an entrance to a bonus storage area, such as a cup, the game object's trajectory may be terminated and the game object may be temporarily stored in the storage area. However, the game object is not removed from the gaming environment 300 and may later be reintroduced into the gaming environment in response to another game event. Details of bonus storage areas are further described with respect to FIG. 7.

After the game object 322 passes through the area 321, it bounces off the surface 329 and enters the opening 323. After passing through the opening 323, the game object is transported to location 325 in a discontinuous manner. This differs from the trajectory of the game object 330 that starts at location 342. In this trajectory, after the game object 330 passes through the surface 329 through opening 331, the game object's trajectory is continuous in that it is not altered when it passes through the opening. From location 325, the game object 322 collides off a rectangular box, bounces off a planar surface 352 and exits the gaming environment 300 through the exit 353.

A third trajectory for a spherical game object 320 is initiated at location 340. The game object 320 collides off a rectangular box 357 and splits into three game objects. In the present invention, in response to a collision with an object in the gaming environment which may include another game object or in response to the object passing through an area, such as area 321, the game object may be split into a plurality of objects. The split of the game object may be triggered by other events such as at random or in response to other parameters tracked in the gaming environment. The game object's velocity magnitude or a distanced traveled along its trajectory are two examples of parameters that may be tracked in the gaming environment. In this example, the game object 320 is split into three objects. Two of the objects are spherical shaped and one of the object is diamond shaped.

In one embodiment, the splitting of a first game object may result in a number of new game objects. For instance, when game object 320 is split into three objects. The three new objects may be treated as separate game objects in the trajectory-based of game of chance where a distinct trajectory is generated for each of these new game objects. This type of split may be implemented as part of a bonus game for the trajectory-based game of chance. In another embodiment, the game object may split into a number of pieces to simulate an explosion. In this case, after the explosive split, the new pieces comprising the game object may be removed from the gaming environment.

In yet another embodiment, rather than splitting into new objects, in response to a collision with an object in the gaming environment, which may include another game object, or in response to the object passing through an area, such as area 321, new objects, which may be game objects, may be introduced into the gaming environment 321. For example, the rectangular box 357 may store the spherical object and the diamond shaped object. When the game object 320 collides with the rectangular box 357, the spherical object and the diamond shaped object may be released from the box 327 along separate trajectories while the game object 320 continues along its trajectory. The diamond shaped object and the spherical object released from the box 327 may become new objects in the gaming environment 300 or these objects may become new game objects.

In a further embodiment, in response to a collision with an object in the gaming environment, in response to the object passing through an area, such as area 321, or in response to another conditions, such as at regular intervals, a size of an object may change. For example, when the game object 320 collides with rectangular box 357, the size of the game object 320 may increase/decrease and/or the size of the rectangular box may increase/decrease. In another example, a size of an opening, such as 331 or 356, may increase or may decrease as a function of time. Therefore, when the opening is large compared to a size of a game object, the game object may pass through the opening. When the opening is small compared to the size of a game object, the game object may bounce off the opening.

In response to a collision between two objects in the gaming environment, the two objects, rather than splitting, may merge into one another. For example, the game 320 after colliding with the rectangular box collides with a second rectangular box and embeds itself into a second rectangular box 358. After the collision, the game object may be stored in the rectangular box 358 and later released in response to a game event or the game object may be removed the gaming environment 300. In another example, two game objects may collide with one another and the two game objects, rather than bouncing off of one another or causing each other to explode, may merge together to create a single game object. Further, objects in the gaming environment 300 other than game objects may collide and merge with another and then split apart again at a later time.

In another embodiment of the present invention, in response to a collision or in response to an object passing through an area, objects, surfaces or exits may appear in the gaming environment or disappear from the gaming environment 300 or the objects, surfaces, exits may be modified in some manner. For instance, the opening 354 in the planar surface 329 may lead to a bonus area. The opening 354 may not appear until a game object (or another object in the gaming environment) collides with a particular object in the gaming environment or passes through an area in the gaming environment. When the opening 354 has not appeared in the planar surface 329, the surface where the opening 354 appears may behave as a solid surface and objects may collide off of it. When the opening 354 has appeared, then the game object may pass through the opening 354.

In general, one property that may change as a function of time in the gaming environment is the solidity of an object or a solidity of a surface. At one time, an object or surface in the gaming environment may behave as a solid that prevents objects from passing through it and at another time the object or the surface may act as a non-solid an allow objects to pass through them. For instance, the solidity of a game object may be changed so that the game object passes through one or more objects in the gaming environment rather than colliding with the object. As another example, the solidity of a surface, such as the planar surface 329, may change such that the game object 322 may bounce off it at one time and pass through it at another time. Further, surfaces may be selectively permeable allowing certain objects to through them while being impermeable to other objects.

In yet another embodiment, in response to an intersection or in response to a collision, an object or a surface may be actuated in a manner that opens or closes an opening in the gaming environment. For instance, in response to a collision or an intersection, a door blocking an exit may open, allowing an object to pass through it, or the door may close blocking objects from passing through it. In another example, a surface may slide back and forth between two adjacent openings in response to a collision, an intersection or at random. Therefore, when the first opening is blocked by the surface, the second opening is unblocked and when the second opening is blocked by the surface, the first opening is unblocked.

In a further embodiment, rather than an opening appearing or an opening disappearing, in response to a collision or an intersection, an object may appear in the gaming environment or the object may disappear from the gaming environment. For example, in response to a collision, a dome may appear over an exit that blocks objects from passing through the exit. As another example, a wall blocking an entrance to a portion of the gaming environment may be removed allowing objects to pass through the entrance in response to different events that may occur in the gaming environment.

As described above, collisions or intersections between objects and surfaces in the gaming environment 300 may be used to trigger various game events, such as the changing of one or more of a game object's properties. The surfaces or the objects involved in the collisions or intersections may be rendered as visible or invisible in the gaming environment. For example, the gaming environment 300 may be bounded by invisible or translucent walls. The invisible walls may deflect objects that collide with them. As another example, objects or surfaces in the gaming environment 300 that can be used to generate collisions or intersections, such as the rectangular boxes, 357 and 351, and the surface 321 may be rendered as invisible objects.

In general, the visibility characteristics of an object or a surface may vary with time. For example, a surface, such as area 321 may remain invisible until an object such as the game object 322 intersects the area 321. At the time of the intersection between the game object 322 and the area, the surface may become visible for a brief time and then become invisible again after a period of time. In another example, the box 351 may become visible and invisible at regular intervals.

As described above, collisions or intersections may be used to trigger different changes in the trajectory-based game of chance. The changes may also be triggered by other methods. In one method, a change in one of the aspects of the gaming environment, such as an object's properties, may be triggered at random. In another method, the change in one of the aspect of the gaming environment may be triggered based upon a time interval. For instance, a game object's shape may change at regular intervals in the gaming environment independent of any collisions or intersections by the game object. In yet another method, the change in one of the aspects of the gaming environment may be triggered after a sequence of conditions has occurred. For example, an opening in the gaming environment may not appear until a number of specific collisions and/or intersections has occurred between game objects and other objects in the gaming environment. In one embodiment, one of the conditions in a sequence of conditions may be based upon a wager made in the trajectory-based game of chance, such as an amount of the wager.

The generation of a trajectory of a game object in a 3-D gaming environment is only part of the generation of trajectory-based game of chance that is presented on a gaming machine. As described above, as part of a presentation state for the trajectory-based game of chance, which may include a plurality of effects that are designed to stimulate one or more the game player's senses, a sequence of 2-D images may be rendered from the 3-D gaming environment. The sequence of game images may be rendered using one or more virtual cameras in the 3-D gaming environment.

For the purposes of illustration, two virtual cameras, 302 and 306 are shown in the FIG. 1A. The first virtual camera is located at a location in front and above of the planar surface 329. The virtual camera is used to "capture" a portion of the 3-D gaming environment and to render the portion of the 3-D gaming environment to a 2-D image. The space in the 3-D environment captured by the first virtual camera 302 is represented by the dashed lines connected to the camera. A 2-D image of the space captured from the first virtual camera is shown in 312. The 2-D image 312 may be included in a sequence of 2-D images used as part of the game outcome presentation for the trajectory based game of chance.

The position of the virtual camera 302 does not capture any portion of the trajectories of the game objects in the gaming environment. The virtual camera may be positioned to capture all or a portion of one more of game object's trajectory in the 3-D gaming environment. The position of the virtual camera used in a trajectory-based game of chance may vary from one trajectory-based game of chance to another trajectory-based game of chance and does not have to remain fixed. The position of the virtual camera may also vary during the trajectory-based game of chance. Further, a plurality of virtual cameras may be used to generate the sequence of 2-D images used to generate the game outcome presentation for the trajectory-based game of chance. For instance, a game outcome presentation for a trajectory-based of chance may use images rendered from cameras 302 and 306. In one embodiment of the present invention, the gaming machine may be designed to allow the game player to select a location of a virtual camera.

The second virtual camera, 306, is located on the game object 322. A space captured by the virtual camera is defined by the dashed lines connected to the camera. The camera captures a rectangle 308 of the planar surface 352. The space captured by the camera 310 is rendered into a 2-D image 310. The virtual camera 322 may travel with the game object 322. For instance, as the game object 322 travels toward the surface 352, the 2-D images rendered from the camera may show the surface 352 appearing to get closer and closer. Additional details of using the virtual camera are described with respect to FIG. 8 and as well as co-pending U.S. application Ser. No. 09/927,901, filed Aug. 9, 2001, by LeMay, et al., and titled, "Virtual Cameras And 3-D Gaming Environments In A Gaming Machine," previously incorporated herein.

Three trajectories, starting at locations 340, 341, and 342, respectively in the gaming environment 300, have been described. These trajectories are a function of a number of variables such as the initial state of the trajectory, properties of the game object and the placement of objects in the gaming environment. In general, all of the possible trajectories for game objects in the gaming environment 300 are not used in a trajectory-based game of chance. Theoretically, for each gaming environment with its individual placement of objects and exits, the number of possible trajectories is infinite. However, various criteria related to the application of the trajectory-based game of chance to a gaming machine are available that provide some guidelines in regards to trajectory selection.

One criterion on a gaming machine that effects the trajectory selection is a length of time for a game outcome presentation for a game of chance. The length of time of a game outcome is usually on the order of a few seconds. Thus, the trajectory selection may be limited to a group of trajectories that are within a range of times bounded by a minimum time and a maximum time. For example, trajectories may be selected that last between 1 and 3 seconds.

Another criterion for trajectory selection is that game player's generally prefer rules and outcomes for the game of chance which are easy to understand. For example, in gaming environment 300, only trajectories that result in a game object leaving the gaming environment 300 through one of the exits 334 or 353, 355, 356 within a bounded range of times may be used. When the game object leaves through one of the exits, the trajectory-based game of chance ends with a result that is easy for a player to understand.

Yet another criterion for trajectory selection is variability of the trajectories. Typically, when a game is monotonous without much variability, a game player may quickly lose interest in playing the game. Thus, a group of trajectories and a gaming environment may be selected that provides for trajectories with a large degree of variation.

An illustration of how the criteria listed above may be satisfied is provided by comparing the trajectory-based games of chance of the present invention to two mechanical systems used in gaming that involve the trajectory of a moving object: 1) roulette and pachinko. The gaming environment 300, including trajectory rules, collision rules, exit rules and the properties of objects, may be modeled after a mechanical system, such as roulette or pachinko. However, as discussed in detail below, the present invention is not constrained to the physical and the mechanical limitations of these mechanical systems.

In a mechanical roulette game, a roulette wheel with a number of slots is surrounded by a bowl-like surface. To play the game, the roulette wheel is spun and a ball is inserted into the bowl-like surface with an initial velocity. The ball travels around the bowl-like surface until it lands in one of the slots of the spinning roulette wheel. After the ball lands in one of the slots, it may bounce from slot to slot until it comes to rest in a final slot. The final slot the ball comes to rest in determines the outcome of the roulette game. The path of ball around the bowl-like surface including collisions and bounces in the slots comprises its trajectory.

In the 3-D gaming environment, the bowl-like surface, the spinning wheel and the trajectory of the ball around the bowl and bounces in the slots may be simulated as part of the generation of a trajectory-based game of chance. In the 3-D gaming environment for roulette, the trajectory of the game object may include simulating a game object moving along the bowl-like surface while in a medium, such as air, and moving through the air without contact with a surface. In general, in the 3-D gaming environments of the present invention, objects may be simulated moving through different media, such as water, oil or air, while in contact with a surface in the gaming environment or moving through the media without contact to a surface in the gaming environment.

Pachinko is another example of a mechanical system that may be modeled as a trajectory-based game of the present invention. A single game of mechanical pachinko involves dropping a ball through a portion of a vertical box. The ball starts at the top of the box and is drawn through the box via the force of gravity. A large number of obstacles may be arranged within the box. As the ball falls through the box, the trajectory of the ball is altered by collisions with the obstacles. The thickness of the box is usually not much greater than the diameter of the ball. Therefore, the velocity component of the ball in the direction perpendicular to the face of the box is very small and the trajectory of the ball is substantially planar.

A number of exits are placed within the box that allow a ball to leave the portion of the box where the collisions are taking place. A game outcome is determined by the exit from which the ball leaves the box. The game is designed such that the trajectory of the ball is very sensitive to its initial conditions. Thus, it is very difficult to predict the trajectory of the ball within the box and hence the exit from which the ball leaves. Further, the game is designed such that the ball always leaves through one of the exits independent of the initial conditions of the trajectory.

The obstacles, the exits, the effects of collisions of the balls with obstacles, the falling of balls in response to gravity and other qualities of a mechanical pachinko game may be simulated in the 3-D gaming environment of the present invention. Similar to a mechanical pachinko game, the trajectories of the ball may be limited to planar trajectories in the 3-D gaming environment. Also, like a mechanical pachinko system, the 3-D gaming environment may be designed such that objects always leave the gaming environment through one of a plurality of exits. Further, devices, such as flippers used to impart momentum to a game object or plungers used to launch a game object (see FIG. 9) may also be simulated in the 3-D gaming environment.

The trajectory-based games of the present invention have many advantages over mechanical systems such as the roulette game and the pachinko game described above. A few of these advantages are described as follows. First, the properties of trajectory-based games of the present invention do not change in an unpredictable manner over time. The properties of mechanical systems may change over time due to wear. Second, the trajectory-based games of the present invention are not limited by actual physics. For example, in the pachinko game or the roulette, the objects always fall according to the earth's gravity. In a 3-D gaming environment of the present invention, the gravity on the moon, Jupiter, Mars or even anti-gravity may be modeled to create different trajectories. Further, in the mechanical roulette game and the pachinko game, the force of gravity is essential constant throughout the system. In a 3-D gaming environment, the physical forces modeled in the system such as the force of gravity may be substantially varied throughout the gaming environment.

In the present invention (see FIG. 6 for more details), a 3-D gaming environment for trajectory-based game of chance may be modeled where a game object travels through many different media, such as air, water and oil. In the mechanical roulette and pachinko systems, the ball moves through air. Although it would be possible to use different substances in a mechanical pachinko game, such as water, it is not practical for maintenance reasons. In the present invention, game objects of many different shapes may be employed, such as spheres, boxes, pyramids and diamonds. In a mechanical trajectory game, such as pachinko, spherical balls are used because they are easy to gather and circulate in a mechanical system. Using non-spherical objects such as boxes or pyramids would be impractical because of the difficulty of mechanically gathering and circulating non-spherical objects. Further, in a mechanical system, changing the shape of the game object, such as from a sphere to a diamond, or splitting the game object into a number of pieces is not feasible.

In the mechanical roulette and pachinko games, the mechanical systems are designed such that the ball always ends up in an exit independent of the initial velocity and position of the ball in the system. The mechanical games are designed this way so that precise control of the initial state of the game object, such as its position and velocity, is not needed. In the present invention, the initial state of the game object is easily specified. Thus, trajectory-base games of chance in 3-D gaming environments may be implemented where the final state of the game object is dependent on both the design of the gaming environment (e.g., object placement and exit rules) and the initial state of the game object.

As an example, a trajectory-based game of chance may be implemented in a 3-D gaming environment where the game objects enter the gaming environment at a specific location and are required to exit through one of a plurality of exits in the gaming environment. The gaming environment may be designed such that only game objects that enter the gaming environment at the specific location with a sub-set of possible initial velocities leave the gaming environment through one of the plurality of exits. Initial velocities outside of the subset may result in the game object not leaving the gaming environment, which would not be desirable. Thus, unlike mechanical pachinko or mechanical roulette, a game object entering the gaming environment at the specific location may not end up at an exit independent of its initial velocity. However, in the present invention, since the initial velocity of the game object may be precisely specified, the game objects may be given initial velocities that always lead to trajectories where the game object leaves the gaming environment through one of the plurality of exits. Initial velocities where the game objects do not leave the gaming environment through an exit are not used. The generation of initial conditions for game objects in a trajectory-based game of chance is described in more detail with respect to FIG. 3.

Yet another advantage of the 3-D gaming environments of the present invention as compared to mechanical system is the capability of controlling of the view used in the game outcome presentation. In a mechanical system such as the roulette game or the pachinko game, the orientation of the mechanical system does not change and a single view or a limited range of views is provided to the player. For instance, in mechanical pachinko game, the system is designed to remain vertically oriented and the view from in front of the pachinko game of the balls falling through the vertical surface is the only view presented to the player. As described above, a virtual camera in the 3-D gaming environment may be used to render a sequence of 2-D images used in the game outcome presentation for the trajectory-based game of chance. The position of the virtual camera may be moved throughout the 3-D gaming environment and the position may change as a function of time. For instance, as described, the virtual camera may be located on the game object. Thus, a view from the perspective of the game object may be generated. With mechanical systems, such a pachinko, variable views from many different perspectives are not feasible.

FIG. 1B is a block diagram describing trajectory rules and collision rules for two objects, 370 and 371, in the 3-D gaming environment described with respect to FIG. 1A. The two diamond shaped objects 370 and 371 may be two game objects, a game object and an object in the 3-D gaming environment, or two objects in the gaming environment. As described above, the game object is distinguished from other moving or stationary objects in the 3-D gaming environment in that a wager is made on an aspect of the game object's trajectory in the trajectory-based game of chance. The trajectories of objects in the gaming environment besides game objects may be simulated but wagers are not made on their trajectories. The trajectory rules and collision rules used to generate the trajectories of game objects and non-game objects may be the same or may be different.

Using well-known physical relations, a realistic appearing trajectory for an object in a 3-D gaming environment including collisions may be generated. The purpose of using the physical relations may be to generate a realistic presentation of a game object moving and colliding with various objects in the gaming environment. However, the present invention is not limited to using physical relations that occur in nature. For instance, as described above, the effects of anti-gravity may be modeled in the 3-D gaming environment. In general, the accuracy of the simulations is not important as long as it is appealing to a player playing the trajectory-based game of chance.

In FIG. 1B, the trajectory rules and the collision rules for two objects, 370 and 371, are described. The first object, 370, is allowed to translate in three directions and rotate in three directions in the 3-D gaming environment. The second object 371 is allowed only to translate in 3 directions in the 3-D gaming environment. For the first object 370 and the second object 371, the trajectory rules used to generate a position and translation velocity of the game object as a function of time may be specified as three equations of motion in the x, y and z directions relative to the object's centers of mass. For the first object, three additional equations of motion are used to determine rotational velocity components in a particular direction. For the translation velocity components, the velocity in a particular direction as function time is determined by integrating the equation, F=mA where F is the summation of translational forces in a particular direction, m is the mass of the object and A is the acceleration in the particular direction. This equation may be integrated a second time to determine the position of the center of mass of the objects as a function of time in a particular direction in the gaming environment.

In a similar manner, the rotational forces for the first object 370 may be modeled as Fr-I.theta. where Fr is a summation of rotational force about a particular axis, I is a moment of inertia about the particular axis and .theta. is an angular acceleration. Assuming no rotational coupling, 3 equations may be written to account for the rotational forces around each axis. To generate a rotational velocity and a rotational position as a function of time, each force equation may be integrated twice. More complex equations (up to nine equations to account for all of the cross coupling terms in 3-D dimensions) may be used to simulate rotational coupling in the gaming environment but this level of complexity is unlikely to be needed in a game presentation on a gaming machine. Although not shown, vibrational force equations may be written to simulate the vibrational motion of an object about its center of mass as a function of time.

Each of translation force in the summation of forces in each force equation may be a function of a number of parameters such as but not limited to: i) a position (x,y,z) in the gaming environment, ii) the translation velocity of the game object (Vx,Vy,Vz), iii) rotational velocities (Rx, Ry, Rz), iv) time, v) vibrational velocities (not shown), vi) various physical constants of the object and the environment (not shown), such as a gravitational constant, mass properties of the object, a drag constant for the object, etc. Similarly, other forces modeled in the gaming environment, such as rotational forces and vibrational forces, may also be a function of these parameters. Gravitational forces, frictional forces, inertial forces, environmental forces, electromechanical forces, electromagnetic forces and imaginary forces may be modeled in the gaming environment and incorporated in one or more force equations. However, the present invention is not limited to these forces.

Frictional forces may include the drag on an object as it moves through a substance such as air or water in the gaming environment or the friction between the object and a surface in the gaming environment. Inertial forces may include centrifugal forces. Electromechanical forces may include the forces from electromechanical devices simulated in the gaming environment such as springs or flippers that may come in contact with objects in the gaming environment. These forces may be also be modeled as part collision rules describing the effects of collisions involving the object. Electromagnetic forces imparted by a magnetic field or the magnetic properties of objects may be simulated in the gaming environment. Environmental forces may include the effects of wind in air environment or water currents in a water environment. Imaginary forces may include the effects of forces not found in nature such as anti-gravity or a frictional force that speeds up an object rather slowing it down.

As an example, to simulate the diamond shaped object falling through water in the gaming environment, mass properties of the diamond shaped object (e.g., a density, a volume, a mass distribution, etc.), a drag coefficient of the object and constants used to model viscous drag in the water may be specified. Then, force equations used to model the forces in one or more directions may be generated. The force equations may include the effects of gravitational forces, buoyancy forces, viscous forces and environmental forces (e.g., water currents in the gaming environment). With an initial velocity and an initial position in the gaming environment for the object, the trajectory, including velocity and position as a function of time of the game object starting from the initial velocity and the initial position, may be generated by integrating the one or more force equations.

In this example, when the effects of rotation are modeled for the object, then rotational force equations accounting for the effects of viscous drag on the object may also be generated. With an initial rotation velocity, the rotational velocity of the object in the gaming environment may be determined along its trajectory by integrating the rotational force equations. As described above, the trajectory as a function of time of the game object in the gaming environment may be used as part of a game outcome presentation on the gaming machine.

As described above, to generate a trajectory, one or more force equations may be integrated. For complex force equations, a numerical integration technique may be applied to solve the force equations. In some embodiments, a closed form solution may be available for the integrated force equations and numerical integration may not be required. In this case, the force equations may be integrated to generate a formula where the formula provides the trajectory of the object as a function of time.

As described with respect to FIG. 1A, a game object may collide with various objects along its trajectory. Also, non-game objects may also collide in the gaming environment. When two objects collide in the gaming environment, the velocity of one or both of the objects may be changed. The velocities of the objects may include translational, rotational and vibrational velocity components. For collisions between two objects in the gaming environment, such as but not limited to a game object and a non-game object, collision rules may be specified that are used to determine the effects of a collision on one or more of the velocity components of each object.

The collision rules may or may not be physics-based. For example, one collision rule, which is not physics-based, may be that red colored objects are not affected by collisions. A collision rule that is physics-based may account for the change in momentum of the two objects during a collision. For instance, a physics-based collision rule that may be used to described a linear, elastic collision between the two game objects, 370 and 371, at collision location 372 is based upon the physical conservation of momentum during the collision. Given the initial translational velocities and masses of the two objects prior to the collision, equations may be derived that provide the final velocities of the two objects after the collisions. In FIG. 1B, an equation that provides the final velocity of each object, $V1_f$ and $V2_f$ based upon the mass of each object, $m_1$ and $m_2$, and the initial velocity of each object $V1_i$ and $V2_i$ is shown. More complex equations may be derived that account for the effects of non-linear collisions and non-elastic collisions. In additions, equations may be derived that describe changes in rotational and vibrational velocities that may result from a collision between two objects.

In one embodiment, the collision rules may account for forces applied to an object during a collision. For example, an object along its trajectory may collide with a spring loaded platform where the spring loaded platform imparts a force to object that effects its post-collision velocity of the object. In another example, the gaming environment may include flippers that impart a velocity to an object when the flipper and the object collides.

FIG. 2 is a flow chart depicting a method 900 of generating a trajectory for a game object in a 3-D gaming environment of the present invention. 2-D images rendered from the gaming environment showing the game object along its trajectory may be used as part of a game outcome presentation for a trajectory-based game of chance. The method may also be applied to generate a trajectory for a non-game object in the 3-D gaming environment. However, a wager is not associated with the trajectory of the non-game object.

In the method, a trajectory comprising a sequence of states may be generated for a game object. The sequence of states may include an initial state, a final state and one or more states between the initial state and the final state. For each state, information regarding properties in the gaming environment, such as but not limited to 1) a position, 2) a velocity which may include a translational velocity, a rotational velocity, a vibrational velocity and combinations thereof, 3) mass properties, 4) a geometry, 5) physical properties, 6) graphical rendering properties, 7) sound properties and 8) bonus properties, may be either specified or generated.

To generate a second state in the sequence of states from a first state, the properties of the game object at first state may be modified by applying game logic, such as but not limited to trajectory rules and collision rules. The game logic relates the properties of the first state to the properties of the second state. By repeatedly applying the game logic to generate new states, the sequence of states of the game object along its trajectory are generated. As an example, typically, for the initial state, the properties of the game object are specified. The initial position and the initial velocity of the game object may be specified by selecting the initial position and the initial velocity from a database of positions and velocities (see FIG. 3 for more details). The database may also include a geometry, physical properties and graphical rendering properties that are used to specify these properties for the game object. Then, to generate a second state after the initial state, the properties specified for the initial state may be modified according to the game logic. To generate a third state after the second state, the game logic may be applied to the properties of the game object at the second state. The process may be repeated until a final state in the sequence of states is generated.

Typically, in the sequence of states only information from one state is used to generate the next state in the sequence of states. For instance, the third state is generated from the second state or the N.sup.th state is generate N.sup.th-1 state. This method is described in FIG. 2. However, the present invention is not so limited. Information from a plurality of states may be used to generate a state in the sequence of states. For example, the third state in the sequence of states may be generated from information from a second state and information a first state.

In 905, the properties of the game object in the gaming environment at the first state are looked up. The first state refers to one of the states in the sequence states for the game object along its trajectory that is used to generate the immediately following state in the sequence of states. It is not limited to the initial state in the sequence of states. In 910, information used to apply the trajectory rules is looked up. The trajectory rules may vary from location to location in the gaming environment. Thus, the information may specify a set of trajectory rules to apply. After the trajectory rules to apply are determined, the physical properties need to apply the trajectory rules may be looked up. The physical properties used in the gaming environment, such as a gravitational constant, may vary from location to location. Therefore, the local physical properties at the first state may be determined. When the trajectory rules and the physical properties are constant throughout the gaming environment, 910 may be eliminated. In 915, the trajectory rules are applied to generate an initial set of properties at the second state.

In 920, it is determined whether the game object has collided with any objects between the first state and the second state. In 925, when a collision has been detected, the properties of the colliding objects may be looked up. Also, the collision rules to apply in the collision may also be determined. In 930, the collision location may be generated. The collision location is the location where the two objects make contact with one another. The collision location may depend on the geometry of the two objects in the collision. After the collision location is generated, the location of the center of mass of the game object in the gaming environment may be generated. Typically, the position of the center of mass of the game object in the gaming environment is generated for its trajectory. Thus, when the two objects are in contact, the location of the center of mass of the game object at this point may become the position of the game object for the second state.

In 935, the collision rules may be applied to generate the post collision velocity of the game object and other changes to the game object's properties. The collision rules were described with respect to FIG. 1B. As described with respect to FIG. 1A, properties of the game object such as its graphical rendering properties, sound properties and bonus properties may be changed as a result of a collision. The collision rules may specify the conditions for which changes to the properties are made.

In 940, events triggered by the collision may be processed. In FIG. 1A, a number of game events that may occur in response to a collision are described. In 940, it is determined whether any game events have occurred and any game events that have occurred are processed. For instance, in response to a collision, one or more of the following may occur: 1) the game object may be transported to another location, 2) the game object may be split into a plurality of game objects, 3) game objects may be released into the gaming environment, 4) the game object may explode and 5) a bonus game may be triggered. Additional examples are described in FIG. 1A. A game event that is triggered from the collision may change the game object's properties at the second state such as when the game object is transported to another location in response to a collision.

In 945, it determined whether the game object as intersected an area that is used to trigger a game event. After it is determined that an area that may trigger a game event has been intersected, in 950, it is determined whether any game events have been triggered. Then, in 950, any game events that have been triggered are processed. For example, in response to an intersection, one or more of the following may occur: 1) the game object may be transported to another location, 2) the game object may be split into a plurality of game objects, 3) game objects may be released into the gaming environment, 4) the game object may explode and 5) a bonus game may be triggered. Additional examples are described in FIG. 1A. A game event that is triggered from the intersection may change the game object's properties at the second state such as when the game object is transported to another location in response to a collision.

In 955, after the second state of the game object has been determined, one or more exit rules may be applied to the game object. The exit rules determine when the game object's trajectory is terminated and the game object is removed from the game. Details of exit rules are described with respect to FIG. 1A. In 960, it is determined whether the trajectory of the game object has been terminated. In 965, when the game object trajectory is terminated, the game object may be removed from the gaming environment and an outcome for the trajectory-based game of chance may be displayed. The outcome may indicate an award for the trajectory-based game of chance.

In 967, it is determined whether any game events have been triggered based upon a parameter tracked along the trajectory. Then, any triggered game events may be processed. For example, as was described with respect to FIG. 1A, a game event may be triggered in response to a distance traveled along the trajectory, a time along the trajectory, a number of collisions along the trajectory or based-upon a combination of conditions. The game events that may be triggered are the same that may be triggered in response to a collision or an intersection with an area.

In 970, the position and velocity of the game object and other properties of the second game state may be stored. In 975, the game object may be rendered according to the properties of the second state in the gaming environment. Next, the properties of the second state may become the properties of the second state looked up in 905 an the method may be repeated until the trajectory of the game object is terminated in 960.

FIG. 3 is a flow chart depicting a method of generating a pay-table for a trajectory-based game of chance. In 600, for a 3-D gaming environment, objects are generated. The objects may include all of the different shapes and surfaces in the 3-D gaming environment and their geometry's. In 602, the interaction rules for the 3-D gaming environment are generated. The interaction rules may comprise game logic and parameters used to describe the behavior of objects in the gaming environment, such as how the objects interact in response to different conditions.

The interaction rules may include but are not limited to: 1) trajectory rules and their associated parameters, 2) collision rules and their associated parameters, 3) exit rules and their associated parameters and 4) any additional logic and parameters needed to specify game events that are triggered by the interaction of objects in the gaming environment. As an example, as described with respect to FIG. 1B, the collision rules may comprise: 1) equations used to model momentum exchange between two objects during a collision and 2) logical rules that are used to determine how other properties of an object, such as a color, a shape or a size, are changed in response to the collision. To use the momentum exchange collision rules, an elasticity parameter may be assigned to each object and/or surface in the gaming environment. In general, each object in the gaming environment may be assigned many different parameters that are used in logical rules implemented in the gaming environment.

In 604, after the 3-D gaming environment and the associated logic used to describe the behavior of objects in the gaming environment has been specified, an insertion point for inserting game objects into the gaming environment may be selected. The insertion point is a location in the gaming environment where the trajectory of a game object is initialized. One or more insertion points may be used in a trajectory-based game of chance. In FIG. 1A, three trajectories with three different insertion points in the gaming environment 300 are described.

In 606, the properties of the game object are initialized at the insertion point. The game object may be initialized with a random velocity within a specified range of velocities. In 608, a trajectory for the game object in the gaming environment is generated. The trajectory may comprise a sequence of states with an initial state, a final state and plurality of states in between the initial state and the final state where property information is specified at each state.

In 610, the trajectory may be compared to one or more criteria used to determine whether the trajectory is acceptable for storage to a trajectory database. For example, a length of a time between the initial state of the trajectory and the final state of the trajectory may be generated and compared to an acceptable range of times where only trajectories within the range of times are accepted. In another example, a number of collisions along the trajectory may be generated and compared to an acceptable range of collisions where only trajectories within the range of collisions are accepted. Many criterions are possible and are not limited to these examples.

In 612, when a trajectory is accepted, the trajectory may be stored to a trajectory database. In the trajectory database, information describing the trajectory may be stored. For instance, the properties of the game object at its initial state and one or more states along its trajectory, such as the final state, may be stored to the trajectory database. In addition, information about aspects of the trajectory that may be used for a wager in a trajectory-based game of chance may be stored in the trajectory database. For example, an exit location of the trajectory, a number of collisions along the trajectory, a length of distance of the trajectory, a length of time of the trajectory, a final velocity of the trajectory or a maximum velocity along the trajectory are aspects of the trajectory that may be used for a wager that are stored in the trajectory database.

In 614, after the trajectory has been accepted or rejected, additional trajectories may be generated at the insertion point in 606. Millions of trajectories may be generated at each insertion point and stored in the trajectory database. In 616, when all of the trajectories at a first insertion point have been generated, the process of generating a plurality of trajectories and storing the acceptable trajectories to the trajectory database may be repeated at a second insertion point.

In 618, a set of game outcomes for trajectory-based game of chance may be selected where a trajectory aspect is selected for each of the game outcomes in the set of game outcomes. For example, the set of game outcomes may include: 1) an award for trajectories where the game objects collides 5 or more times with an object, 2) an award for trajectories where the game object collides with a particular object, 3) an award for trajectories where the game object leaves the game object through a first exit in the gaming environment, 4) an award for trajectories where the game object leaves the gaming environment through a second exit and 5) no award for any other trajectories. In 620, a paytable may be constructed where a probability of occurrence is assigned to each of the game outcomes in the set of game outcomes. An award for each game outcome may be proportional to the probability of occurrence for each game outcome.

In 622, the trajectory database may be used to map a plurality of trajectories to each game outcome in the set of game outcomes. A trajectory mapped to each game outcome is selected to satisfy the trajectory aspect assigned to the game outcome. For example, when the game outcome is based upon a trajectory where the game object collides 5 times or more times along its trajectory, then trajectory database may be searched for trajectories where the game object collides 5 or more times along its trajectory. When a trajectory satisfying the search criteria is found, information that allows the trajectory to be generated in the gaming environment, such as an initial position and an initial velocity, may be stored to a trajectory table.

All of the information needed to generate the trajectory in the gaming environment may not be stored in the trajectory table. A trajectory record in the trajectory in the trajectory table may point to other memory locations, such as the trajectory database, that store additional information needed to generate the trajectory. The number of trajectories from the trajectory database that are mapped to each game outcome may vary from 1 to a large number. When a desired amount of trajectories are not available, additional trajectories may be generated.

In 624, the paytable and trajectory table may be installed on a gaming machine. Then, a trajectory-based game of chance may be generated using the paytable and the trajectory table. For example, using the paytable, a game outcome defined in the paytable may be selected at random. Once the game outcome is selected, a trajectory corresponding to the game outcome may be selected from the trajectory table. The information stored in the trajectory table and/or other memory locations may be used to generate the trajectory in the gaming environment. When a plurality of trajectories are available for the game outcome, one of the available trajectories may be selected at random. In one embodiment, the selection of the trajectory may be influenced by one or more input parameters from an input device on the gaming machine (see FIG. 9 for more details).

In one embodiment of the present invention, the number of trajectories mapped to each game outcome in the trajectory table may be proportional to the probability of each game outcome occurring. For example, when the probability of a particular game outcome occurring is 10%, then 10% of the trajectories, out of a total amount of trajectories mapped to all of the game outcomes, may be mapped to the particular game outcome. Therefore, for a game outcome with 10% probability of occurring, if the total amount of trajectories that are mapped to the different game outcomes is 1,000,000, then 100,000 would be mapped to the game outcome. In this embodiment, the pay table may not be needed. Instead, trajectories may be randomly selected from the trajectory table.

FIG. 4 is a flow chart depicting a first method of generating a trajectory-based game of chance on a gaming machine using a 3-D gaming environment as described with respect to FIGS. 1A, 1B and 2. In 700, a request is received to initiate a trajectory-based game of chance on the gaming machine. Prior to receiving the request to initiate the game a wager may be made on the trajectory-based game of chance. The request to initiate the trajectory-based game of chance may be received from a user interface on the gaming machine (see FIG. 8 for more details).

In 705, using a pay table, a game outcome may be determined for the trajectory-based game of chance. The game outcome may be a function of the wager amount. In 710, as was described with respect to FIG. 3, a trajectory may be selected from a trajectory table that corresponds to the game outcome determined in 705. In 715, the selected trajectory may be generated in the gaming environment. The trajectory may comprise a sequence of states for a 3-D game object in a 3-D gaming environment. In 720, a game outcome presentation may be generated for the trajectory-based game of chance. The game outcome presentation may include a sequence of 2-D images rendered from the 3-D gaming environment that are displayed on the display screen of a gaming machine. One or more of the 2-D images in the sequence of 2-D images may show the 3-D game object in different states along its trajectory in the 3-D gaming environment. In 725, at a conclusion of the game outcome presentation, the game outcome for the trajectory-based game of chance, such an award amount, may be displayed to the display screen. Typically, the conclusion of the game outcome presentation includes the final position of the game object in the 3-D gaming environment.

In present invention, a plurality of trajectory-based games of chance may be played in a serial manner or a parallel manner. In a serial manner of game play of the plurality of trajectory-based games of chance, after a wager is made on a first trajectory-based game of chance, the method of generating the trajectory-based game of chance comprising 700, 705, 710, 715, 720 and 725 is implemented. A second trajectory-based game of chance may not be initiated until the game outcome for the first trajectory-based game of chance has been displayed in 725. Then, method may be implemented for the second trajectory-based game of chance.

In a parallel manner of game play of the plurality of trajectory-based games of chance, after a wager is made on a first trajectory-based game of chance, the method of generating the trajectory-based game of chance comprising 700, 705, 710, 715, 720 and 725 is implemented. After the first game of chance has been initiated in 700, a wager may be made on a second game of chance prior to the completion of the first game of chance in 725. Then, the method, comprising 700, 705, 710, 715, 720 and 725 may be implemented for the second game of chance. Therefore, the implementation of the method for the first game of chance and the second game of chance may overlap. When the initiation of each trajectory-based game of chance is under player control, depending on when the player initiates each trajectory-based game of chance and length of time for each trajectory-based game of chance in a sequence of trajectory-based games of chance played by the player, the trajectory-based games of chance may be played in a serial manner, a parallel manner and combinations thereof.

In one embodiment, only a trajectory of one game object may be simulated in a gaming environment at a time. Therefore, when two trajectory-based games of chance are played in parallel, a trajectory for a first game object may be simulated in a first gaming environment and a trajectory for a second game object may be simulated in a second gaming environment at the same time on the gaming machine 2-D images rendered from the first gaming environment and 2-D images rendered from the second gaming environment may be displayed to a single display screen on a gaming machine using a split screen display format. The first gaming environment and the second gaming environment used in the trajectory simulations may be the same (e.g., same format and same logical rules) or the two gaming environments may differ (e.g., different format and/or different logical rules). In the present invention, one or more 3-D gaming environments may be stored on the gaming machine and used for the purposes of generating a trajectory for a game object used in a trajectory-based of chance.

In another embodiment, the trajectories for a plurality of game objects may be simulated in a single gaming environment at the same time. Therefore, when two trajectory-based games of chance are played in parallel, a trajectory for a first game object and a second game object may be simulated in the gaming environment at the same time on the gaming machine 2-D images rendered from the gaming environment and displayed to a display screen on the gaming machine may include trajectory states from both objects in the same 2-D image. Details of parallel game playing methods that may be used with the present invention are described in co-pending U.S. application Ser. No. 09/553,437, filed on Apr. 19, 2000, by Brosnan et al, entitled "Parallel Games on a Gaming Machine," which is incorporated herein by reference in its entirety and for all purposes.

FIG. 5 is a flow chart depicting a second method of generating a trajectory-based game of chance on a gaming machine. In the present invention, a gaming environment may be designed where it is difficult to determine the outcome of a trajectory, a priori and outcome of the trajectory simulation may not be known until the simulation is completed in the gaming environment. A gaming environment where the properties of the gaming environment change as a function of time is example of a gaming environment that may be difficult to determine the outcome of trajectory, a priori.

In a gaming environment that changes as a function of time, the objects in the environment may move around, different objects may appear or may disappear, and the interaction rules, such as trajectory rules and collision rules, may be time varying. Thus, the trajectory of the game object may depend on both its initial state and a state of the gaming environment when the game object is inserted into the gaming environment. For instance, two game objects may be introduced into the gaming environment with the same initial state at different times. When a state variation for the gaming environment is the same following the introduction of the game objects, the game objects travel along the same trajectory. However, when the state variation for the gaming environment is different following the introduction of the game objects, the game objects may travel different trajectories even though their initial states are the same.

When the properties of the gaming environment change as a function of time, it may not be desirable to develop a trajectory table for each state of the gaming environment. Instead, in one embodiment, the gaming environment may be designed and initial states for game objects in the gaming environment may be selected such that on average over time a set of game outcomes for a trajectory-based game of chance with a certain set of probability distributions is achieved. The set of game outcomes may be based-upon different aspects of a game object's trajectory, such as its final position in the gaming environment. In this embodiment, the game outcome may not be determined until the game object reaches its final state in its trajectory in the gaming environment.

The average probability distribution for the set of game outcomes may be verified by performing a Monte Carlo simulation where the trajectories of a large number of game objects with different initial states and at different environment states are analyzed. In this embodiment, it is important to determine whether the probabilities of a game outcome vary in time according to changes in the gaming environment. If a game player can alter their probability of winning the trajectory-based game of chance by timing when they play the game, then the game may be considered a game of skill, which may not be desirable in some jurisdictions. Therefore, in most cases, the gaming environment may be designed to avoid the possibility of the game player being able to gain an advantage based upon their skill in playing the game.

In 800, a request is received to initiate a trajectory-based game of chance on the gaming machine. Prior to receiving the request to initiate the game a wager may be made on the trajectory-based game of chance. The request to initiate the trajectory-based game of chance may be received from a user interface on the gaming machine (see FIG. 8 for more details). In 805, an initial state for a game object in the gaming environment is selected. In 810, the selected trajectory may be generated in the gaming environment. The trajectory may comprise a sequence of states for a 3-D game object in a 3-D gaming environment. In 815, a game outcome presentation may be generated for the trajectory-based game of chance. The game outcome presentation may include a sequence of 2-D images rendered from the 3-D gaming environment that are displayed on the display screen of a gaming machine. One or more of the 2-D images in the sequence of 2-D images may show the 3-D game object in different states along its trajectory in the 3-D gaming environment.

In 820, the game object is removed from the gaming environment and the game outcome for the trajectory-based game of chance is determined. The game outcome may be based upon one or more aspects of the game object's trajectory such as but not limited to its final position in the gaming environment, a number of collisions, etc. In 825, at a conclusion of the game outcome presentation, the game outcome for the trajectory-based game of chance, such an award amount, may be displayed to the display screen.

In one embodiment, to eliminate the possibility of the game outcome being influenced by a player's skill, an element of randomness may be introduced to the gaming environment. For example, the gaming environment may be designed such that the game object is constrained to leave the gaming environment through one or more exits. Different awards may flash randomly over the exits. The game outcome may be the award that is showing when the object enters the exit. The random variation of the awards may prevent a player from using skill to influence the game outcome.

FIG. 6 is a block diagram of a 3-D gaming environment where properties of the 3-D gaming environment vary as a function of space and time. A trajectory-based game of chance may be played using trajectories of game objects simulated in the 3-D gaming environment. In one embodiment, the block diagram 400 may be a 2-D image rendered from a planar 3-D gaming environment. The 2-D image may be displayed on the display screen of a gaming machine.

A trajectory for a game object, such as 410, is initialized at an initial state in the gaming environment at the entrance 412. The gaming environment is designed with five exits, 408 and 415, 416, 417 and 418, and the game object is constrained such that it exits the gaming environment through one of the five exits. The game outcomes for the trajectory-based game of chance are based-upon which exit the game object leaves the gaming environment. When the game object leaves the gaming environment through one of the four exits 415, 416, 417 and 418, an award for the trajectory-based game of chance is generated. When the game object leaves the gaming environment through the exit 408, the wager on the trajectory-based game of chance is lost.

The gaming environment 400 is divided into four regions, 401, 402, 404 and 406. Region 401 is a rectangular region that surrounds exit 415. Region 402 is a circular region above exit 416. Region 404 is an oval shaped region that surrounds exit 408. Region 406 is the remaining region outside of regions 401, 402 and 404 in the gaming environment.

The interaction rules, such as trajectory rules, collision rules and exit rules may vary from one region to another region. Further, the interaction rules may vary in each region as a function of time. For example, a gravitational force may be modeled as part of the trajectory rules in region 406 where the gravitational force causes the game object to fall from the top of the gaming environment 419 to the bottom of the gaming environment 420. The bottom of the gaming environment is sloped such that game objects that reach the bottom 420 roll along the bottom until reaching exit 408. In region 401, a gravitational force may be modeled as part of the trajectory rules where the game object falls in the direction away from the bottom and towards the top 419 of the gaming environment 400.

Because gravity acts in the opposite direction between region 406 and region 401, the entrance to exit 415 is orientated in opposite manner from exits 416, 417, 418. Exit 415 is orientated so that a game object can fall up and into it. The entrance to the exits, 415, 416, 417 and 418 are marked in FIG. 6. The sides of the exits, 415, 416, 417, and 418, other than the entrance side, act as solid surfaces in regards to a collision with a game object. Exits 416, 417 and 418 are orientated so that a game object may fall down into the exits through their entrances.

An example of a trajectory for the game object 410 that travels through the two regions 401 and 406 is shown in the FIG. 6. The game object 410 enters the gaming environment through the entrance 412 with an initial forward velocity. The simulated gravitation forces in region 406 pulls the object downward and it collides with an object in the gaming environment. Then, the game object 410 enters region 401 and begins to fall toward the top of the gaming environment 419 because gravity acts in the opposite direction in region 401 relative to region 406. The game object leaves region 401 and enters region 406 again where it is again accelerated toward the bottom of the gaming environment 420. The game object 410 enters region 401 again where its velocity toward the bottom of the gaming environment is slowed before leaving region 401. The game object 410 then collides with two objects before colliding with the bottom 420 of the gaming environment. The game object 410 then bounces twice off of the bottom and exits the gaming environment through exit 408.

The trajectory rules for a region may be designed to draw an object into a region or repel an object from the region. For instance, in region 402, the trajectory rules may use an extremely large gravitational constant to simulate a force of gravity. The resultant gravitational force may be so large that any object that enters the region is always drawn into the entrance of the exit 416.

In similar manner, a gravitational force may be modeled to repel objects. For example, in region 404 around exit 408, the trajectory rules may include a gravitational force repels objects away from the exit. Normally, the gravitational force may be turned off so that game objects are allowed to enter the exit 408. However, when certain conditions are met in the trajectory-based of game of chance, the repelling gravitational force is activated such the game object is flung out of the region 404 before it enters the exit 408. The game object flung out of the region may then enter one of the other exits, such as 415, 416 or 418. Since the wager for the trajectory-based game of chance is lost when the game object enters the exit 408, the repelling gravitational force may be activated as part of a bonus scenario for the trajectory-based game of chance.

FIG. 7 is a block diagram used to describe bonusing and progressive scenarios for a 3-D trajectory-based game of chance. The gaming environment 400 is similar to the gaming environment described with respect to FIG. 6 except that a bonus cup 424, a progressive cup 422 and a bonus board 426 have been added to the gaming environment.

A bonus property may be assigned to each game object at its initial state, such as when it enters the gaming environment through entrance 412. The bonus property may indicate a credit amount or a number of free game objects that may be awarded when a bonus involving the game object is triggered. In particular embodiments, the bonus credit amount or the bonus free game objects may be used for promotional purposes in that they may only be used for game play on the gaming machine but may not be redeemed for cash. As described with respect to FIG. 1A, the bonus property may change along the game object's trajectory such as in response to a collision with particular objects along the trajectory. In the present invention, it is not required to assign a bonus property to a game object. When a bonus is triggered involving a game object, a bonus award may be generated at random.

In one embodiment, a bonus may be triggered when two game objects collide. As described with respect to FIG. 4, a plurality of trajectory-based games of chance may be played in parallel. In one embodiment of parallel game play, the trajectories of a plurality of game objects may be simulated at the same time in the gaming environment. As an example, two trajectory-based games of chance may be initiated with game objects 425 and 426. The two trajectory-based games of chance may be initiated separately and at different times. For instance, a first wager may be made and the trajectory-based game of chance for game object 426 may be initiated and then a second wager may be made and the trajectory-based game of chance for game object 425 may be initiated. In the example, the trajectory for the game object 426 is longer than the trajectory for the game object 425 and the two game objects end up colliding. When the two game objects collide, the two game objects explode and a bonus of "win 5" is awarded.

An advantage of awarding a bonus when two objects collide is that it may encourage parallel game play. Parallel game play typically will result in a higher game throughput, i.e. games player per unit time, than serial game play. With a high game throughput, the casino may see increased revenues. Also, the high game throughput may allow the casino to lower the game denomination amount, which may be desirable to some game players.

In other embodiment, a bonus may be triggered when a game object collides with an object in the gaming environment or a group of objects. For instance, a bonus may be triggered when a game object collides with one of the bomb shaped objects 428. When the game object collides with the bomb, the bomb and/or the game object may explode and the bonus is triggered. In another example, the bonus may not be triggered until each of the bombs is exploded after a collision with a game object. To explode all of the bombs, a series of trajectory-based games of chance may have to be played.

In general, a bonus may be triggered from a series of events that may occur over one or more trajectory-based games of chance. For instance, a symbol may be displayed on each of the exits to the gaming environment 408, 415, 416, 417, 418. Each time an object leaves the gaming environment through one of the exits, the symbol on the exit may be displayed to the bonus board 426. When a particular combination of symbols is displayed, a bonus may be triggered. Otherwise, the bonus board 426 may be reset.

In one embodiment, when a bonus is triggered, a large number of game objects may be released from the bonus cup 424. Awards may be earned for each of the game objects released from the bonus cup 424 and additional bonuses may be triggered. In one example, the bonus cup may start out empty and may be gradually filled by game objects that land in the bonus cup 424. When each game object lands in the bonus cup 424, a replacement game object, i.e., a "free" game object, may be warded. When the bonus cup 424 becomes full, all of the game objects in the cup may be released. In another example, the cup 424 may start full. When a certain event or a combination of events occur in the gaming environment, such as a combination of symbols appearing on the bonus board 426, then the game objects in the bonus cup may be released.

Different progressive awards may be incorporated into a trajectory-based game of chance. The progressive awards may be funded from a portion of wagers from a plurality of trajectory-based games of chance. The trajectory-based games of chance used to fund the progressive awards may be played by a single player or groups of players. Further, the trajectory-based games of chance used to fund the progressive awards may be played on different groups of gaming machines. The gaming machines may be connected via a casino area network or a wide area progressive network. In another embodiment, the player may use a smart card, a cell phone or a personal computing device to play the progressive game. A progressive award may be awarded when a game object enters the progressive cup 422.

FIG. 8 is a perspective drawing of a 3-D gaming environment implemented on a gaming machine for one embodiment of this invention. To utilize a virtual 3-D gaming environment for a game presentation or other gaming activities on a gaming machine, a 2-D view of the virtual 3-D gaming environment is rendered. The 2-D view captures some portion of the surfaces modeled in the virtual 3-D gaming environment. The captured surfaces define a 3-D object in the 3-D gaming environment. The captured surfaces in 2-D view are defined in the 3-dimensional coordinates of the virtual 3-D gaming environment and converted to a 2-dimensional coordinate system during the capturing process.

In the present invention, the 2-D view is generated from a viewpoint within the virtual 3-D gaming environment. The viewpoint is a main factor in determining what surfaces of the 3-D gaming environment defining a 3-D object are captured in the 2-D view. Since information about the 3-D gaming environment is stored on the gaming machine, the viewpoint may be altered to generate new 2-D views of objects within the 3-D gaming environment. For instance, in one frame, a 2-D view of an object modeled in the 3-D gaming environment, such as a front side of a building (e.g. the viewpoint captures the front side of a building), may be generated using a first viewpoint. In another frame, a 2-D view of the same object may be generated from another viewpoint (e.g. the backside of the building).

A disadvantage of current gaming machines is that the 2-D views used as video frames in game presentations are only rendered from 2-D objects and information about the multi-dimensional nature of the objects rendered in the 2-D views, such as the viewpoint used to generate the 2-D view, are not stored on the gaming machine. Historically, due to the regulatory environment of the gaming industry, gaming software used to present a game of chance has been designed to "run in place" on an EPROM installed on the gaming machine. Using an EPROM, it was not feasible to store large amounts of game data. To generate and store pre-rendered 2-D frames for a trajectory-based game of chance for every possible trajectory would take a tremendous amount of memory. Using a 3-D gaming environment of the present invention and rendering 2-D frames for the trajectories in real-time saves memory and allows for more trajectories to be used in the game design.

Returning to FIG. 8, the 3-D gaming environment 100 includes three objects: 1) a rectangular box 101 on top of, 2) a plane 114 and 3) a second box 126. The box 101, box 127 and plane 114 are defined in a 3-dimensional rectangular coordinate space 104. Typically, surfaces of the objects in the gaming environment are defined using a plurality of surface elements. The surface elements may comprise different shapes, such as different types of polygons that are well known in the 3-D graphical arts. For example, the objects in the present information may be defined in a manner to be compatible with one or more graphics standards such as Open Graphics Library (OpenGL).

In one embodiment, the objects in the gaming environment 100 may be defined by a plurality of triangular elements. As an example, a plurality of triangular surface elements 125 are used to define a portion of the surface 108 and the surface face 112. In another embodiment, the objects in the gaming environment 100, such as box 101 and box 126, may be defined by a plurality of rectangular elements. In yet another embodiment, a combination of different types of polygons, such as triangles and rectangles may be used to describe the different objects in the gaming environment 100. By using an appropriate number of surface elements, such as triangular elements, objects may be made to look round, spherical, tubular or embody any number of combinations of curved surfaces.

Triangles are by the most popular polygon used to define 3-D objects because hey are the easiest to deal with. In order to represent a solid object, a polygon of at least three sides is required (e.g. triangle). However, OpenGL supports Quads, points, lines, triangle strips and quad strips and polygons with any number of points. In addition, 3-D models can be represented by a variety of 3-D curves such as NURBs and Bezier Patches.

Figure 1A:
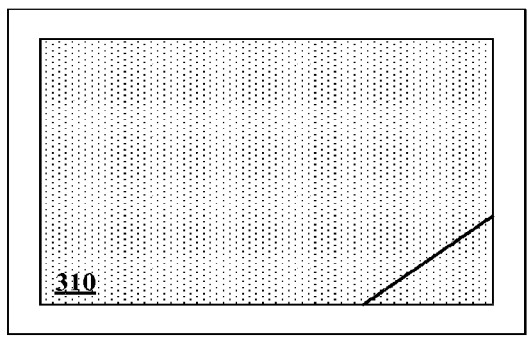
Figure 1A:
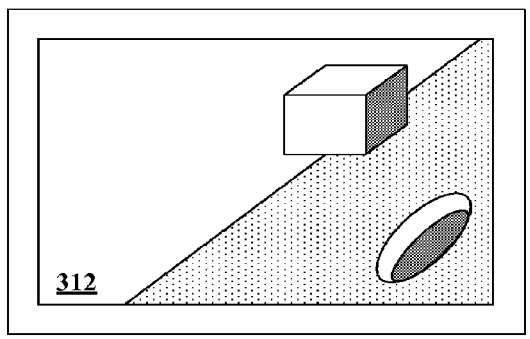

Each of the surface elements comprising the 3-D virtual gaming environment may be described in a rectangular coordinate system or another appropriate coordinate system, such as spherical coordinates or polar coordinates, as dictated by the application. The 3-D virtual gaming environments of the present invention are not limited to the shapes and elements shown in FIG. 1 (see FIGS. 2, 3 and 4) or the coordinate system used in FIG. 1 which are shown for illustrative purposes only. Details of 3-D graphical rendering methods that may be used with the present invention are described in "OpenGL Reference Manual: The Official Reference Document to Open GL, Version 1.2," 3.sup.rd edition, by Dave Shreiner (editor), OpenGL Architecture Review Board, Addison-Wesley Publishing, Co., 1999, ISBN: 0201657651 and "OpenGL Program Guide: The Official Guide to Learning OpenGL, Version 1.2," 3.sup.rd edition, by Mason Woo, Jackie Neider, Tom Davis, Dave Shreiner, OpenGL Architecture Review Board, Addison-Wesley Publishing, Co., 1999, ISBN: 0201604582, which are incorporated herein in their entirety and for all purposes.

Surface textures may be applied to each of the surface elements, such as elements 125, defining the surfaces in the virtual gaming environment 100. The surface textures may allow the 3-D gaming environment to appear more "real" when it is viewed on a display screen on the gaming machine. As an example, colors, textures and reflectance's may be applied to each of the surface elements defining the various objects in the 3-D gaming environment. Millions of different colors may be used to add a realistic "feel" to a given gaming environment. Textures that may be applied include smoothness or surface irregularities such as bumps, craters, lines, bump maps, light maps, reflectance maps and refractance maps or other patterns that may be rendered on each element. The textures may be applied as mathematical models stored as "texture maps" on the gaming machine.

In one embodiment, the "texture map" may be an animated texture. For instance, frames of a movie or another animation may be projected onto a 3-D object in the 3-D gaming environment. These animated textures may be captured in 2-D views presented in video frames on the gaming machine. Multiple animated textures may be used at the same time. Thus, for example, a first movie may be projected onto a first surface in the 3-D gaming environment and a second movie may be projected onto a second surface in the 3-D gaming environment where both movies may be viewed simultaneously.

Material properties of a 3-D surface may describe how the surface reacts to light. These surface properties may include such things as a) a material's ability to absorb different wavelengths of light, b) a material's ability to reflect different wavelengths of light (reflectance), c) a material's ability to emit certain wavelengths of light such as the tail lights on a car and d) a material's ability to transmit certain wavelengths of light. As an example, reflectance refers to how much light each element reflects. Depending on the reflectance of a surface element other items in the gaming environment may be reflected fuzzily, sharply or not at all. Combinations of color, texture and reflectance may be used to impart an illusion of a particular quality to an object, such as hard, soft, warm or cold.

Some shading methods that are commonly used with 3-D graphics to add texture that may be applied to the present invention include gourand shading and phong shading. Gourand and phong shading are methods used to hide an object's limited geometry by interpolating between two surfaces with different normals. Further, using Alpha Blending, pixels may be blended together to make an object appear transparent i.e. the object transmits light.

Virtual light sources, such as 102, may be used in the gaming environment to add the appearance of shading and shadows. Shading and shadows are used to add weight and solidity to the rendering of a virtual object. For example, to add solidity to the rectangular box 101, light rays emitted from light source 102 are used to generate a shadow 103 around the rectangular box 101. In one method, ray tracing is used to plot paths of imaginary light rays emitted from an imaginary light source such as 102. These light rays may impact and may reflect off various surfaces affecting the colors assigned to each surface element. In some gaming environments, multiple light sources may be used where the number of lights and the intensity of each light source change with time. Typically, in real time 3D, the light sources do not generate shadows and it is up to the programmer to add shadows manually. As stated earlier, however, the light sources produce shading on objects.

Perspective, which is used to convey the illusion of distance, may be applied to the gaming environment 100 by defining a vanishing point, such as 126. Typically, a single point perspective is used where all of the objects in the scene are tendered to appear as though they will eventually converge at a single point in the distance, e.g. the vanishing point. However, multiple point perspectives may also be employed in 3-D gaming environments of the present invention. Perspective allows objects in the gaming environment appear behind one another. For instance, box 101 and box 127 may be the same size. However, box 127 is made to appear smaller, and hence farther away, to a viewer because it is closer to the vanishing point 126. A 3-D gaming environment may or may not provide perspective correction. Perspective correction is accomplished by transforming points towards the center of the 2-D view screen. The farther away an object is from the viewpoint in 3-D gaming environment, the more it will be transformed into the center of screen.

The present invention is not limited to perspective views or multiple perspective views of the 3-D gaming environment. An orthographic view may be used where 3-D objects rendered in a 2-D view always appear the same size no matter how far away they are in the 3-D gaming environment. The orthographic view is what you would see as a shadow cast from a light source that is infinitely far away (so that the light rays are parallel), while the perspective view comes from a light source that are finitely far away, so that the light rays are diverging. In the present invention, combinations of both perspective and orthographic views may be used. For instance, an orthographic view of a text message may be layered on top of a perspective view of the 3-D gaming environment.

Related to perspective is "depth of field". The depth of field describes an effect where objects that appear closer to a viewer are more in focus and objects that are farther away appear out of focus. Depth of field may be applied renderings of the various objects in the gaming environment 100. Another effect that may be applied to renderings of objects in the gaming environment is "anti-aliasing". Anti-aliasing is used to make lines which are digitally generated as a number of straight segments appear more smooth when rendered on a display screen on the gaming machine. Because the 2D display only takes finite pixel positions, stair stepping occurs on any limes that are not straight up and down, straight across (left and right) or at 45 degrees on the display screen. Stair stepping produces a visually unappealing effect, thus, pixels are added to stair-stepped lines to make this effect less dramatic.

Standard alpha-numeric text and symbols may be applied to one or more surface elements in the gaming environment 101 to display gaming information to a game player. Other game features and gaming information may also be rendered in the gaming environment 100. For example, bonus games, promotions, advertising and attraction graphics may also be rendered in the gaming environment. For instance, a casino's logo or a player's face may be rendered in the gaming environment. These additional game features may be integrated into a game outcome presentation on the gaming machine or other operational modes of the gaming machine such as an attract mode.

After the gaming environment is defined in 3-dimensions, to display a portion of the 3-D gaming environment on a display screen on the gaming machine, a "photograph" of a portion of the gaming environment is generated. The photograph is a 2-dimensional rendering of a portion of the 3-dimensional gaming environment. Transformations between 3-D coordinate systems and 2-D coordinate systems are well known in the graphical arts. The photograph may be taken from a virtual "camera" positioned at a location inside the gaming environment 100. A sequence of photographs taken by the virtual camera in the gaming environment may be considered analogous to filming a movie.

A "photograph" displayed on the display screen of a gaming machine may also be a composite of many different photographs. For instance, a composite photograph may be generated from portions of a first photograph generated using an orthographic view and portions of a second photograph generated using a perspective view. The portions of the photographs comprising the composite photograph may be placed on top of one another to provide "layered" effects, may be displayed in a "side by side" manner to produce a "collage" or combinations thereof.

Operating parameters of the virtual camera, such as its position at a particular time, are used to define a 3-D surface in the gaming environment, which is projected on to a 2-D surface to produce the photograph. The 3-D surface may comprise portions a number of 3-D objects in the 3-D gaming environment. The 3-D surface may also be considered a 3-D object. Thus, a photograph is a 2-D image derived from 3-D coordinates of objects in the 3-D gaming environment. The virtual camera may represent gaming logic stored on the gaming machine necessary to render a portion of the 3-D gaming environment 100 to a 2-D image displayed on the gaming machine. The photograph is converted into a video frame, comprising a number of pixels, which may be viewed on a display screen on the gaming machine.

The transformation performed by the virtual camera allowing a portion of the virtual gaming environment to be viewed one or more display screens on the gaming machine may be a function of a number of variables. The size of lens in the virtual gaming environment, the position of the lens, a virtual distance between the lens and the photograph, the size of the photograph, the perspective and a depth variable assigned to each object are some of the variables that may be incorporated into a transformation by the virtual camera that renders a photograph of the virtual gaming environment. The resolution of the display screen on the gaming machine may govern the size of a photograph in the virtual camera. A typical display screen may allow a resolution of 800 by 600 color pixels although higher or lower resolution screens may be used. A "lens size" on the virtual camera defines a window into the virtual gaming environment. The window is sometimes referred to as a viewport. The size and position of the lens determines what portion of the virtual gaming environment 100 the virtual camera views.

After the photograph of the virtual gaming environment has been generated, other effects, such as static and dynamic anti-aliasing, may be applied to the photograph to generate a frame displayed on one or more displays located on the gaming machine. Typically, the mathematical and logical operations, which are encoded in gaming software logic, necessary to perform a particular transformation and generate a video frame may be executed by video cards and graphics cards located on the gaming machine and specifically designed to perform these operations. The graphics cards usually include graphical processing units (GPUs). However, the transformation operations may also be performed by one or more general purpose CPUs located on the gaming.

In general, the 2D/3D video graphics accelerators or coprocessors, often referred to as graphics processing units (GPUs), are located on or connected to the master gaming controller and are used to perform graphical operations. The solutions described are most commonly found as video cards. The graphical electronics may be incorporated directly onto the processor board (e.g. the master gaming controller) of the gaming machine, and even tightly integrated within other very large scale integrated chip solutions. The integration methods are often cost saving measures commonly used to reduce the costs associated with mass production. For instance, video cards, such as the Vivid!XS from VideoLogic Systems (VideoLogic Systems is a division of Imagination Technologies Group plc, England) may used to perform the graphical operations described in the present invention. As another example, video cards from Nvidia Corporation (Santa Clara, Calif.) may be employed. In one embodiment, the video card may be a multi-headed 3-D video card, such as a Matrox G450 (Matrox Graphics Inc., Dorval, Quebec, Canada). Multi-headed video cards let a single graphics card power two displays simultaneously or render two images simultaneously on the same display.

When displaying photographs from a virtual camera in a 3-D gaming environment, a single image from the camera may be divided among a plurality of display devices. For instance, four display screens may be used to display one quarter of a single image. The video feeds for each of the plurality of display devices may be provided from a single video card. Multi-headed video cards let a single graphics card (or graphics subsystem) display output on two or more displays simultaneously. This may be multiple output rendering for each display or one rendering over multiple displays, or variation of both. For example, when a multi-headed video card is used, a first head on the multi-headed video card may be used to render an image from a first virtual camera in a 3-D gaming environment and a second head on the multi-head video card may be used to render a second image from a second virtual camera in a 3-D gaming environment. The rendered first and second images from the first head and the second head may be displayed simultaneously on the same display or the first image may be displayed on a first display and the second image may be displayed on a second display.

Returning to FIG. 8, three lenses, 105, 106 and 107 used in a virtual camera are shown positioned at three locations in the virtual gaming environment. Each lens views a different portion of the gaming environment. The size and shape of the lens may vary which changes a portion of the virtual gaming environment captured by the lens. For instance, lenses 105 and 106 are rectangular shaped while lens 107 is oval shaped.

Lens 106 is positioned to view the "game display" for a game outcome presentation rendered on surface 108. The portion of the gaming environment captured by lens 106 is a six-sided shape 120. As described above, the game display may contain the presentation of a particular game played on the gaming machine, such as a hand of cards for a poker game. After applying an appropriate transformation, a photograph 124 of the portion of the virtual gaming environment 100 in volume 120 is generated by the virtual camera with lens 106.

Using differing terminology common within the 3D graphics community, the lenses 105, 106 and 107 may be described as a camera. Each camera has the ability to have different settings. A scene in the 3-D gaming environment is shot from the camera's viewpoint. A different scene is captured from each camera. Thus, the scene is rendered from the camera to produce and image.

The photograph 124 generated from the virtual camera with lens 106 may be viewed on one or more display screens on the gaming machine. For instance, photograph 124 may be viewed on a main display on the gaming machine and a secondary display on the gaming machine. In another embodiment, a portion of photograph 124 may be displayed on the main display and a portion of the photograph may be displayed simultaneously on a secondary display. In yet another embodiment, a portion of photograph 124 may be displayed on a first gaming machine while a portion of photograph 124 may be displayed simultaneously on a second gaming machine.

Lens 105 of a virtual camera is positioned to view volume 121 in the virtual gaming environment 100. The volume 121 intersects three faces, 108, 110 and 112, of box 101. After applying an appropriate transformation, a photograph 125 of the portion of the virtual gaming environment 101 in volume 121 is rendered by the virtual camera with lens 105 which may be displayed on one of the display screens on a gaming machine.

Lens 107 of a virtual camera is positioned to view volume 122 in the virtual gaming environment 100. The oval shape of the lens produces a rounded volume 122 similar to a light from a flashlight. The volume 122 intersects a portion of face 110 and a portion of plane 114 including a portion of the shadow 103. After applying an appropriate transformation, a photograph 126 of the portion of the virtual gaming environment 101 in volume 122 is rendered by the virtual camera with lens 107 which may be displayed on one or more of the display screens on a gaming machine. For instance, a gaming machine may include a main display, a secondary display, a display for a player tracking unit and a remote display screen in communication with the gaming machine via a network of some type. Any of these display screens may display photographs rendered from the 3-D gaming environment.

A sequence of photographs generated from one or more virtual cameras in the gaming environment 101 may be used to present a game outcome presentation on the gaming machine or present other gaming machine features. The sequence of photographs may appear akin to movie or film when viewed by the player. For instance, a 3-D model of a virtual person may appear to speak. Typically, a refresh rate for a display screen on a gaming machine is on the order of 60 HZ or higher and new photographs from virtual cameras in the gaming environment may be generated as the game is played to match the refresh rate.

The sequence of photographs from the one or more virtual cameras in the gaming environment may be generated from at least one virtual camera with a position and lens angle that varies with time. For instance, lens 106 may represent the position of a virtual camera at time, $t_1$, lens 105 may represent the position of the virtual camera at time, $t_2$, and lens 107 may represent the position of the virtual camera at time $t_3$. Photographs generated at these three positions by the virtual camera may be incorporated into a sequence of photographs displayed on a display screen.

The position of the virtual camera may change continuously between the positions at times $t_1$, $t_2$, $t_3$ generating a sequence of photographs that appears to pan through the virtual gaming environment. Between the positions at times $t_1$, $t_2$, $t_3$, the rate the virtual camera is moved may be increased or decreased. Further, the virtual camera may move non-continuously. For instance, a first photograph in a sequence of photographs displayed on a display screen may be generated from the virtual camera using the position of lens 106. The next photograph in the sequence of photographs may be generated from the virtual camera using the position of lens 105. A third photograph in the sequence of photographs may be generated from the virtual camera using the position of lens 107. In general, the virtual camera in the gaming environment 101 may move continuously, non-continuously and combinations thereof.

In a game presentation, a plurality of virtual cameras, with time varying positions, in a plurality of virtual gaming environments may be used. The camera and environment information as a function of time may be stored on the gaming machine and may be accessed when a particular scene for a game event in a game outcome presentation is needed such that the scene may be rendered in "real-time". A scene may be defined by the positions of one or more virtual cameras in one or more gaming environments as a function of time. The scenes may be modularized, i.e. a library of scenes may be generated, so that they may be incorporated into different games. For instance, a scene of a button being depressed may be incorporated into any game using this type of sequence.

A sequence of photographs generated from a first virtual camera in a first virtual gaming environment may be displayed simultaneously with a sequence of photographs generated from a second virtual camera in a second virtual gaming environment. For instance, the first sequence of photographs and second sequence and second sequence of photographs may be displayed on a split screen or may be displayed on different screens. In addition, the first virtual camera in a first virtual gaming environment and the second virtual camera may be located in a second virtual gaming environment different from the first virtual gaming environment. Also, the first virtual gaming environment and the second virtual gaming environment may be in the same gaming environment. Further, a single virtual camera may jump between different gaming environments, such as between a game play environment to a bonus gaming environment. The transition between the gaming environments may also appear to be smooth (e.g. the camera may pan from one environment in a continuous manner).

FIG. 9 is a block diagram depicting a user interface for a 3-D trajectory based game of chance. As described with respect to FIG. 1, the sequence of 2-D images rendered from the 3-D gaming environment may be displayed to a display screen 34 on the gaming machine as part of a presentation state for the trajectory-based game of chance. A game outcome presentation for the trajectory-based game of chance, which may be controlled by the master gaming controller 224 (See FIG. 11), may comprise a sequence of presentation states.

In addition to the images displayed on the displayed screen, a presentation state may comprise outputs and inputs from various gaming devices comprising the user interface 160 on the gaming machine that are designed to stimulate one or more of a player's senses including sight, sound, touch and smell. For example, sound effects, which may be output from the sound projection devices 12 and 14, may provide auditory stimulation to the player. The plunger 110, the touch screen display 34 and the control knob 118 may be used to provide inputs for the trajectory-based game of chance and to provide tactile stimulation. The light panel 108 and the display 34 may be used to provide visual stimulation. In one embodiment, the display 34 may use a 16.times.9 or a 9.times.16 aspect ration screen or any other type of non-square wide screen aspect ratio monitor screen. Additional gaming peripherals (not shown) connected to the user interface, such as bonus wheels and secondary displays, may be used to provide further visual and auditory effects.

In one embodiment, the user interface 160 may include a plunger 110. The plunger 110, like a pull handle on a mechanical or video slot game, may be used to initiate the trajectory-based game of chance on the gaming machine. The plunger 110 may be attached to a spring 112 that provide a resistive force when the plunger is pulled and returns the plunger to an initial position when it is released. The plunger 110 may further comprise a strike pad 114 that is designed to strike an object, such as a ball 116, when the plunger is pulled back and released or when the plunger is pushed forward.

In another embodiment (not shown), a flipping mechanism comprising a lever attached to a pivot may be used with the user interface 160. When the lever on the flipping mechanism is pressed, the flipping mechanism may impart a force to an object such as the ball 116. The force propels the object in a particular direction depending on how the object and the lever used in the flipping mechanism are aligned. Flipping mechanisms are common in mechanical pachinko games.

The user interface 160 may include a conduit 150, such as a hollow tube, that may be connected to the plunger 110 or the flipping mechanism. The conduit 150 may be designed so that when the ball 116 is imparted with a force, it travels up the conduit and then is returned to its initial position 153 by the force of gravity. The force may be imparted to the ball 116 by the plunger 110, the flipping mechanism or some other mechanism designed to impart a force to the ball. The conduit 150 may be constructed from a translucent or clear material that allows the ball to be viewed as it moves up the ball conduit 150.

In one embodiment, the top of the ball conduit 151 may be connected to a second conduit 152 that returns the ball 116 to its initial position 153. When the ball 116 is imparted with a force above a certain threshold, the ball enters the second conduit 152 and it is returned to its initial position. When the ball 116 is imparted with a force below a certain threshold, it moves up the conduit 150 but does not reach the top of the conduit 151 then rolls back down the conduit to its initial position 153.

Mechanical gaming devices employed in the user interface 160 that may be operated by a game player, such as the plunger 110, the ball conduit 150 and the flipping mechanism, may include one or more sensors 102 that are used to measure an operational parameter of the device. For example, when the plunge is pulled back and released or pushed forward and released, the one or more sensors 102 may be used to measure that the plunger 110 has been moved and then returned to its initial position. The one or more sensors 102 may generate an output signal that is used to indicate one of these events has occurred. When the master gaming controller 224 receives the one or more output signals from the sensors 102, the master gaming controller may initiate a trajectory-based game of chance.

One or more operational parameters measured by the sensors may be used to influence one or more presentation states for the game outcome presentation on the gaming machine. As an example of using information measured from the sensors to influence the generation of a presentation state, the distance the plunger 110 is pulled back may be determined from the output signals generated by the sensors 102. Then, the distance may be displayed on the user interface using an output device connected to the interface. For instance, as the plunger 110 is pulled-back and released, the output signals from the sensors 102 may be used to generate an animation on the display screen 34 where a video plunger 122 is pulled back and released. As another example, this procedure could be duplicated for a flipping mechanism when a flipping mechanism is used in the hardware interface.

As another example, the distance the plunger 110 is pulled back may be a measure of how much force is imparted to the ball 116 when the plunger 110 is released. Therefore, as the plunger 110 is pulled back, a strength meter on the display screen 120 and/or the light panel 108 may light up. A number of lighted bars that are displayed on the strength meter 120 or A number of lights that are lit on the light panel 108 may be proportional to the distance the plunger is pulled back. Further, as the plunger is pulled back sounds may be emitted from the sound projection devices. A pitch of the sound or some other characteristic of the sound may be selected according to the distance the plunger is pulled back.

In one embodiment, information measured from the sensors connected to a mechanical input device may be used to select a trajectory for a game object in the trajectory-based game of chance. For example, the initial velocity of the game object in the game environment may be selected according to the distance the plunger 110 is pulled back before it is released. In another example, one or more sensors may be used a distance the ball 116 travels along the conduit 150. The distance information may be used as part of the selection of an initial trajectory for the game object in the trajectory-based game of chance.

As described with respect to FIG. 3, a large number of initial states for a game object including its initial velocity may generate the same game outcome. Therefore, a game outcome may be determined at random and then an initial state that corresponds to the game outcome may be selected from among the initial states that generate the desired game outcome. When a range of initial velocities, where some are higher and some are lower, generate the same game outcome, then the distance the plunger is pulled back, as measured by the sensors, may be used to select a trajectory with a higher initial velocity or a lower initial velocity for use in the gaming environment.

When a trajectory is selected in this manner, it may appear to the player that they have some control over the game outcome because they can control, to some degree, the type of game outcome presentation that is generated by the master gaming controller. However, the generation of the game outcome is still generated at random by the master gaming controller 224 and is independent of the input by the player via the user interface. Thus, the trajectory-based game may remain a game of chance because the generated game outcome is not affected by the skill of player, such as how far they pull back the plunger 110.

The user interface may comprise additional input devices that may be used to affect a play of a trajectory-based game of chance. The following examples are provided for illustrative purposes only. For example, a shape control input 126 on the touch screen display 34 may be used to select a shape of the game object to use in the trajectory-based game of chance, such as a sphere, diamond or cube. In another example, a denomination control 128 may be used to select a default denomination for game objects in the trajectory-based game of chance. The default is used unless a player specifies a wager in another manner for the game object. The strength meter may be used to provide input used to select an initial state for the trajectory of the game object used in the trajectory-based game of chance. For example, the strength meter 120 may be used to select a higher or lower initial velocity for the game object like the plunger 110.

The control knob 118 may be used to select a game speed for the trajectory-based game of chance. Turning the knob in one direction may increase the game speed. Turning the knob in another direction may decrease the game speed. In one embodiment, a number of game trajectory-based games of chance may be initiated automatically. The control knob 118 may be used to control the interval between the initiation of successive games in the games that are initiated automatically.

Turning to FIG. 10, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine Typically, the main door 8 and/or any other portals which provide access to the interior of the machine utilize a locking mechanism of some sort as a security feature to limit access to the interior of the gaming machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. Further, the video display monitor 34 may be a touch screen. The touch screen may respond to inputs made by a player touching certain portions of the screen. The information panel 36 is a back-lit, silk screened glass panel with lettering to indicate general game information including, for example, the number of coins played. The bill validator 30, player-input switches 32, video display monitor 34, and information panel are devices used to play a game on the game machine 2. The devices are controlled by a master gaming controller (not shown) housed inside the main cabinet 4 of the machine 2. Many possible games, including traditional slot games, video slot games, video poker, and keno, may be provided with gaming machines of this invention.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 42. Further, the top box 6 may house different or additional devices than shown in the FIG. 1. For example, the top box may contain a bonus wheel or a back-lit silk screened panel which may be used to add bonus features to the game being played on the gaming machine. During a game, these devices are controlled, in part, by the master gaming controller (not shown) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Returning to the example of FIG. 10, when a user wishes to play the gaming machine 2, he or she inserts cash through the coin acceptor 28 or bill validator 30. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 42 located in the top box.

During the course of a game, a player may be required to make a number of decisions, which affect the outcome of the game. For example, a player may vary his or her wager on a particular game, select a prize for a particular game, or make game decisions which affect the outcome of a particular game. The player may make these choices using the player-input switches 32, the video display screen 34 or using some other device which enables a player to input information into the gaming machine. During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

FIG. 11 is a block diagram of networked gaming machines and gaming devices that provide stand-alone trajectory-based game play, linked trajectory-based game play and progressive trajectory-based games for one embodiment of the present invention. A master gaming controller 224 is used to present one or more games of chance on the gaming machines 61, 62 and 63. The master gaming controller 224 may also act as a trajectory-based game controller. As a trajectory-based game controller, the master gaming controller 224 may be used to generate trajectory-based games on one (e.g., stand-alone trajectory-based game) or more gaming machines (e g, linked trajectory-based game). For instance, in linked trajectory-based game play, a plurality of game players may play trajectory-based games of chance in a shared gaming environment. In one embodiment, the trajectory-based game may be generated as a bonus game to the one or more games of chance played on the gaming machines, such as 61, 62 and 63. Trajectory-based bonus game may be generated for a game of chance such as but not limited to video slot games, video poker games, video black jack games, video card games, video keno games and mechanical slot games.

For a trajectory-based bonus game involving a plurality of linked gaming machines, a trajectory-based game server 90 with a trajectory-based game controller 92 may be used to generate the outcome of the trajectory-based bonus game which is displayed on the plurality of gaming machines such as 61, 62 and 63. The outcomes of the trajectory-based bonus games and other linked trajectory-based games may be based upon game play generated on the plurality of gaming machines in communication with the trajectory-based game server 90. In one embodiment, the trajectory-based game server may allow a game object from a first gaming environment on a first gaming machine to travel to a second gaming environment on a second gaming machine. In another embodiment, as described with respect to FIG. 2, the trajectory-based game server 90 or a gaming machine, such 61, 62 and 63, may provide a plurality of trajectory-based games in parallel i.e. at the same time.

The master gaming controller 224 executes a number of gaming software modules to operate gaming devices 70, such as coin hoppers, bill validators, coin acceptors, speakers, printers, lights, displays (e.g. 34) and other input/output mechanisms (see FIG. 10). The master gaming controller 224 may also execute gaming software enabling communications with gaming devices located outside of the gaming machines 61, 62 and 63, such as trajectory-based game servers (e.g., 90), trajectory-based game progressive servers (e.g., 82), player tracking servers, bonus game servers, game servers, progressive game servers. In some embodiments, communications with devices located outside of the gaming machines may be performed using the main communication board 215 and network connections 71. The network connections 71 may allow communications with remote gaming devices via a local area network, an intranet, the Internet or combinations thereof. The trajectory-based game server 90 may also communicate with a number of game devices via the network connections 71 such as but not limited to the gaming machines 61, 62 and 63, the trajectory-based game progressive server 82 and the remote gaming machines 64 and 65.

The gaming machines 61, 62 and 63 may use gaming software modules to generate a trajectory-based game of chance that are distributed between local file storage devices and remote file storage devices. For example, to play a trajectory-based game on gaming machine 61, the master gaming controller may load gaming software modules into RAM 56 that may be located in 1) a file storage device 226 on gaming machine 61, 2) an trajectory-based game server 90, 3) a file storage device 226 on gaming machine 62, 4) a file storage device 226 on gaming machine 63, or 5) combinations thereof. In one embodiment of the present invention, the gaming operating system may allow files stored on the local file storage devices and remote file storage devices to be used as part of a shared file system where the files on the remote file storage devices are remotely mounted to the local file system. The file storage devices may be a hard-drive, CD-ROM, CD-DVD, static RAM, flash memory, EPROM's, compact flash, smart media, disk-on-chip, removable media (e.g. ZIP drives with ZIP disks, floppies or combinations thereof. For both security and regulatory purposes, gaming software executed on the gaming machines 61, 62 and 63 by the master gaming controllers 224 may be regularly verified by comparing software stored in RAM 56 for execution on the gaming machines with certified copies of the software stored on the gaming machine (e.g. files may be stored on file storage device 226), accessible to the gaming machine via a remote communication connection.

The trajectory-based game server 90 may also be a repository for game software modules and software for other game services provided on the gaming machines 61, 62 and 63. In one embodiment of the present invention, the gaming machines 61, 62 and 63 may download game software modules from the trajectory-based game server 90 to a local file storage device to play a game of chance or an trajectory-based game. The download of game software may be initiated by the trajectory-based game server 90. One example of a game server that may be used with the present invention is described in co-pending U.S. patent application Ser. No. 09/042,192, filed on Jun. 16, 2000, entitled "Using a Gaming Machine as a Server" which is incorporated herein in its entirety and for all purposes. In another example, the game server might also be a dedicated computer or a service running on a server with other application programs.

In one embodiment of the present invention, the processors used to generate a trajectory-based game may be distributed among different machines. For instance, the game flow logic to play an trajectory-based game may be executed on the trajectory-based game server 90 by the trajectory-based game controller 92 while the game presentation logic for the trajectory-based game may be executed on gaming machines 61, 62 and 63 by the master gaming controllers 224. The gaming operating systems on gaming machines 61, 62 and 63 and the trajectory-based game server 90 may allow gaming events to be communicated between different gaming software modules executing on different gaming machines via defined APIs. Thus, a game flow software module executed on the trajectory-based game server 90 may send gaming events to a game presentation software module executed on gaming machine 61, 62 or 63 to control the play of a game of chance, to control the play of a bonus game of chance, to control the play of an trajectory-based game or to control the play of an trajectory-based bonus game presented on gaming machines 61, 62 and 63. As another example, the gaming machines 61, 62 and 63 may send gaming events to one another via network connection 71 to control the play of the shared trajectory-based bonus game played simultaneously on the different gaming machines.

As described with respect to FIG. 7, progressive jackpots may be awarded as part of an trajectory-based game. The progressive jackpots may be funded by groups of gaming machines of various sizes. For example, a group of gaming machines connected together in a casino may fund a progressive jackpot in a trajectory-based game. As another example, gaming machines distributed over many gaming properties may be used to fund a progressive jackpot in an trajectory-based game.

In FIG. 11, an trajectory-based game progressive server 82 is connected to gaming machine 61, 62 and 63 and the remote gaming machine 64 and 64 via a wide area progressive network 81. The trajectory-based game progressive server 82 may also contain a trajectory-based game controller and provide trajectory-based games to the gaming machines in communication with the trajectory-based game progressive server. A portion of the participation fees for trajectory-based games played at the gaming machines in communication with the trajectory-based game progressive server 82 may be used to fund a progressive jackpot. The amount of the trajectory-based game progressive jackpot may be continually updated by the trajectory-based game progressive server. Further, the amount of the trajectory-based game progressive jackpot may be displayed on the gaming machines in communication with trajectory-based game progressive server or may be displayed on a display device near the gaming machines.

Although the foregoing invention has been described in some detail for purposes of clarity of understanding, it will be apparent that certain changes and modifications may be practiced within the scope of the appended claims. For instance, while the gaming machines of this invention have been depicted as having a display screen physically viewed through a vertical glass panel attached to a main gaming machine cabinet, the use of gaming devices in accordance with this invention is not so limited. For example, the display screen features may be provided on a table top gaming machine where the display screen is viewed through a horizontal glass panel.

The invention is claimed as follows:

1. A gaming system comprising:
   a housing;
   at least one display device supported by the housing;
   a plurality of input devices supported by the housing and including an acceptor; and
   a master gaming controller configured to operate with the at least one display device and the plurality of input devices to:
   (a) place a wager after the acceptor receives a physical item associated with a monetary value and following receipt of an actuation of a wager button;
   (b) following placement of the wager, initiate a trajectory-based game of chance;
   (c) determine a trajectory of a three-dimensional game object in a three-dimensional gaming environment used in the trajectory-based game of chance based on one or more trajectory rules, one or more object collision rules, and one or more object exit rules;
   (d) render a sequence of two-dimensional images from the three-dimensional gaming environment, wherein the sequence of two-dimensional images includes one or more two-dimensional images of the three-dimensional game object along the trajectory;
   (e) determine a game outcome for the trajectory-based game of chance;
   (f) display the rendered sequence of two-dimensional images on the at least one display device as part of a game outcome presentation for the trajectory-based game of chance; and
   (g) initiate a payout following an occurrence of a triggering event.

2. The gaming system of claim 1, wherein the master gaming controller is configured to determine the trajectory after determining the game outcome.

3. The gaming system of claim 1, wherein the master gaming controller is configured to determine the game outcome based on the determined trajectory.

4. The gaming system of claim 1, wherein the at least one input device includes a first input device having at least one sensor configured to detect an actuation of the first input device, the first input device configured to generate an output signal and to send the output signal to the master gaming controller upon detection of an actuation of the first input device.

5. The gaming system of claim 4, wherein the master gaming controller is configured to initiate the trajectory-based game of chance following receipt of the output signal from the first input device.

6. The gaming system of claim 4, wherein the first input device includes a touch screen and the at least one sensor is a touch screen sensor.

7. The gaming system of claim 6, wherein the output signal includes information indicating an amount of force applied to the touch screen upon actuation of the touch screen.

8. The gaming system of claim 1, wherein the master gaming controller is configured to enable overlapping play of a plurality of trajectory-based games of chance.

9. A method of operating a gaming system, said method comprising:
   (a) placing, via a master gaming controller, a wager after an acceptor of the gaming system receives a physical item associated with a monetary value and following receipt of an actuation of a wager button;
   (b) following placement of the wager, initiating, via the master gaming controller, a trajectory-based game of chance;

(c) determining, via the master gaming controller, a trajectory of a three-dimensional game object in a three-dimensional gaming environment used in the trajectory-based game of chance based on one or more trajectory rules, one or more object collision rules, and one or more object exit rules;

(d) rendering, via the master gaming controller, a sequence of two-dimensional images from the three-dimensional gaming environment, wherein the sequence of two-dimensional images includes one or more two-dimensional images of the three-dimensional game object along the trajectory;

(e) determining, via the master gaming controller, a game outcome for the trajectory-based game of chance;

(f) displaying, on at least one display device, the rendered sequence of two-dimensional images as part of a game outcome presentation for the trajectory-based game of chance; and (g) initiating, via the master gaming controller, a payout following an occurrence of a triggering event.

10. The method of claim 9, which includes determining the trajectory after determining the game outcome.

11. The method of claim 9, which includes determining the game outcome based on the determined trajectory.

12. The method of claim 9, which includes detecting, via a first input device having at least one sensor, an actuation of the first input device and generating, via the first input device, an output signal and sending, via the first input device, the output signal to the master gaming controller upon detection of an actuation of the first input device.

13. The method of claim 12, which includes initiating, via the master gaming controller, the trajectory-based game of chance following receipt of the output signal from the first input device.

14. The method of claim 12, wherein the first input device includes a touch screen and the at least one sensor is a touch screen sensor.

15. The method of claim 14, wherein the output signal includes information indicating an amount of force applied to the touch screen upon actuation of the touch screen.

16. The method of claim 9, which includes enabling overlapping play of a plurality of trajectory-based games of chance.

17. The method of claim 9, which is provided through a data network.

18. The method of claim 17, wherein the data network is an internet.

\* \* \* \* \*